(12) United States Patent
Ichiki et al.

(10) Patent No.: US 8,428,070 B2
(45) Date of Patent: Apr. 23, 2013

(54) ROUTER, MANAGEMENT APPARATUS, AND ROUTING CONTROL PROGRAM

(75) Inventors: Hiroki Ichiki, Kawasaki (JP); Akiko Yamada, Kawasaki (JP); Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 13/032,969

(22) Filed: Feb. 23, 2011

(65) Prior Publication Data

US 2011/0205898 A1      Aug. 25, 2011

(30) Foreign Application Priority Data

Feb. 24, 2010   (JP) ................... 2010-039277

(51) Int. Cl.
*H04L 12/28* (2006.01)
(52) U.S. Cl.
USPC ......................................................... 370/396
(58) Field of Classification Search .......... 370/351–357, 370/389–392, 395.1, 396, 395.31, 395.51–395.52, 370/400–401
See application file for complete search history.

(56) References Cited

U.S. PATENT DOCUMENTS

| | | | | |
|---|---|---|---|---|
| 7,653,009 B2* | 1/2010 | Watsen et al. | ................. | 370/254 |
| 8,139,590 B2* | 3/2012 | Manral | ......................... | 370/401 |
| 2010/0226251 A1* | 9/2010 | Imai et al. | ..................... | 370/235 |
| 2012/0033567 A1* | 2/2012 | Yamada et al. | ............... | 370/252 |

FOREIGN PATENT DOCUMENTS

| | | |
|---|---|---|
| JP | 02-135839 A | 5/1990 |
| JP | 10-341235 A | 12/1998 |
| JP | 2001-119730 A | 4/2001 |
| JP | 2003-244196 A | 8/2003 |
| JP | 2004-048330 A | 2/2004 |
| JP | 2010-206467 A | 9/2010 |

OTHER PUBLICATIONS

Arai et al, ECO-friendly Distributed Routing Protocol for Reducing Network Energy Consumption, IEEE, 8 pages, 2010.*
Yamada et al, A path-based traffic control method for green networks, IEEE, 7 pages, 2010.*
Zhang et al, GreenTE: Power-Aware Traffic Engineering, IEEE, 10 pages, 2010.*
Yamada, Akiko et al., "A New Path-Based Traffic Control Method for Network Power Saving", IEICE Technical Report, vol. 109, No. 448, Conference held Mar. 4, 2010, pp. 1-2, 393-398 (with English Abstract).
Yamada, Akiko et al., "A Study for Green Network (3)—ECO Routing—", Proceedings of the IEICE General Conference, 2009_Communications (2), Mar. 4, 2009, pp. 252, (with English translation).

* cited by examiner

*Primary Examiner* — Frank Duong
(74) *Attorney, Agent, or Firm* — Fujitsu Patent Center

(57) ABSTRACT

In a routing apparatus, a state data reception unit identifies target paths involving a specified link and finds candidate paths which share their beginning and ending routing apparatuses with any one of the target paths and do not involve the specified link. The state data reception unit obtains state data of each candidate path from a management apparatus managing state data indicating states of routing apparatuses that forward traffic on the candidate paths. Based on the state data of each candidate path, a distribution path selection unit selects a distribution path that minimizes the increase in power consumption due to an expected change in the states of routing apparatuses. A distribution requesting unit transmits a distribution request to the beginning routing apparatus of a target path so as to distribute at least a part of the traffic on the target path to the selected distribution path.

16 Claims, 39 Drawing Sheets

FIG. 12

120 LINK DATA STORAGE UNIT

121 LINK DATA MANAGEMENT TABLE

| PORT # | LINK CAPA-CITY | TARGET RATIO | CONTROL VALUE | LINK TRAFFIC VOLUME | LINK USAGE RATIO | DEVI-ATION | PREV LINK USAGE RATIO | PREV DEVI-ATION | CONGES-TION CONTROL FLAG | ALARM VALUE | PREV ALARM VALUE |
|---|---|---|---|---|---|---|---|---|---|---|---|
| #1 | 1 | 0.8 | 0.1 | 0.3 | 0.3 | 0.3 | 0.3 | 0.3 | | | |
| #2 | 1 | 0.8 | 0.1 | 0.6 | 0.6 | 0.2 | 0.6 | 0.2 | | | |
| #3 | 1 | 0.7 | 0.1 | 0 | 0 | 0.7 | 0 | 0.7 | | | |
| #4 | 1 | 0.8 | 0.1 | 0.7 | 0.7 | 0.1 | 0.6 | 0.2 | | | |
| #5 | 1 | 0.7 | 0.1 | 0 | 0 | 0.7 | 0 | 0.7 | | | |

FIG. 14

220 PATH STATE DATA STORAGE UNIT

221 PATH MANAGEMENT TABLE

| FLOW ID | PATH | SLEEP NODE COUNT | TRANSMIT PROBABILITY | PATH VACANCY | PATH POWER CONSUMPTION PARAMETER | RECEIVED ALARM VALUE | FLOW TRAFFIC VALUE |
|---------|------|------------------|---------------------|--------------|----------------------------------|---------------------|--------------------|
| AD | ACD | 0 | 0.0 | 0.7 | 20 | | |
| AD | AED | 0 | 1.0 | 0.1 | 20 | | 0.3 |
| AD | AGD | 1 | 0.0 | 0.8 | 20 | | |

FIG. 23

120 LINK DATA STORAGE UNIT

121 LINK DATA MANAGEMENT TABLE

| PORT # | LINK CAPA-CITY | TARGET RATIO | CONTROL VALUE | LINK TRAFFIC VOLUME | LINK USAGE RATIO | DEVI-ATION | PREV LINK USAGE RATIO | PREV DEVI-ATION | CONGES-TION CONTROL FLAG | ALARM VALUE | PREV ALARM VALUE |
|---|---|---|---|---|---|---|---|---|---|---|---|
| #1 | 1 | 0.8 | 0.1 | 0.3 | 0.3 | 0.3 | 0.3 | 0.3 | | | |
| #2 | 1 | 0.8 | 0.1 | 0.6 | 0.6 | 0.2 | 0.6 | 0.2 | | | |
| #3 | 1 | 0.7 | 0.1 | 0 | 0 | 0.7 | 0 | 0.7 | | | |
| #4 | 1 | 0.8 | 0.1 | 0.9 | 0.9 | -0.1 | 0.7 | 0.1 | SET | 0.89 | 1 (Initial) |
| #5 | 1 | 0.7 | 0.1 | 0 | 0 | 0.7 | 0 | 0.7 | | | |

FIG. 24

220 PATH STATE DATA STORAGE UNIT

221 PATH MANAGEMENT TABLE

| FLOW ID | PATH | SLEEP NODE COUNT | TRANSMIT PROBABILITY | PATH VACANCY | PATH POWER CONSUMPTION PARAMETER | RECEIVED ALARM VALUE | FLOW TRAFFIC VALUE |
|---|---|---|---|---|---|---|---|
| AD | ACD | 0 | 0.0 | 0.7 | 20 | | |
| AD | AED | 0 | 1.0 | 0 | 20 | | 0.3 |
| AD | AGD | 1 | 0.0 | 0.8 | 20 | | |

FIG. 30

220 PATH STATE DATA STORAGE UNIT

221 PATH MANAGEMENT TABLE

| FLOW ID | PATH | SLEEP NODES | TRANSMIT PROBABILITY | PATH VACANCY | PATH POWER CONSUMPTION PARAMETER | RECEIVED ALARM VALUE | FLOW TRAFFIC VALUE |
|---------|------|-------------|---------------------|--------------|----------------------------------|---------------------|-------------------|
| AD | ACD | 0 | 0.0 | 0.7 | 20 | | |
| AD | AED | 0 | 1.0 | 0 | 20 | 0.89 | 0.3 |
| AD | AGD | 1 | 0.0 | 0.8 | 20 | | |

FIG. 37

220 PATH STATE DATA STORAGE UNIT

221 PATH MANAGEMENT TABLE

| FLOW ID | PATH | SLEEP NODE COUNT | TRANSMIT PROBABILITY | PATH VACANCY | PATH POWER CONSUMPTION PARAMETER | RECEIVED ALARM VALUE | FLOW TRAFFIC VALUE |
|---------|------|------------------|----------------------|--------------|----------------------------------|----------------------|--------------------|
| AD | ACD | 0 | 0.11 | 0.59 | 20 | | 0.033 |
| AD | AED | 0 | 0.89 | 0 | 20 | 0.89 | 0.267 |
| AD | AGD | 1 | 0.0 | 0.8 | 20 | | |

ROUTER, MANAGEMENT APPARATUS, AND ROUTING CONTROL PROGRAM

CROSS-REFERENCE TO RELATED APPLICATION

This application is based upon and claims the benefit of priority of the prior Japanese Patent Application No. 2010-39277, filed on Feb. 24, 2010 the entire contents of which are incorporated herein by reference.

FIELD

The embodiments discussed herein relate to a router, management apparatus, and routing control program for controlling distribution of network traffic.

BACKGROUND

Routers in a network forward packets from one to another to deliver them to destination computers. The routers exchange their routing information with each other to recognize the right transmission path to use for delivery of packets to their destinations. Routing information sent from a router indicates transmission paths that the sending router recognizes. Each router uses such routing information from other routers to make forwarding decisions according to specified destinations of packets.

When there are two or more transmission paths to the destination computer, the router chooses an appropriate path by using a path selection algorithm defined in routing protocols, such as Open Shortest Path First (OSPF) and Routing Information Protocol (RIP). These routing protocols are basically designed to take the shortest path to reach the destination. Some existing sophisticated control techniques based on such routing protocols select shortest paths while minimizing the peak usage of the network.

The above-described existing routing protocols assume that the data traffic (e.g., packets) in a network are transported along a predetermined path. For this reason, the routers on such predetermined paths are supposed to be always active even if the total traffic may become low in some time period.

On the other hand, the power consumption of network components has increased with their performance enhancement, and overall power management of a network has become an increasingly important part of operations of the network system. For example, one proposed technique achieves this by automatically detecting a data highway experiencing a reduction in the amount of data traffic and making the traffic detour around the detected highway via another highway. This detouring of data traffic enables some devices in a network node to go into an inactive state, and the power consumption can thus be reduced by shutting those inactive devices down. Another proposed technique is to consolidate lightly-loaded paths into one, so that more routers can become inactive.

As a different approach to the noted requirement, other proposed techniques distribute the traffic when the network encounters congestion. For example, the traffic received by an input edge router is distributed to a plurality of paths established between the input edge router and an output edge router.

The following literature describes conventional routing techniques related to this application:
Japanese Laid-open Patent Publication No. 2001-119730
Japanese Laid-open Patent Publication No. 2004-48330
Akiko Yamada et al., "A Study for Green Network (3)—ECO Routing—," Proceedings of the IEICE General Conference, The Institute of Electronics, Information and Communication Engineers (IEICE), Mar. 4, 2009, 2009_Communications (2), pp. 252.

Congestion of traffic may occur in some local part of a network, rather than in the entire network. For example, the traffic may be congested in some particular links coupling routers. The congested links may be part of a transmission path of data traffic from its input edge router to its output edge router. One method to solve this link congestion is to reconfigure the network so that the traffic on the current path will be distributed to other alternative paths.

However, distributing the traffic of near congested links may not always be an optimal solution in terms of increase of power consumption. For example, the network may include some routers which have been operating in a power saving mode (or sleep mode) as a result of the aforementioned consolidation of transmission paths. Distributing the entire traffic of such links would awake those sleeping routers and thus invite an increase of power consumption in the network. Suppose, for example, that a link is experiencing a traffic load that exceeds a specified threshold, and there are a number of paths running through that link. In this case, it may be possible to avoid congestion by only partly distributing the load of those paths. However, distributing the traffic load of all those paths to other paths would activate the sleeping routers more than necessary and thus lead to an unnecessary increase of power consumption.

It is noted that the above-described difficulties in congestion control may also apply to, for example, the case of searching for alternative routes to detour the traffic around a failed link.

SUMMARY

According to an aspect of the invention, there is provided a routing apparatus for use in a network to receive traffic entering the network and forward the received traffic via links to other routing apparatuses along a path that gives a forwarding order of the traffic. This routing apparatus includes the following elements: a path storage unit to store information describing the paths of traffic forwarded via the links in the network; a state data reception unit to consult the path storage unit to identify one or more target paths that involve a specified link to transport traffic when a need arises to divert at least a part of the traffic to another path that does not involve the specified link, find candidate paths which share beginning and ending routing apparatuses with any one of the target paths and do not involve the specified link, and obtains state data of each of the candidate paths from a management apparatus that manages the state data indicating states of the routing apparatuses that forward traffic on the candidate paths; a distribution path selection unit to compare the candidate paths with each other in terms of what changes are expected in the states of the respective candidate paths when a part of the traffic passing through the specified link is routed thereto, based on the state data of the candidate paths which the state data reception unit has obtained, and select a distribution path from among the candidate paths which minimizes an increase in power consumption of the routing apparatuses due to the expected changes in the states of the routing apparatuses; and a distribution requesting unit to find one of the target paths which shares both beginning and ending routing apparatuses with the selected distribution path, and transmit a distribution request to the beginning routing apparatus of the found target path so as to distribute at least a part of the traffic on the found target path to the distribution path selected by the distribution path selection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates an example data structure of a link data storage unit;

FIG. 14 illustrates an example data structure of a path state data storage unit in the edge node with a node ID of A;

FIG. 23 illustrates example contents of a link data storage unit after update of link data;

FIG. 24 illustrates an example of updated contents of a path state data storage unit in the edge node with a node ID of A;

FIG. 30 illustrates example contents of a path state data storage unit in the edge node with a node ID of A after reception of alarm information;

FIG. 37 illustrates example contents of a path state data storage unit after update of transmit probabilities;

DESCRIPTION OF EMBODIMENTS

Figure 1:
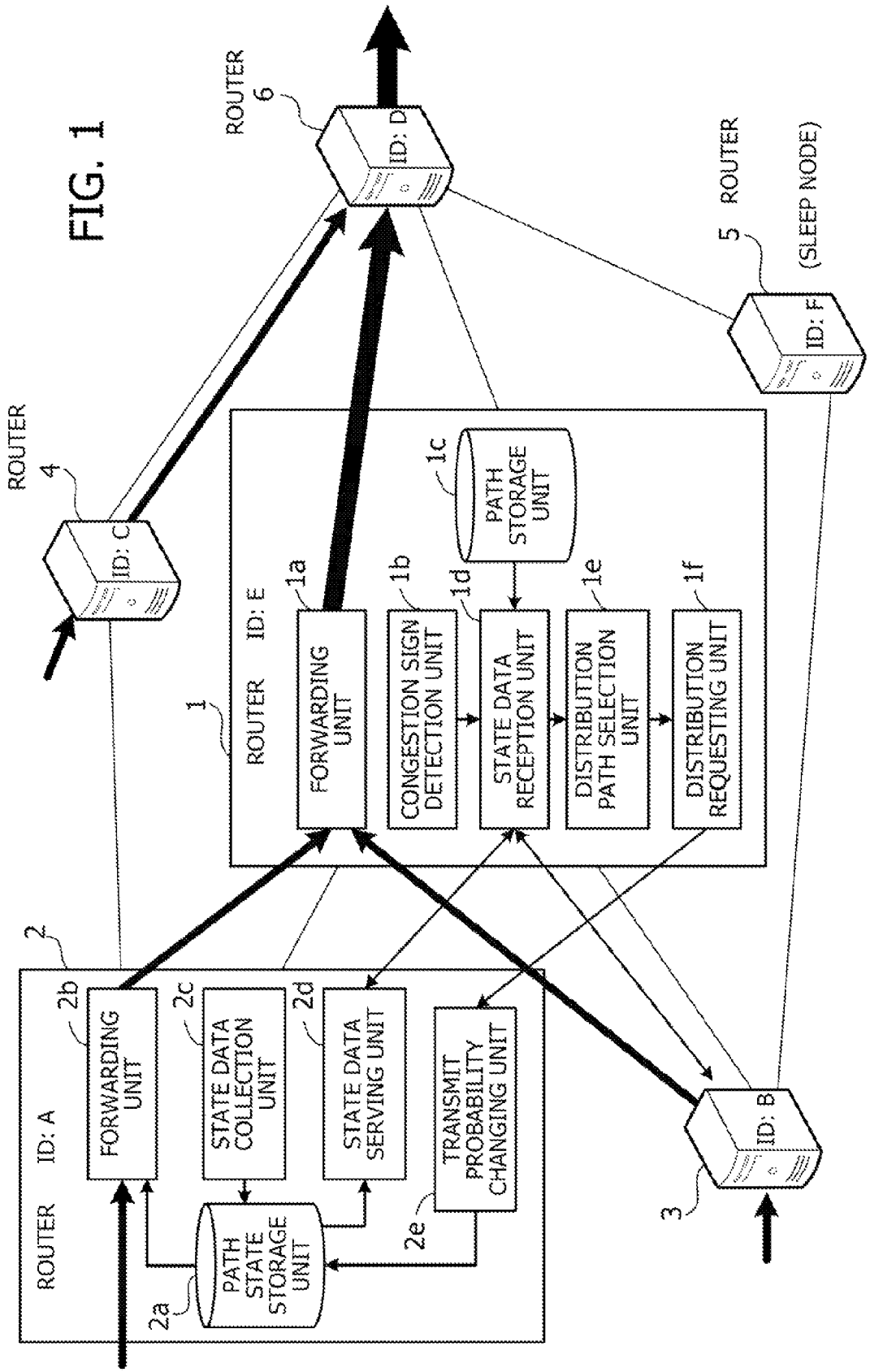
FIG. 1 is a functional block diagram of a first embodiment.

Preferred embodiments of the present invention will be described below with reference to the accompanying drawings, wherein like reference numerals refer to like elements throughout.

First Embodiment

FIG. 1 is a functional block diagram of a first embodiment. The example network illustrated in FIG. 1 includes a plurality of routers 1 to 6, each having an identifier (ID) to distinguish themselves from each other. For example, one router 1 is identified by its ID "E," and another router 2 is identified by its ID "A." Similarly, other routers 3, 4, 5, and 6 are identified by their IDs "B," "C," "F," and "D," respectively. The routers 1 to 6 may go into a power saving mode when there is no incoming traffic for a predetermined time. The power saving mode permits a router to reduce its power consumption by stopping some of the functions related to traffic forwarding operation. This description refers to the routers in power saving mode as "sleep nodes." For example, the router 5 in FIG. 1 is a sleep node.

The network illustrated in FIG. 1 can concentrate its traffic into a specific path when there are no particular signs of congestion. In the example of FIG. 1, three routers 2, 3, and 4 receive incoming traffic streams from their respective external sources and forward the received traffic streams to another portion of the network via routers 1 and 6. Here the router 1 functions as a relaying node which forwards traffic to another node. The first-mentioned three routers 2, 3, and 4 act as ingress nodes which accept incoming traffic. The router 6, on the other hand, serves as an egress node which outputs the received traffic. The routers 4 and 5 may also function as relaying nodes for other traffic streams (not illustrated).

It is noted that all the incoming traffic streams received by routers 2, 3, and 4 are finally consolidated into a single path. That is, the traffic streams entering routers 2 and 3 are forwarded to the router 6 via the router 1. The incoming traffic stream of another router 4 is forwarded directly to the same router 6. By concentrating such traffic streams into a particular path, the network allows more routers to move into a power saving mode, so that the power consumption of the entire network can be reduced.

When a sign of congestion is found in the path of such concentrated traffic, sleep nodes may have to return to normal mode again to distribute the traffic to a plurality of paths. However, if this distribution is done for all traffic streams running through the path, it would awake more sleep nodes than really necessary. Thus the first embodiment is designed to carefully select appropriate traffic to distribute, not to invite unnecessary increase of power consumption. To achieve this distribution control, each router has several functions described below.

To function as a relaying node, the router 1 has a forwarding unit 1a, a congestion sign detection unit 1b, a path storage unit 1c, a state data reception unit 1d, a distribution path selection unit 1e, and a distribution requesting unit 1f.

The forwarding unit 1a forwards an input traffic stream along a specific path that gives a forwarding order of traffic, i.e., in what order of routers the traffic is to be transferred. In the example of FIG. 1, the forwarding unit 1a is configured to receive input traffic streams from routers 2 and 3 and forward them to another router 6.

The congestion sign detection unit 1b measures the amount of traffic in each link extending to other routers so as to detect signs of congestion. For example, a link may experience a large amount of traffic that exceeds a predetermined threshold. The congestion sign detection unit 1b detects this link as exhibiting signs of congestion.

The router 1 has links to other routers 2, 3, and 6 in the network. The path storage unit 1c stores data describing the paths of traffic streams transferred via those links. For example, there are two traffic paths passing through the link coupling two routers 1 and 6. One path transports traffic via the routers 2, 1, and 6 in that order. Another path transports traffic via the routers 3, 1, and 6 in that order. The path storage unit 1c stores data records describing such paths.

The paths of traffic may be in different conditions or states, and the network includes a management apparatus to manage state data describing such path states. The state data reception unit 1d obtains state data records of paths from the management apparatus when a need arises to divert at least a part of a traffic stream transported via a specified link to a different path that does not include that specified link. For example, this specified link may be the link identified by the congestion sign detection unit 1b as exhibiting signs of congestion. The state data reception unit 1d obtains a state data record of the identified link from the management apparatus.

The state data reception unit 1d consults the path storage unit 1c when obtaining state data records. The state data reception unit 1d identifies a path of traffic that is transported via the above-noted specified link and designates the identified path as a target path. There may actually be two or more such target paths. When, for example, the link between the routers 1 and 6 is specified, the state data reception unit 1d finds two target paths associated with this link. That is, one path runs through the router 2, router 1, and router 6 in that order, and the other path runs through the router 3, router 1, and router 6 in that order.

The state data reception unit 1d then finds one or more paths that share their beginning and ending routers with one of the target paths and do not include the above-specified link. The state data reception unit 1d designates those paths as candidate paths. The state data reception unit 1d then obtains a state data record of each candidate path from a management apparatus that manages state data indicating the state of routers that forward traffic of candidate paths.

For example, the state data reception unit 1d may have registries of every path in the network. In this case, the state data reception unit 1d can determine candidate paths by itself. Alternatively, there may be a separate management apparatus that manages information about every path in the network. In that case, the state data reception unit 1d consults the management apparatus to find candidate paths, which share their beginning and ending routers with one of the target path but do not include the above-noted specified link. Still alternatively, there may be a plurality of management apparatuses that manage information about every path in the network in a distributed way. In this case, the state data reception unit 1d collects candidate paths from relevant management apparatuses. As an example implementation, each path may be managed by its beginning router. In this case, the state data reception unit 1d identifies the beginning router of a target path and then obtains candidate paths from the identified managing router.

Referring to the example of FIG. 1, the routers 2 and 3 serve as beginning routers of the two target paths mentioned above. The state data reception unit 1d thus obtains information about candidate paths from the routers 2 and 3. The state data reception unit 1d also receives from the same routers 2 and 3 relevant state data records indicating the state of routers that are supposed to forward traffic of the candidate paths.

To obtain candidate paths and their state data records from the routers 2 and 3, the state data reception unit 1d sends, for example, alarm information to each of the beginning routers 2 and 3 of the respective target paths. The alarm information indicates the beginning and ending routers of a relevant target path. In response, each beginning router 2 and 3 determines the paths whose beginning and ending routers match with those of the indicated target path. The beginning routers 2 and 3 thus return the determined candidate paths, together with their respective state data records.

The state data records may indicate, for example, the number of routers operating in power saving mode, of those located on a specific candidate path. The state data reception unit 1d obtains this number (referred to herein as "sleep node count") as part of a state data record. The state data records may also indicate an expected increase of power consumption of each router on a candidate path when the amount of traffic on that candidate path is increased by a unit amount of data. The state data reception unit 1d obtains such state data from relevant management apparatuses.

The distribution path selection unit 1e compares candidate paths with each other in terms of how other routers on a specific candidate path would change their states if a part of traffic on the specified link was routed to that specific candidate path. The distribution path selection unit 1e performs this comparison on the basis of the state data record of each candidate path determined by the state data reception unit 1d. The distribution path selection unit 1e then chooses a distribution path that exhibits the smallest increase of power consumption as a result of changes in the state of routers. For example, the distribution path selection unit 1e seeks a candidate path with the smallest number of routers in power saving mode (i.e., smallest sleep node count) and selects that candidate path as a preferred distribution path. That is, a larger number of sleep nodes on the path means a larger increase in the number of routers to be activated (i.e., change from power saving mode to normal mode) when the traffic in question is directed to that path. In terms of power consumption, however, it is advantageous to avoid such activation of routers. For this reason, the distribution path selection unit 1e selects a candidate path with the smallest number of sleep nodes as a preferred distribution path. The distribution path selection unit 1e may alternatively be configured to estimate power consumption of routers on each candidate path, assuming that the traffic is increased by a predetermined amount. The distribution path selection unit 1e then selects a candidate path with the smallest increase in the power consumption.

The distribution path selected by the distribution path selection unit 1e begins and ends with the same combination of routers as that of the given target path. The distribution requesting unit 1f sends a distribution request to the beginning router of the selected distribution path, so as to divert at least a part of the traffic on the target path to that distribution path. The distribution requesting unit 1f may repeat this distribution request at predetermined intervals while the congestion sign detection unit 1b keeps detecting signs of congestion in the specified link.

As mentioned above, the router 2 functions as an ingress node. To this end, the router 2 includes a path state storage unit 2a, a forwarding unit 2b, a state data collection unit 2c, a state data serving unit 2d, and a transmit probability changing unit 2e. These components provide functions described below.

The path state storage unit 2a stores a state data record of each router that forwards traffic in the network, together with information describing the forwarding paths of such traffic. The path state storage unit 2a further stores information about transmit probabilities associated with a plurality of paths that share both the beginning and ending routers with each other.

The forwarding unit 2b forwards incoming traffic from other network. During this course, the forwarding unit 2b distributes the traffic to different paths in the network of routers 1 to 6, according to transmit probabilities stored in the path state storage unit 2a.

The state data collection unit 2c collects state data from each router that forwards traffic in the network. The collected state data records indicate the state of individual routers. The state data collection unit 2c saves such state data records of routers in the path state storage unit 2a, together with information on their forwarding paths of traffic. For example, the state data collection unit 2c in the router 2 collects state data from other routers on a path to which the router 2 forwards traffic received from other network. As part of the state data, the state data collection unit 2c also collects information on the number of routers in power saving mode, of all those on each path of traffic. Alternatively, the state data collection unit 2c may collect, from routers on each path, information on how much their power consumption is expected to increase when the traffic rises by a unit amount of data.

The state data serving unit 2d transmits state data records in response to alarm information. For example, the state data serving unit 2d receives alarm information indicating the beginning and ending routers of target paths that involve a specified link to transport traffic. In response to the received alarm information, the state data serving unit 2d consults the path state storage unit 2a to find one or more paths which share their beginning and ending routers with any one of the target paths and do not include the specified link. The found paths are referred to as candidate paths. The state data serving unit 2d then transmits the state data records of those candidate paths back to the original sender of the alarm information.

The transmit probability changing unit 2e receives a distribution command specifying a distribution path to which at least a part of traffic on a target path is to be distributed. In response, the transmit probability changing unit 2e modifies information in the path state storage unit 2a to change the transmit probabilities for the target path and distribution path. For example, the transmit probability changing unit 2e reduces the transmit probability of traffic to the target path while increasing transmit probabilities of traffic to the distribution path.

While FIG. 1 illustrates detailed function blocks of two routers 1 and 2 representatively, other routers 4 and 5 serving as relaying nodes are also configured similarly to the router 1. Likewise, other routers 3 and 4 serving as ingress nodes are configured similarly to the router 2. The illustrated functions enable those routers 1 to 6 to distribute the traffic in an appropriate way.

Figure 2:
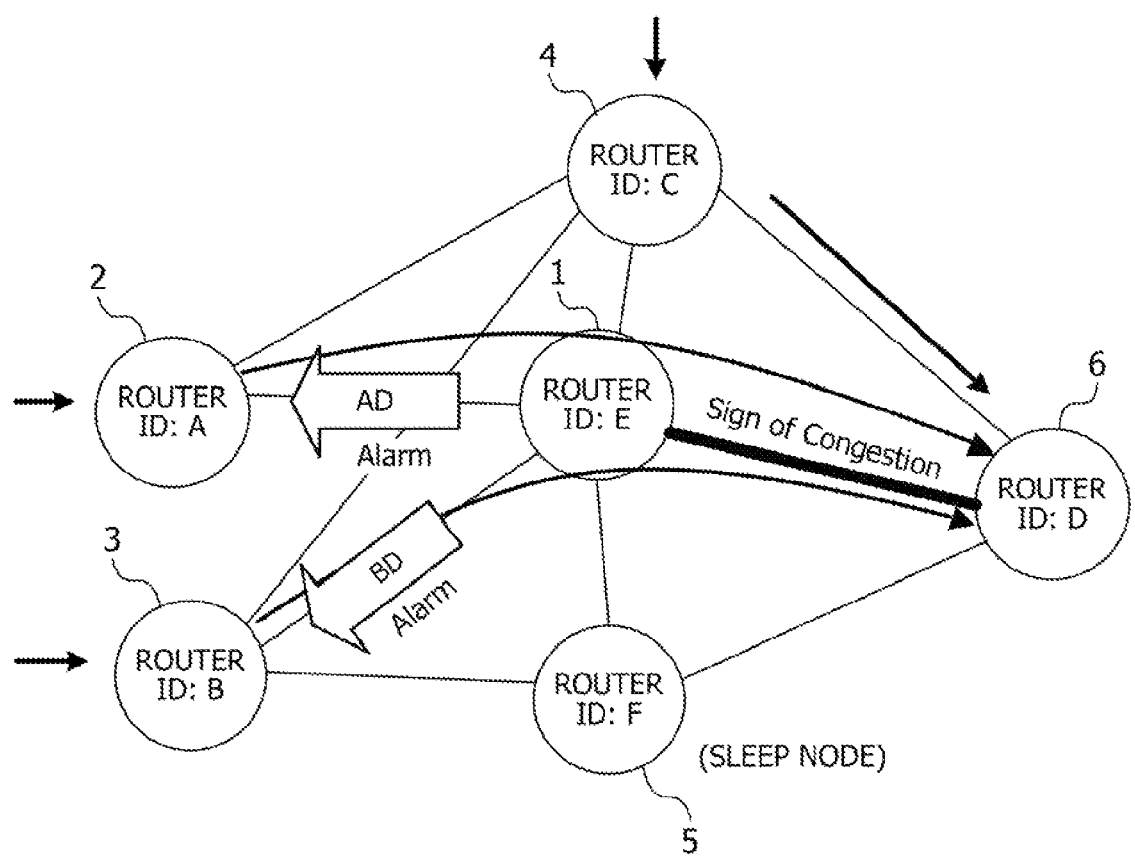
FIG. 2 illustrates a process executed when a sign of congestion is detected.

Suppose, for example, that a sign of congestion is detected in the link from the router 1 to the router 6 in FIG. 1. FIG. 2 illustrates a process executed when such a sign of congestion is detected by, for example, the congestion sign detection unit 1b in the router 1. It is noted that there are two traffic paths that go through the link of interest. That is, one path transports traffic via the routers 2, 1, and 6 in that order, the other path transports traffic via the routers 3, 1, and 6 in that order. These two paths are thus designated as target paths, and the state data reception unit 1d transmits alarm information to the beginning routers 2 and 3 of the respective target paths. Each message of alarm information indicates, for example, the beginning router and ending router of a particular target path. In the example of FIG. 2, one such message carries a piece of information "AD" to indicate that the path begins at a router 2 identified by ID "A" and ends at a router 6 identified by ID "D."

Figure 3:
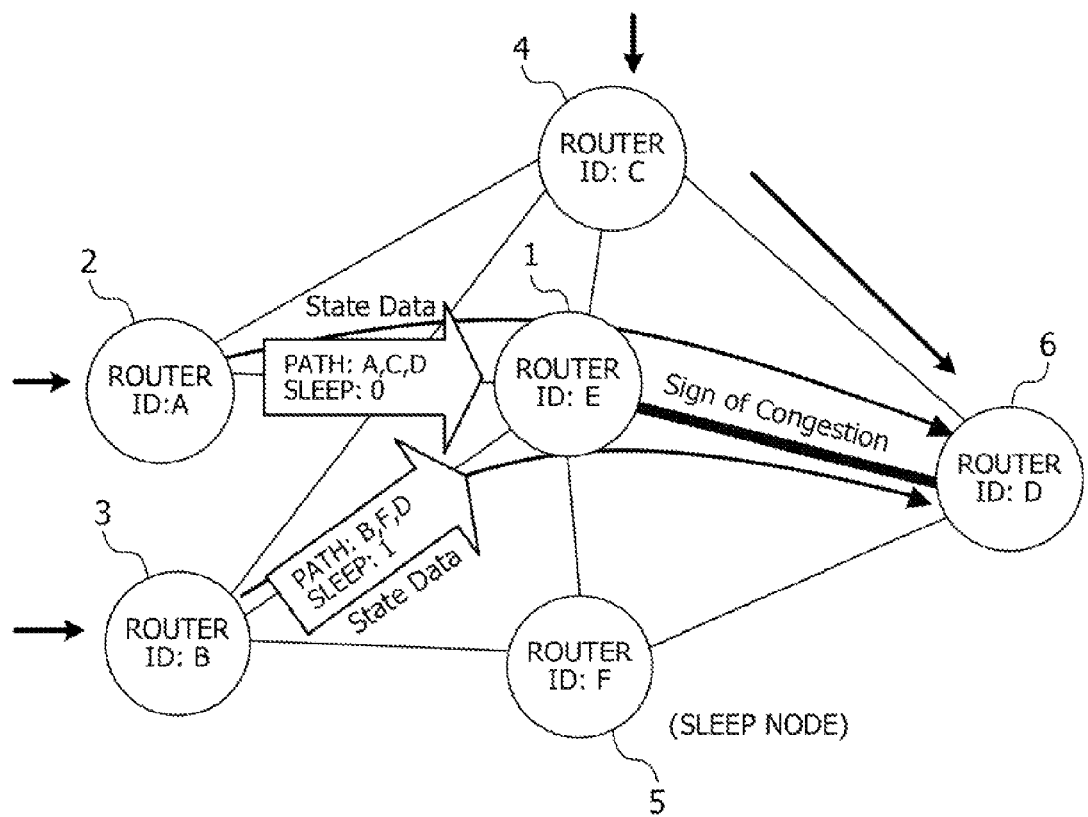
FIG. 3 illustrates a process that a router executes upon receipt of alarm information.

FIG. 3 illustrates how routers operate when alarm information is received. Upon receipt of alarm information, the receiving routers 2 and 3 send their respective candidate paths and state data records of those candidate paths back to the router 1. For example, the state data serving unit 2d in the router 2 sends a state data record of its candidate path, which actually indicates the number of sleep nodes on the path, as seen in the example of FIG. 3.

Based on the received information of candidate paths and their respective states, the distribution path selection unit 1e in the router 1 determines to which paths to distribute the traffic. In the example of FIG. 3, one candidate path (path BFD) proposed by the router 3 includes one sleep node, whereas another candidate path (path ACD) proposed by the router 2 has no sleep nodes. This means that the latter distribution path ACD is advantageous in terms of avoiding increase of power consumption. Accordingly, the distribution path selection unit 1e selects this path ACD as the distribution path, which causes the distribution requesting unit 1f to transmit a distribution request to the router 2.

Figure 4:
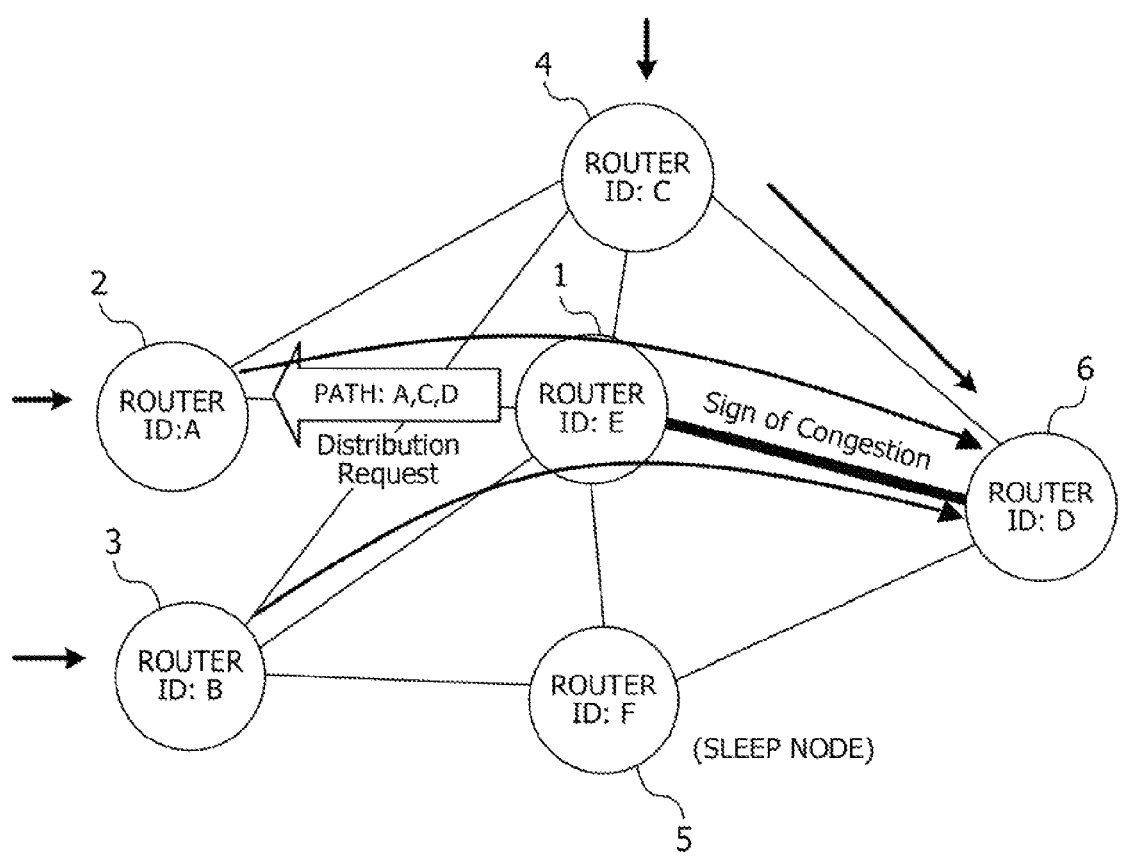
FIG. 4 illustrates transmission of a distribution request.

FIG. 4 illustrates transmission of a distribution request. The illustrated distribution request designates a specific distribution path to which the traffic of interest is to be distributed. According to this distribution request, the transmit probability changing unit 2e in the router 2 modifies transmit probabilities of the paths conveying traffic from the router 2 to the router 6. For example, the transmit probability changing unit 2e reduces the transmit probability of path AED, while raising that of path ACD. In the example of FIG. 4, the path ACD originally has a transmit probability of zero. The transmit probability changing unit 2e increases this to a value greater than zero and stores the modified transmit probabilities in the path state storage unit 2a. The forwarding unit 2b then applies new transmit probabilities to distribute traffic.

Figure 5:
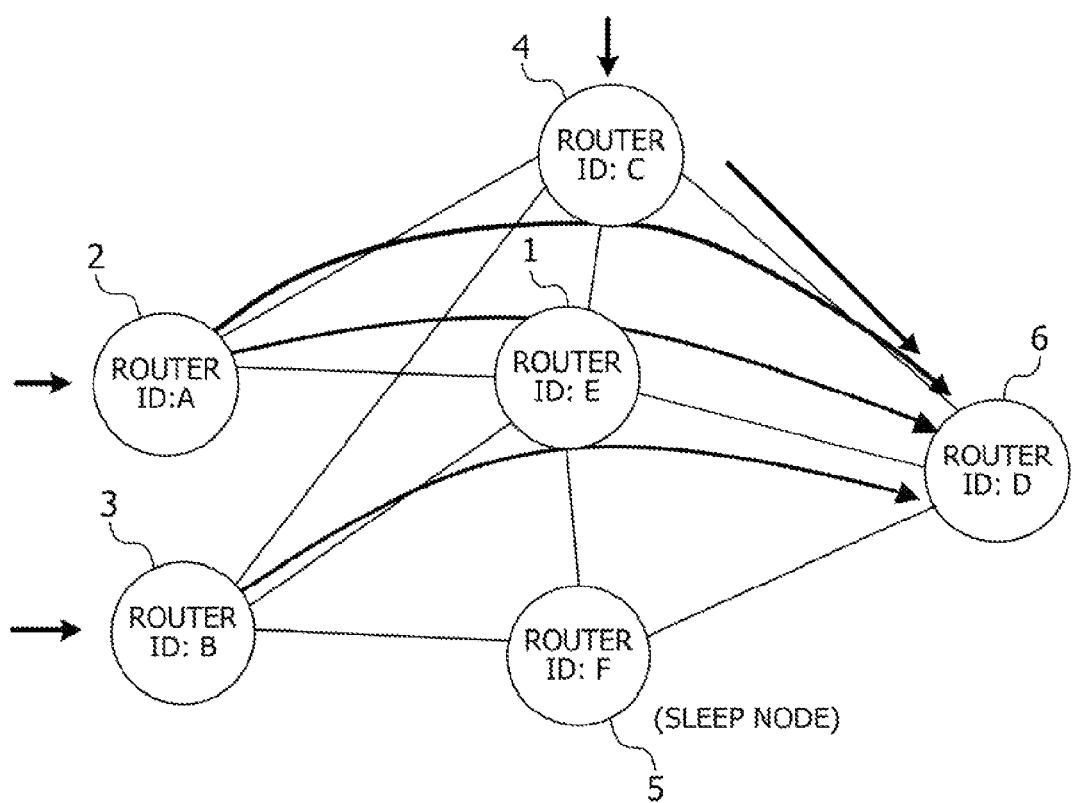
FIG. 5 illustrates distribution of traffic after transmit probabilities are changed.

FIG. 5 illustrates distribution of traffic after the transmit probabilities are changed. As can be seen from FIG. 5, the incoming traffic of the router 2 is now partly routed to path ACD because of its new transmit probability that is greater than zero. The link between routers 1 and 6 conveys a reduced amount of traffic, the reduction being the amount of traffic diverted to path ACD. This means that the link is relieved from its congestion.

As illustrated above, the first embodiment is designed to send a distribution request only to the ingress node of a distribution path selected from among candidate paths, rather than sending distribution requests to the ingress nodes of all traffic streams using a specific link that may be congested.

Specifically, the first embodiment evaluates the candidates to select appropriate distribution paths of network traffic, so as to minimize the use of paths that include sleep nodes.

The network nodes may transport traffic either in concentration mode where the traffic is concentrated to a specific path or in distribution mode where traffic is distributed to a plurality of paths. The above-described first embodiment only permits a limited number of ingress nodes to migrate from concentration mode to distribution mode in the case where a sign of congestion is detected. In other words, the first embodiment avoids awaking more sleep nodes than necessary, thus making it possible to minimize the increase of power consumption.

The first embodiment described above includes a state data collection unit 2c and a state data serving unit 2d only in the routers serving as ingress nodes. The first embodiment is, however, not limited to that specific configuration. The above-described functions of the state data collection unit 2c and state data serving unit 2d may be implemented in other devices than the routers serving as ingress nodes. For example, the network may employ a management apparatus that supervises the entire network, including the paths of traffic and the state of each router constituting these paths. In this case, the management apparatus provides processing functions of the state data collection unit 2c and state data serving unit 2d, as well as storage functions for state data of the path state storage unit 2a. Also in this case, the router 1 can obtain candidate paths and their respective state data records collectively from the management apparatus.

Second Embodiment

This section describes a second embodiment which provides several system-specific functions for implementation purposes, in addition to the functions discussed above for the first embodiment. For example, the second embodiment is configured such that each ingress node collects state data of its relevant paths at regular intervals. Path state data includes information indicating the number of sleep nodes on each individual path. The second embodiment permits ingress nodes to autonomously keep track of the dynamically changing condition (e.g., sleep node counts) of the network, without the need for providing a server to manage the entire network.

The second embodiment is also configured to control ingress nodes in distribution mode, such that the amount of outgoing traffic directed to new paths will increase step by step. This feature is to prevent some links other than the link experiencing congestion from being clogged with the directed traffic.

Figure 6:
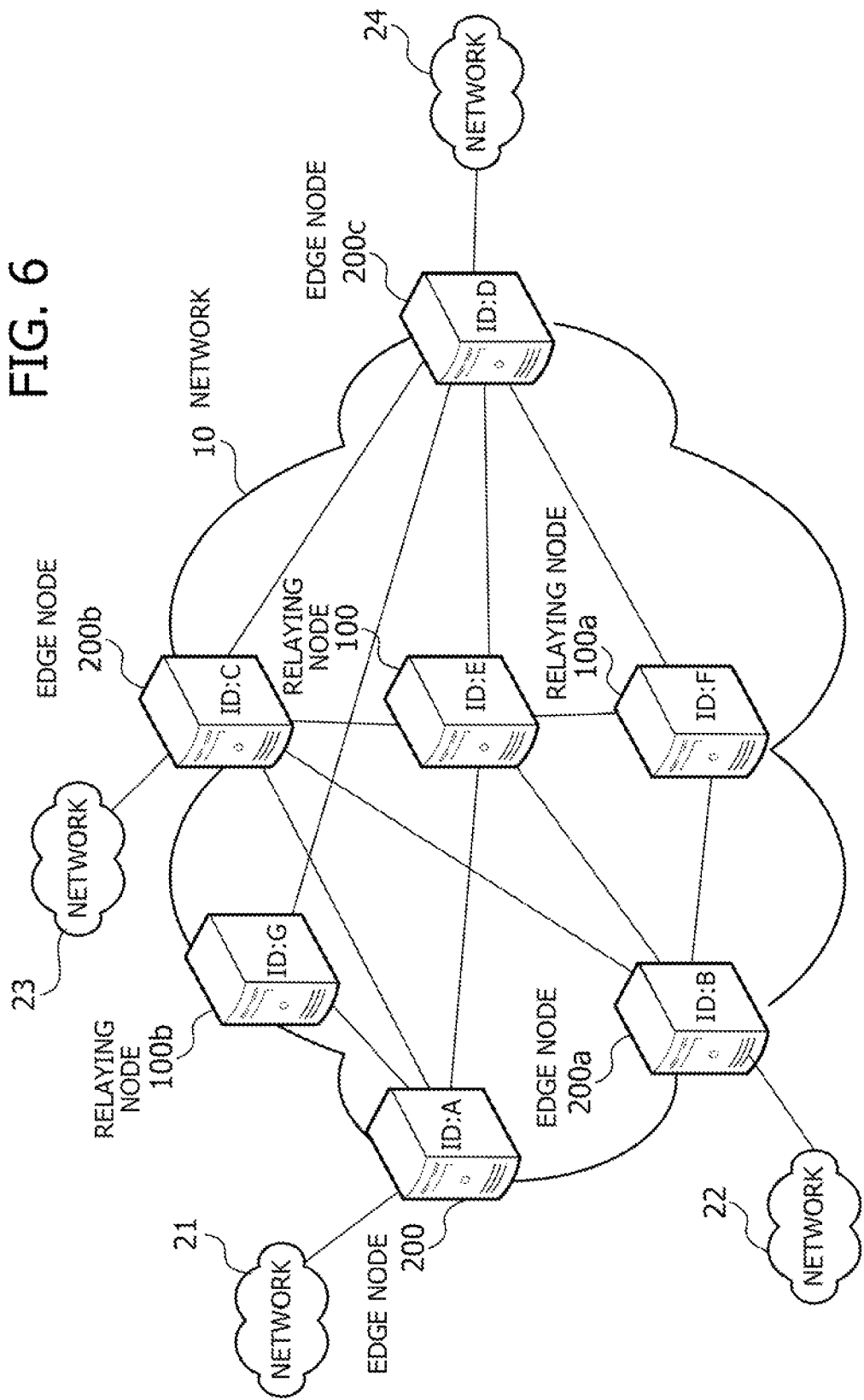
FIG. 6 illustrates an example system configuration according to a second embodiment.

FIG. 6 illustrates an example system configuration according to the second embodiment. The illustrated network 10 is formed from a plurality of nodes, which are actually routers. The nodes may be divided into the following two groups: relaying nodes 100, 100a, and 100b and edge nodes 200, 200a, 200b, and 200c. The relaying nodes 100, 100a, and 100b forward traffic within the network 10. The edge nodes 200, 200a, 200b, and 200c, on the other hand, transfer incoming traffic from other network to the network 10, as well as outgoing traffic from the network 10 to other network, besides forwarding local traffic within the network 10.

Each node has a specific ID for identification in the network 10. For example, the edge node 200 is identified by its ID "A." Likewise, other edge nodes 200a, 200b, and 200c are identified by their respective IDs "B," "C," and "D." The relaying node 100 is identified by its ID "E." Likewise, other relaying nodes 100a and 100b are identified by their respective IDs "F" and "G."

The relaying node 100 is coupled to edge nodes 200, 200a, 200b, and 200c and one relaying node 100a. The relaying node 100a is coupled to edge nodes 200a and 200c, as well as to the relaying node 100. The relaying node 100b is coupled to edge nodes 200 and 200c.

The edge node 200 is coupled to another network 21, as well as to the edge node 200b and relaying nodes 100 and 100b. The edge node 200a is coupled to yet another network 22, as well as to the edge node 200b and relaying nodes 100 and 100a. The edge node 200b is coupled to still another network 23, as well as to the edge nodes 200, 200a, and 200c and relaying node 100. The edge node 200c is coupled to still another network 24, as well as to the edge node 200b and relaying nodes 100, 100a, and 100b. The transmission path between each two nodes is called a "link."

In the network 10, the relaying nodes 100, 100a, and 100b and edge nodes 200, 200a, 200b, and 200c select which path to use to forward their traffic on, for example, an individual packet basis. The routers at edge nodes of the network 10 also work as relaying nodes when they transport packets within the network 10.

Each node goes into sleep mode when there is no incoming traffic for a specified time. The sleep mode, a kind of power saving mode, allows a node to stop many of its functions and thus reduces the power consumption of the node, while keeping the node ready for forwarding control packets. As an alternative power saving mode, a node may go into low power mode when there is no incoming traffic for a specified time, so that the node operates at a lower frequency.

Figure 7:
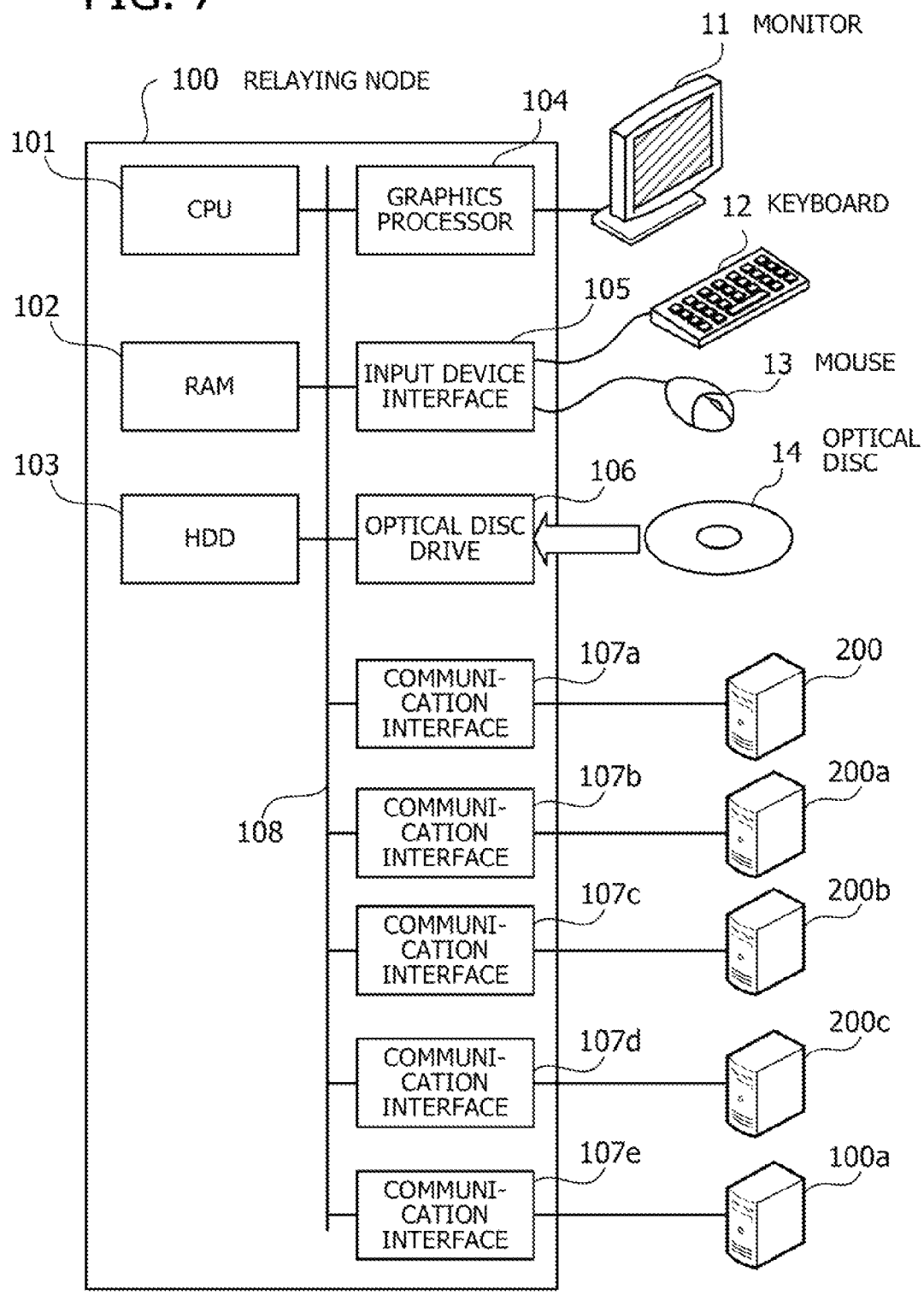
FIG. 7 illustrates an a typical hardware configuration of relaying nodes according to the second embodiment.

FIG. 7 illustrates an a typical hardware configuration of relaying nodes according to the second embodiment. The illustrated relaying node 100 has a central processing unit (CPU) 101 to control the entire system of the node. The CPU 101 is coupled to a random access memory (RAM) 102 and other various peripheral devices on a bus 108. The RAM 102 serves as primary storage of the relaying node 100. Specifically, the RAM 102 is used to temporarily store the whole or part of operating system (OS) programs and application programs that the CPU 101 executes, in addition to other various data objects that it manipulates at runtime.

The peripheral devices on the bus 108 include a hard disk drive (HDD) 103, a graphics processor 104, an input device interface 105, an optical disc drive 106, and communication interfaces 107a, 107b, 107c, 107d, and 107e. The HDD 103 writes and reads data magnetically on its internal disk media. The HDD 503 serves as secondary storage of the control node 100 to store program and data files of the operating system and applications. Flash memory and other semiconductor memory devices may also be used as secondary storage, similarly to the HDD 103.

The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display.

The input device interface 105 is coupled to input devices such as a keyboard 12 and a mouse 13 and supplies signals from those devices to the CPU 101. The mouse 13 is a pointing device, which may be replaced with other kinds of pointing devices such as touchscreen, tablet, touchpad, and trackball.

The optical disc drive 106 reads out data encoded on an optical disc 14, by using a laser light. The optical disc 14 is a portable data storage medium, the data recorded on which can be read as a reflection of light or the lack of same. The optical disc 14 may be a digital versatile disc (DVD), DVD-RAM, compact disc read-only memory (CD-ROM), CD-Recordable (CD-R), or CD-Rewritable (CD-RW), for example.

One communication interface 107a is coupled to the edge node 200 so as to exchange data therewith. Another communication interface 107b is coupled to the edge node 200a so as to exchange data therewith. Yet another communication interface 107c is coupled to the edge node 200b so as to exchange data therewith. Still another communication interface 107d is coupled to the edge node 200c so as to exchange data therewith. Still another communication interface 107e is coupled the relaying node 100a so as to exchange data therewith.

While the relaying node 100 of FIG. 7 has a graphics processor 104, optical disc drive 106, monitor 11, keyboard 12, and mouse 13, those devices may actually be omitted. When this is the case, the relaying node 100 can be managed from a remote location by using some terminal device configured to make access to the relaying node 100 through, for example, a serial interface or other communication interface for control purposes.

The above-described hardware platform may be used to realize the processing functions of the second embodiment. While FIG. 7 illustrates an example hardware configuration of the relaying node 100 alone, the same configuration can be applied to other relaying nodes 100a and 100b, as well as to the edge nodes 200, 200a, 200b, and 200c.

In the rest of this description, the term "flow" is used to refer to a stream of data traffic that enters a specific edge node of the network and goes out of another specific edge node. There are as many flows as the number of combinations of an input edge node and an output edge node. Each flow of traffic may take one or more paths to reach the destination. In other words, a single flow of incoming traffic may be delivered over a single path or a plurality of distributed paths. Here the edge node that receives incoming traffic is referred to as the ingress node. The edge node that outputs delivered traffic is referred to as the egress node.

The second embodiment assumes that the possible paths of a flow have previously been defined in the ingress node receiving that flow. When packets of a traffic stream is received, the ingress node first identifies the flow from the ingress port, source node, and destination node of the received packets. The ingress node then assigns the traffic to previously defined paths relevant to the flow. That is, the traffic entered an ingress node is transported to an egress node along the path (or paths) that is determined at the ingress node.

As seen from the above, each traffic flow is associated with a specific combination of ingress and egress nodes, and a specific path has been determined for that combination. Relaying node forwards traffic of such a flow from node to node on the flow-specific path. This path control method, i.e., determining the path of traffic at its ingress node, is referred to herein as a "path-designated" method. According to such path-designated traffic control, the relaying nodes forward traffic to the specified path, without diverting it to any other paths.

The input edge nodes, on the other hand, distribute traffic based on the path-designated traffic control by using, for example, traffic attractivities for individual paths that are previously determined. Traffic attractivities may be used to concentrate traffic into a specific path. That is, a larger traffic attractivity is given to the path so as to attract a larger amount of traffic. For example, relaying nodes on a specific path calculate traffic attractivities, tracing the path backward from egress node to ingress node. Each relaying node assigns traffic attractivities to the links coupled to neighboring nodes in downstream locations (i.e., located closer to the egress node), such that the link carrying a larger amount of traffic is given a larger traffic attractivity. The determined traffic attractivities may propagate to nodes at upward locations. That is, each relaying node also assigns a larger traffic attractivity to a link reaching a neighboring node in a downstream location which has passed a larger traffic attractivity. In this way, traffic attractivities are calculated at relaying nodes on the path, and finally, the ingress node calculates traffic attractivities of its links coupled to neighboring nodes in downstream locations, based on the amount of traffic of each such link as well as on the traffic attractivities passed from those neighboring nodes. The calculation results indicate the traffic attractivity of the path. The ingress node of a flow calculates traffic attractivities of previously determined paths for that flow at regular intervals and stores calculation results in a storage device such as RAM. When there is incoming traffic directed to a specific egress node, the ingress node distributes the traffic to one or more paths reaching the egress node, at appropriate probabilities associated with the traffic attractivities of those paths.

Referring again to the system configuration of FIG. 6, an example of path-designated traffic control will be described below. It is assumed, for example, that one edge node 200 is receiving a traffic stream addressed to another edge node 200c, which is referred to as "flow AD." It is also assumed that yet another edge node 200a is receiving a traffic stream similarly addressed to the edge node 200c, which is referred to as "flow BD." It is further assumed that still another edge node 200b is receiving a traffic stream similarly addressed to the edge node 200c, which is referred to as "flow CD."

Regarding flow AD, the ingress edge node 200 has three paths to reach the egress edge node 200c. One path ("path ACD") passes through the edge node 200b. Another path ("path AED") passes through a relaying node 100. Yet another path ("path AGD") passes through another relaying node 100b. The ingress edge node 200 distributes the received traffic stream to those different paths according to the probabilities associated with their respective traffic attractivities.

Regarding flow BD, the ingress edge node 200a has two paths to reach the egress edge node 200c. One path ("path BED") passes through a relaying node 100, and the other path ("path BFD") passes through another relaying node 100a. The ingress edge node 200a distributes the received traffic stream to those different paths according to the probabilities associated with their respective traffic attractivities.

Regarding flow CD, the ingress edge node 200b has only one path ("path CD") to reach the egress edge node 200c with no intervening nodes. Accordingly, all the incoming traffic of flow CD that the edge node 200b receives makes its way to this path CD.

The link from the relaying node 100 to the edge node 200c is referred to as "link ED." This link ED conveys both flow AD and flow BD, which leads to an increased traffic attractivity of the relaying node 100. The increased traffic attractivity then propagates from the relaying node 100 to each of the edge nodes 200 and 200a. This results in, for example, a higher traffic attractivity of path AED than path ACD. Accordingly, the ingress edge node 200 recalculates distribution probabilities for flow AD, such that the entire traffic from the ingress edge node 200 to the egress edge node 200c will concentrate into path AED. Similarly, the traffic of flow BD also concentrates into path BED.

Figure 8:
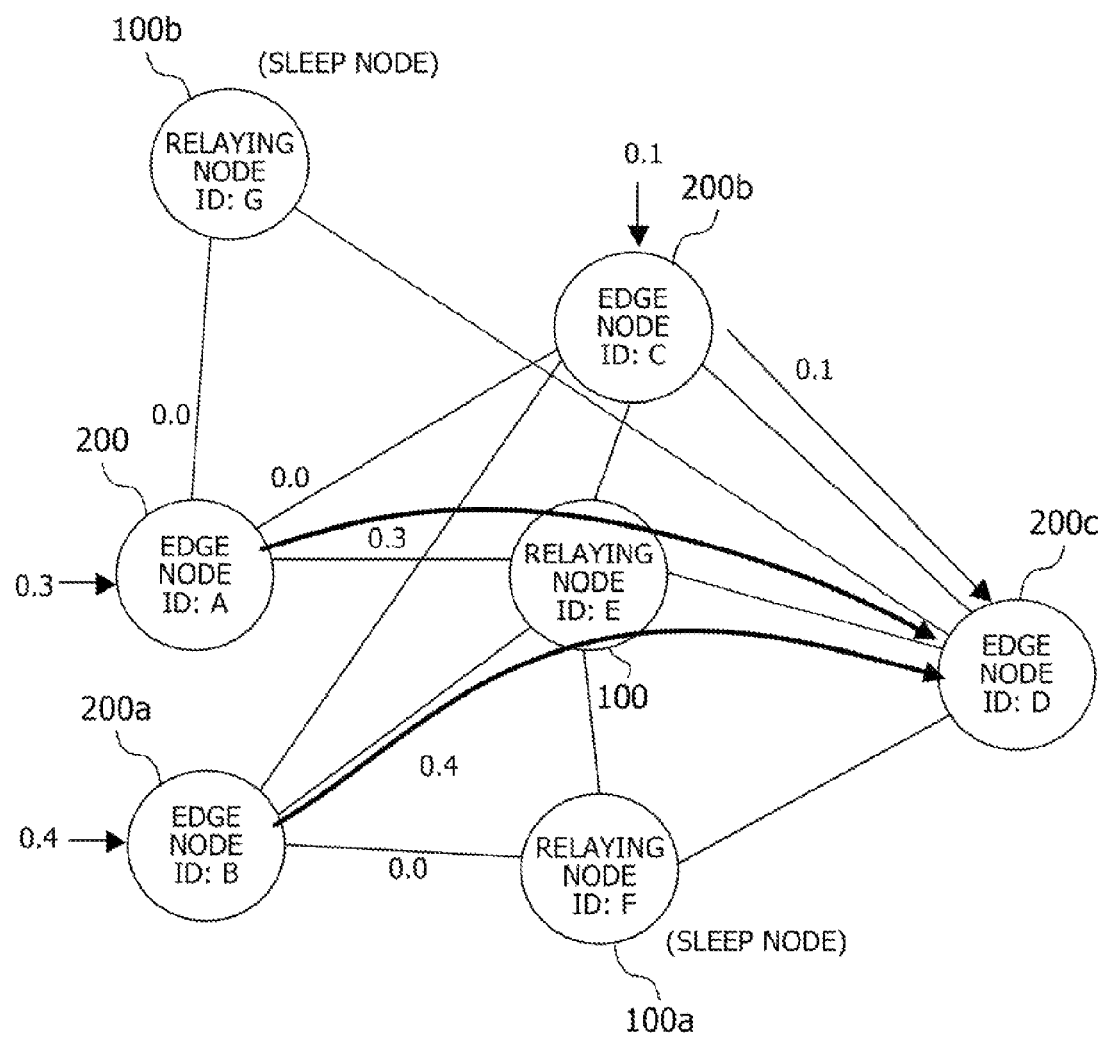
FIG. 8 illustrates an example of concentration of traffic.

FIG. 8 illustrates an example of concentration of traffic. It is noted that, as a result of concentration of traffic, two relaying nodes 100a and 100b have no through-traffic. The absence of through-traffic enables two relaying nodes 100a and 100b to go into sleep mode. The total power of the network can therefore be reduced by setting those relaying nodes 100a and 100b to sleep mode. For such power saving techniques, the applicants of this patent application filed Japanese Patent Application No. 2009-49139, which is published as Japanese Patent Laid-open Publication No. 2010-206467. The applicants also filed a United States patent application, which is published as United States Patent Application No. 2010/0226251. Further, the applicants and other three researchers published similar power saving techniques in the following paper: Akiko Yamada et al., "A Study for Green Network (3)—ECO Routing—," Proceedings of the IEICE General Conference, The Institute of Electronics, Information and Communication Engineers (IEICE), Mar. 4, 2009, 2009_Communications (2), pp. 252.

As can be seen from the example of FIG. 8, two flows concentrate into a single path. Specifically, the measurements of traffic in each path are as follows: 0.0 in path ACD, 0.3 in path AED, 0.4 in path BED, 0.0 in path BFD, and 0.1 in path CD, where the capacity of each link is normalized to 1.0.

Under the traffic-concentrated condition as in FIG. 8, the link running from the relaying node 100 to the edge node 200c (i.e., link ED) carries all the traffic of flow AD and flow BD. Suppose now that there is an increase in the amount of incoming traffic to one edge node 200 or 200a. The network nodes monitor the traffic volume of each link to check whether the measurements indicate any excessive amount of traffic with respect to the maximum capacity of links. Specifically, each node may compare the measurements of traffic with a specific congestion detection threshold. In the present context, the sum of traffic volumes of flow AD and flow BD may approach the link capacity of link ED. This means that there is a chance of congestion in that link ED. The link ED is then designated as a target link for subsequent congestion control. To avoid congestion, a part of the traffic on the target link has to be distributed to other paths.

More specifically, congestion control is performed as follows. Upon detection of a possible congestion situation, the detecting node sends alarm information to ingress nodes of the paths that are currently supplying traffic into the target link. Then in response to the alarm information, the ingress nodes stop the concentration of traffic and reconfigure the paths to distribute the traffic.

If, however, all such ingress nodes begin to distribute their traffic at a time, it would invite an overly large increase of power consumption. In the example illustrated in FIG. 8, there is a possibility of congestion in link ED due to an increase in the traffic of flow AD and flow BD. If alarm information was sent in this case to all ingress nodes of flows passing through link ED, the relaying nodes 100a and 100b in sleep mode would both change their state to normal mode.

More specifically, the alarm information in the above case is sent over the path AED carrying flow AD and the path BED carrying flow BD, thus reaching their respective ingress edge nodes 200 and 200a. Upon receipt of the alarm information, the edge node 200 changes the three paths of flow AD (i.e., path AED, path ACE, path AGD) from concentration mode to distribution mode. That is, the edge node 200 reduces the traffic transmit probability of path AED, from which the alarm information has come, while raising the transmit probabilities of other paths ACD and AGD. By diverting a part of the traffic to paths ACD and AGD in this way, the edge node 200 distributes the traffic over a plurality of paths, thus alleviating the load on path AED including link ED. As a result of this change, a relaying node 100b wakes up from sleep mode and begins working in normal mode to forward the newly created through traffic.

Similarly to the edge node 200, another edge node 200a reduces the transmit probability of path BED carrying flow BD, while raising that of path BFD. This change awakes another relaying node 100a from sleep mode, and the relaying node 100a begins working in normal mode to forward the newly created through traffic.

As can be seen from the above example, the power consumption of the network as a whole would be increased if every sleep node moves from sleep node to normal mode. For the purpose of congestion control of a specified link, however, it is not always necessary to wake all sleep nodes up and make them share the traffic load of flows carried by that link. Rather, it may be sufficient to divert only a part of the flows in question to some other path. Referring again to the example of FIG. 8, the observed possibility of congestion in link ED may be overcome by distributing the load only at the edge node 200. If, for example, the edge node 200 can redirect a sufficiently large part of the traffic of flow AD to path ACD, the network may be able to avoid congestion in link ED without the need for changing the traffic of flow BD currently concentrated in path BED. In this case, the relaying node 100a is allowed to stay in sleep mode, thus avoiding increase of power consumption. The edge node 200b, on the other hand, has already been active because of the presence of flow CD and thus can handle the additional traffic directed into path ACD with a smaller increase of power consumption, in comparison with the case of activating a sleep node into normal mode.

The edge node 200 may also be configured to select one or some of the known paths and selectively distribute the traffic in response to alarm information, rather than distributing traffic to all those known paths. This option is expected to enhance the feature of power saving. Referring to the example of FIG. 8, the edge node 200 could distribute the traffic of flow AD to path AED, path ACD, and path AGD. This action would, however, awake the relaying node 100b and thus increase the power consumption. It would be possible, on the other hand, to keep the relaying node 100b in sleep mode if the edge node 200 is configured to respond to alarm information by distributing traffic to a limited number of paths (e.g., only to path ACD).

In view of the above, the congestion control according to the second embodiment is designed not to disturb the sleep nodes as much as possible even when a possibility of congestion is detected. The description will now focus on the functions and processing operations to realize the proposed congestion control. It is noted that the description of the second embodiment uses the following terms:

(a) Link Capacity: The maximum amount of traffic that can be transported by a specific link.

(b) Link Usage Ratio: The quotient of the traffic volume on a specific link divided by the link capacity.

(c) Target Link Capacity: A target value of traffic volume on a specific link, which is used to control the link traffic and thus determined with an appropriate safety margin against the maximum link capacity so as not to cause congestion.

(d) Target Ratio: The quotient of the target link capacity divided by the link capacity. Routers are supposed to control the distribution of traffic in a coordinated way, so that the link usage ratio of each link will not exceed the target ratio.

(e) Control Value: The link usage ratio increases as more traffic is produced. In order to maintain this link usage ratio within the limit of target ratio, it is necessary to invoke congestion control some time before the link usage ratio reaches the target ratio. Control value is used to determine a threshold for invoking congestion control.

(f) Control Start Threshold: The threshold of link usage ratio to trigger the congestion control. For example, this threshold is calculated as follows.

$$\text{Control Start Threshold} = \text{Target Ratio} - \text{Control Value} \quad (1)$$

Deviation: The difference between target ratio and link usage ratio. This difference is calculated as follows.

$$\text{Deviation} = \text{Target Ratio} - \text{Link Usage Ratio} \quad (2)$$

The second embodiment uses the above values and parameters to execute congestion control. The process of congestion control includes detecting signs of congestion, determining whether to continue transmission of alarm information for avoidance of congestion, and the like. To this end, the ingress node of each flow is designed to measure the traffic volume of that flow at predetermined intervals. Based on the measurements of traffic volume, the nodes calculate link usage ratios. When some specific link exhibits a link usage ratio exceeding a given control start threshold (=Target Ratio−Control Value), it is interpreted as a sign of congestion in that link. The link is then designated as a target link for congestion control.

Upon detection of a sign of congestion, the detecting node invokes congestion control for the target link. More specifically, the detecting node produces alarm information and sends it out as a control packet to the ingress node of each traffic stream passing through the target link, so that the packet traces back the path to the ingress node. The receiving ingress nodes regard this alarm information as a request for nomination of candidate paths for the traffic passing through the target link. Such alarm information is transmitted repetitively unless the link usage ratio falls below the control start threshold of congestion control.

Figure 9:
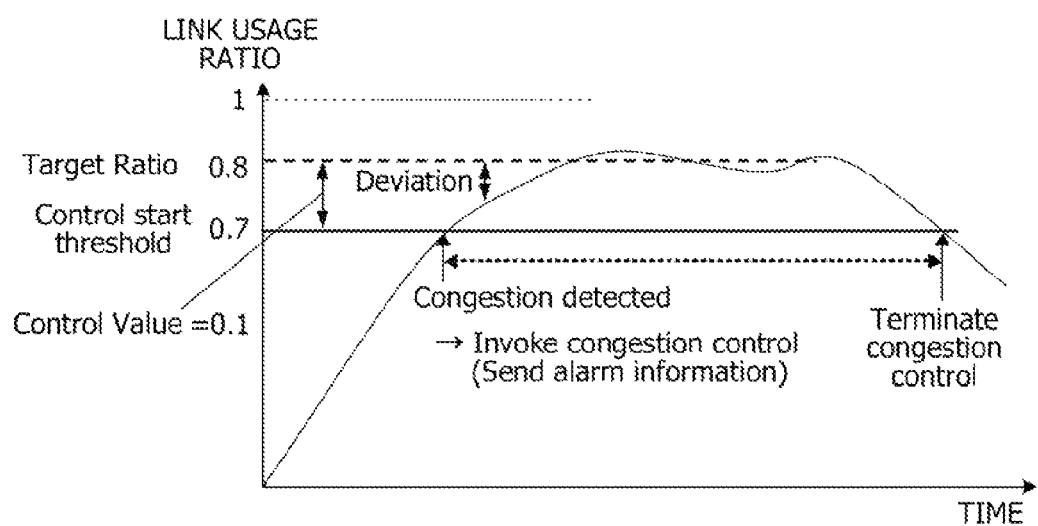
FIG. 9 illustrates how alarm information is transmitted depending on the variations of link usage ratio.

FIG. 9 illustrates how alarm information is transmitted depending on the variations of link usage ratio, where the horizontal axis represents time and the vertical axis represents link usage ratio. As seen in the example of FIG. 9, the link usage ratio increases with time, which invokes congestion control when it reaches a control start threshold. The congestion control process, when invoked, transmits alarm information. The increase rate of link usage ratio is gradually reduced as a result of the congestion control and its repetitive transmission of alarm information, and then the link usage ratio begins decreasing. The congestion control is finished when the link usage ratio falls below the control start threshold, and the repetitive transmission of alarm information is terminated accordingly.

Here a target ratio has been determined as an upper limit of link usage ratio to avoid congestion. According to the congestion control of the present embodiment, the amount of traffic distribution is increased gradually. This means that the link usage ratio is not expected to drop soon after the beginning of congestion control operation. For this reason, the control start threshold is set to be somewhat lower than the target ratio, and this difference is given as a control value. Congestion control is started when the link usage ratio exceeds such a control start threshold. Although the link usage ratio may still increase for a while, the congestion control can finally stop the increasing link usage ratio at near the target ratio.

As noted above, the difference between target ratio and link usage ratio is referred to as a deviation. The current deviation is used to calculate an alarm value (e.g., restriction ratio) as part of alarm information. For example, the alarm information is given a larger alarm value when the deviation exhibits a larger increase. Ingress nodes use the alarm value in the received alarm information to determine in what ratios the traffic should be distributed. For example, the alarm value indicates a restriction ratio, i.e., the ratio of a new transmit probability to the current transmit probability of traffic directed to the target path.

The ingress node of each flow is supposed to propose candidates for distribution paths in response to alarm information. To achieve this, the ingress node performs path state data collection in advance. The path state data collection is a process executed by the ingress node of a specific flow to collect information about the state of links and routers constituting each path of that flow. By executing this process, the ingress node of a flow manages a plurality of paths to the egress node and their condition. More specifically, the ingress node sends a state collection packet to each path on a regular basis. The state collection packet carries data items such as sleep node count, path vacancy, and power consumption parameters. Once placed on a specific path, the state collection packet collects values of those data items at each router that it visits along the path. When the state collection packet reaches its intended egress node, the packet is reflected back to the source ingress node, so that the ingress node can obtain the sleep node count, path vacancy, and power consumption parameter of the path. The following will provide details of those data items collected by a state collection packet.

(a) Path Vacancy: This value indicates how much more traffic can be routed to the path in question. The path vacancy is determined on the basis of the vacancy of each link on the path. More specifically, the vacancy of a link is calculated as follows.

$$\text{Link Vacancy} = \text{Link Capacity} \times \text{Target Ratio} - \text{Link Traffic Volume} \quad (3)$$

It is noted that the link vacancy is set to zero when this formula (3) gives a negative value. Also, in the case where different links on a path exhibit different link vacancies, the minimum value is chosen as the vacancy of that entire path. It is also noted that a link may be shared by a plurality of flows, in which case the link vacancy would be used repetitively in calculation of path vacancies. For this reason, the calculated amounts of path vacancies are mere estimates at the time of state data collection and not necessarily guaranteed. That is, there is no guarantee that the path will not go into congestion when its traffic is increased by the calculated amount.

(b) Path Power Consumption Parameter: This value indicates the total increase of power consumption at all nodes on the path in question when the traffic over the path is increased by a unit traffic volume. The path power consumption parameter is determined on the basis of power consumption parameters of individual nodes on the path in question. The power consumption parameter of a node indicates an expected increase of power consumption of the node when the traffic is increased by a unit amount of traffic. The path power consumption parameter is calculated as the sum of power consumption parameters of relaying nodes on the path.

If the power consumption parameters of all nodes on the path never change regardless of total traffic volume, the collection of those power consumption parameters has only to be performed once. Some nodes may, however, change their power consumption parameters under the effect of total traffic volume. If there is at least one such node on the path, the power consumption parameters are collected each time a state collection packet is transmitted.

(c) Sleep Node Count: This value represents the number of relaying nodes in sleep mode on a specific path. Instead of counting the number of such sleep nodes, it may be possible to accumulate the amount of increase in the power consumption which is caused by awaking sleep nodes. In this case, the decision of a distribution path would not take the sleep node counts into consideration. It is noted that the amount of a power increase due to transition from sleep state to active state is invariant and much larger than the one caused by increased traffic load. For this reason, the second embodiment is designed to collect sleep node counts separately from power consumption parameters, and determine distribution paths on the basis of the number of sleep nodes in preference to the power consumption parameters.

The following section will now describe several functions implemented in the routers to execute path state data collection and congestion control when a sign of congestion is detected.

Figure 10:
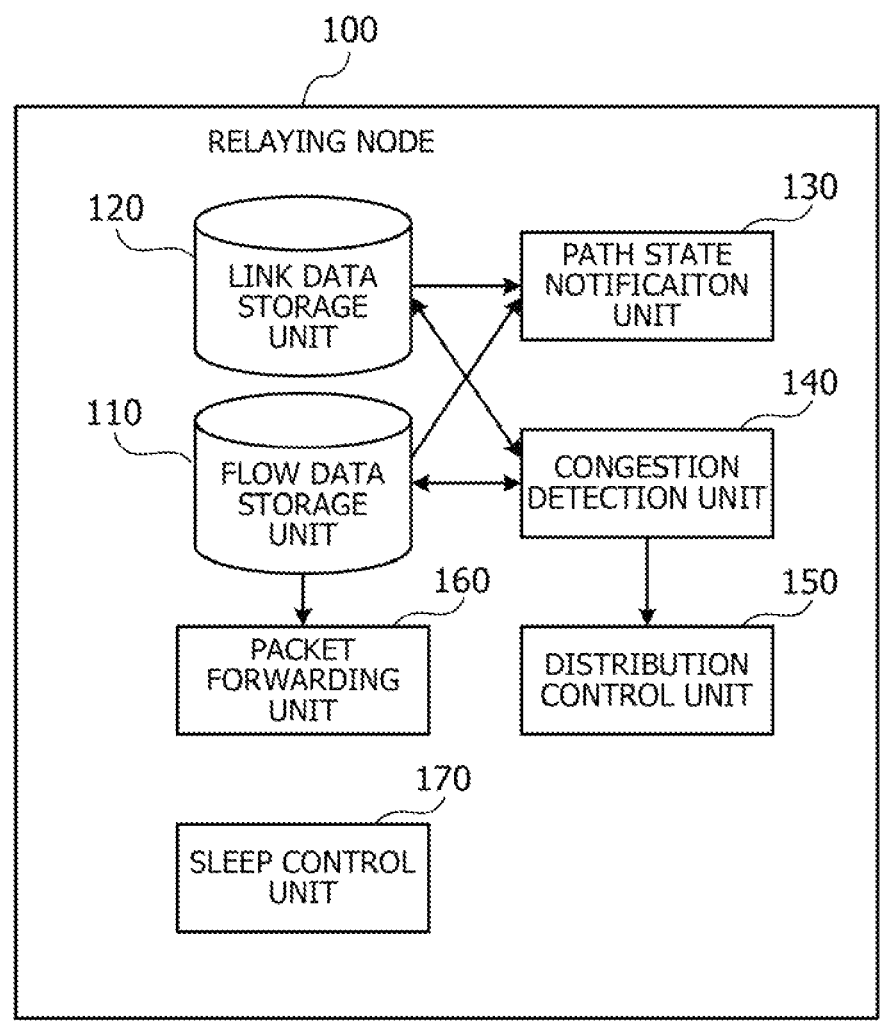
FIG. 10 is a functional block diagram of a relaying node.

FIG. 10 is a functional block diagram of a relaying node. The illustrated relaying node 100 includes a flow data storage unit 110, a link data storage unit 120, a path state notification unit 130, a congestion detection unit 140, a distribution control unit 150, a packet forwarding unit 160, and a sleep control unit 170.

The flow data storage unit 110 stores information about flows, or flow data records, for use by the relaying node 100 to forward received traffic to other nodes. For example, the flow data storage unit 110 may be implemented as part of storage space of the RAM 102 or HDD 103. The flow data records stored in the flow data storage unit 110 contain information about the paths of flows passing through the relaying node 100, as well as about the amount of traffic transported over those paths.

The link data storage unit 120 stores information about links between the relaying node 100 and other routers. For example, the link data storage unit 120 may be implemented as part of storage space of the RAM 102 or HDD 103. The information stored in the link data storage unit 120 includes, for example, the amount of traffic conveyed by individual links.

The path state notification unit 130 updates the payload of a state collection packet for a specific path when it is received from other nodes. For example, the path state notification unit 130 increments the sleep node count in the received state collection packet if the relaying node 100 itself is a sleep node. The path state notification unit 130 also updates the path power consumption parameter in the received state collection packet by adding thereto the power consumption parameter of the relaying node 100 itself, the value of which may vary with the amount of traffic being forwarded. Further the path state notification unit 130 calculates the vacancy (i.e., remaining capacity) of a link to the next node on the path indicated by the state collection packet. The path state notification unit 130 then compares the calculated link vacancy with the path vacancy indicated in the received state collection packet. If the link vacancy is smaller than the path vacancy, then the path state notification unit 130 substitutes the calculated link vacancy for the path vacancy in the state collection packet. Subsequently the path state notification unit 130 transmits the updated state collection packet to the next node on the path specified by the packet itself.

The congestion detection unit 140 observes the amount of traffic being conveyed by individual links that couple the relaying node 100 with other nodes, so as to detect signs of congestion. For example, the congestion detection unit 140 may test whether the link usage ratio exceeds a given control start threshold for congestion control. If the result is positive, the congestion detection unit 140 finds it to be a sign of congestion. The congestion detection unit 140 also updates relevant flow data records in the flow data storage unit 110, as well as relevant link data records in the link data storage unit 120, according to the observation of link traffic. For example, the congestion detection unit 140 updates traffic measurement values of individual flows, as part of flow data records.

The congestion detection unit 140 also updates the values of traffic volume, link usage ratio, deviation, and the like, as part of link data records.

The distribution control unit 150 is responsive to signs of congestion which may be detected in a link. In response, the distribution control unit 150 determines to distribute the traffic of at least a part of flows passing through that link (referred to as a target link) to some other paths. For example, the distribution control unit 150 transmits alarm information toward the ingress node of a path including the target link in question. This alarm information includes a request for nomination of candidate paths. In response to the request, the receiving ingress node sends candidate path data back to the distribution control unit 150. Out of the paths suggested in the received candidate path data, the distribution control unit 150 chooses a path that minimizes the increase of power consumption when the traffic is distributed. The distribution control unit 150 then commands the ingress node of the determined path to execute distribution of its traffic to the determined distribution path.

The packet forwarding unit 160 forwards a packet received from a neighboring node. During this course, the packet forwarding unit 160 consults the flow data storage unit 110 to extract a path descriptor of a relevant path of the flow whose ingress port and destination node match with the ingress port and destination of the packet. The extracted path descriptor indicates to which node the packet is to be forwarded. The packet forwarding unit 160 forwards the packet to the next node accordingly. It is noted that the packet forwarding unit 160 forwards control packets according to the path specified in the packets themselves. The aforementioned state collection packets are a kind of control packets. Other kinds of control packets are, for example, those containing alarm information, those containing a bidding message, and those containing a distribution request.

The sleep control unit 170 controls transition of the relaying node 100 from normal mode to sleep mode, as well as from normal mode back to sleep mode. For example, the sleep control unit 170 causes the relaying node 100 to go into sleep mode when there is no incoming traffic, except for control packets, for a predetermined time. In sleep mode, the sleep control unit 170 stops, for example, the congestion detection unit 140, distribution control unit 150, and packet forwarding unit 160, thereby reducing the power consumption. The congestion detection unit 140, on the other hand, keeps the path state notification unit 130 activated to continue its operation even in sleep mode. When a packet other than control packets arrives during the operation in sleep mode, the sleep control unit 170 causes the relaying node 100 to go back into normal mode. This is achieved by reactivating, for example, all functions of the congestion detection unit 140, distribution control unit 150, and packet forwarding unit 160.

The sleep control unit 170 has a flag to indicate the current operation mode. This mode flag may be implemented in, for example, the RAM 102. The path state notification unit 130 and other components in the relaying node 100 recognize the current operating mode by referring to this mode flag under the management of the sleep control unit 170.

Figure 11:
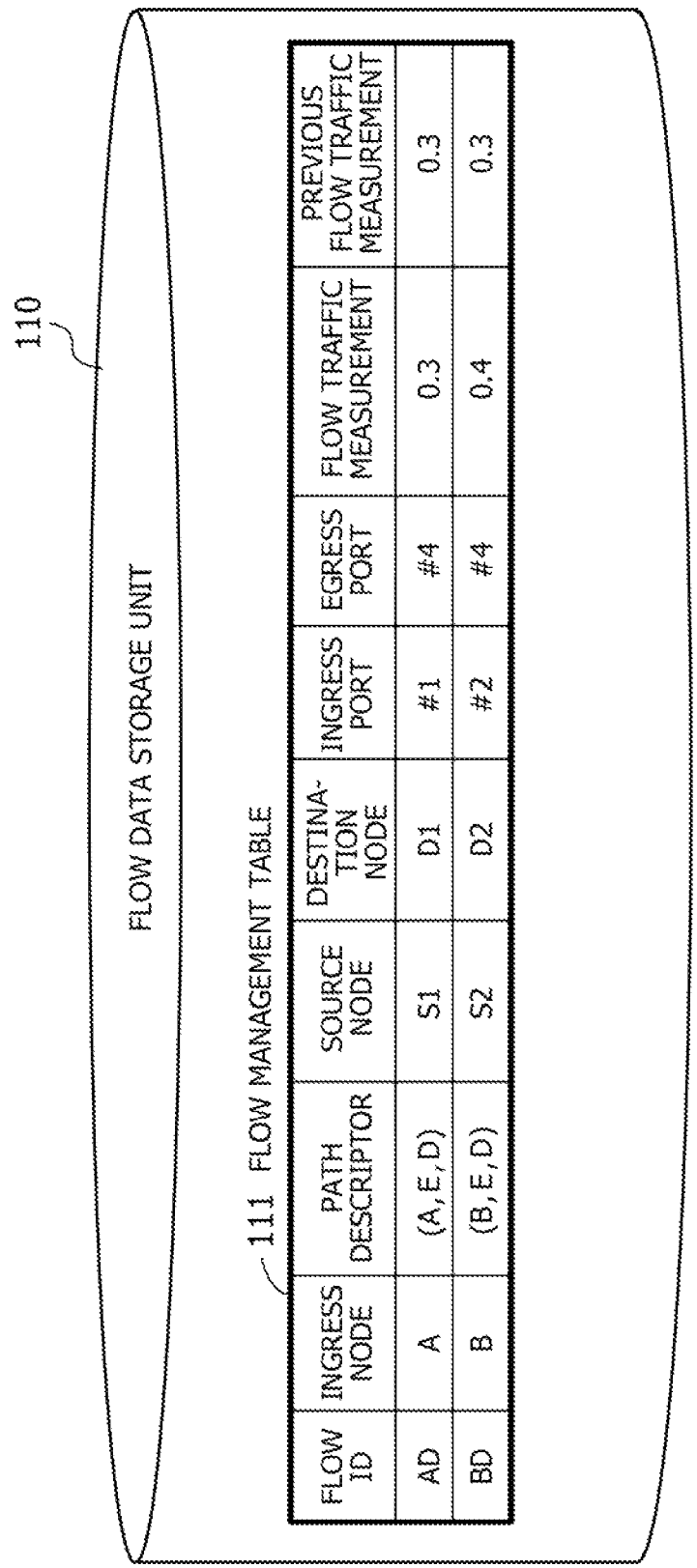
FIG. 11 illustrates an example data structure of a flow data storage unit.

FIG. 11 illustrates an example data structure of the flow data storage unit 110. In the example of FIG. 11, the flow data storage unit 110 contains a flow management table 111 formed from the following data fields: Flow ID, Ingress Node, Path Descriptor, Source Node, Destination Node, Ingress Port, Egress Port, Flow Traffic Measurement, and Previous Flow Traffic Measurement. The data values horizontally arranged in the flow management table 111 are associated with each other, thus constituting a single record of flow data.

Specifically, the flow ID field contains an identifier (flow ID) of a specific flow that takes a path passing through the relaying node 100. Flow ID is formed as a combination of two node IDs representing the ingress and egress nodes of the flow. For example, flow ID "AD" represents a flow that enters one edge node 200 (node ID: A) and comes out of another edge node 200c (node ID: D). The ingress node field contains the node ID of such an ingress node accepting incoming flows.

The path descriptor field stores a path descriptor, i.e., the information indicating a specific path that has been set up for the purpose of forwarding traffic of the flow. The flow management table 111 in the relaying node 100 contains path descriptors of paths in which the relaying node 100 is involved. Specifically, the path descriptor represents a path as a series of node IDs of the nodes forwarding its traffic, beginning with the ingress node and including subsequent relaying nodes.

The source node and destination node fields respectively store source and destination node addresses of the packets of this flow.

The ingress port field contains a port ID of a specific communication port of the relaying node 100 which is used to link with the preceding node defined in the routing data field. The egress port field contains a port ID of a specific communication port of the relaying node 100 which is used to link with the succeeding node defined in the path descriptor field.

The flow traffic measurement field contains a measurement value of traffic between the relaying node 100 and its succeeding node defined in the path descriptor, with respect to the flow of interest. This traffic measurement value may be, for example, a sum of data lengths of packets of the flow which are observed during a fixed period, which is referred to as a traffic measurement cycle. The previous flow traffic measurement field contains a measurement value of the flow which has been obtained in the preceding traffic measurement cycle.

Of all the above-described data items of flow data, the values in the flow ID, ingress node, path descriptor, source node, destination node, ingress port, and egress port fields may previously be determined by, for example, a system administrator. The values in the flow traffic measurement and previous flow traffic measurement fields are updated by the congestion detection unit 140 each time it measures the traffic of relevant links.

FIG. 12 illustrates an example data structure of the link data storage unit 120. In the example of FIG. 12, the link data storage unit 120 contains a link data management table 121 formed from the following data fields: Port Number (Port #), Link Capacity, Target Ratio, Control Value, Link Traffic Volume, Link Usage Ratio, Deviation, Previous (Prev) Link Usage Ratio, Previous Deviation, Congestion Control Flag, Alarm Value, and Previous Alarm Value. The data values horizontally arranged in the link data management table 121 are associated with each other to constitute a single record of link data.

The port number field contains a port number identifying a specific communication port of the relaying node 100. The link capacity field indicates the maximum capacity (bandwidth) per unit time of the communication port, the value of which is a multiple of a reference value, or unit capacity. Since the second embodiment assumes that every port has the same bandwidth, the link capacity is represented by using this bandwidth as the unit capacity. Thus the link capacity field contains a value of one for every link.

The target ratio field contains a target ratio of the corresponding link. This value is also given as a ratio to the same unit capacity discussed above for the link capacity. For example, the link of port number #4 has a target ratio of 0.8.

The control value field contains a control value of the corresponding link. This value is given as a ratio to the link capacity. In the example of FIG. 12, every link has a control value of 0.1.

The link traffic volume field contains the latest measurement value of traffic volume of the corresponding link. This value is also given as a ratio to the same unit capacity discussed above for the link capacity. Some communication ports have a traffic volume of zero, which means that there is no outgoing traffic at those ports.

The link usage ratio field contains a latest measurement value of link usage ratio of the link. As noted above, the bandwidth of each communication port is used as a unit capacity, and the link capacity is thus normalized to one. Accordingly, the link traffic volume field in the example of FIG. 12 has the same value as the link usage ratio field.

The deviation field contains the latest measurement value of deviation of the link. The previous link usage ratio field contains a previous measurement value (i.e., a value measured in the measurement cycle immediately preceding the latest one) of link usage ratio of the link. The previous deviation field contains a previous measurement value of deviation of the link.

The congestion control flag field contains a congestion control flag which is set when a sign of congestion is detected.

The alarm value field contains an alarm value calculated in the latest transmission of alarm information produced upon detection of a sign of congestion. The previous alarm value field contains an alarm value calculated in the previous transmission (i.e., immediately preceding the latest transmission) of alarm information produced upon detection of a sign of congestion.

Of all the above-described data items of link data, the values in the port number, link capacity, target ratio, and control value fields are previously determined by the system administrator. On the other hand, the values of link usage ratio, deviation, previous link usage ratio, and previous deviation fields are updated by the congestion detection unit 140 each time it measures the traffic of relevant links. Further, the values of congestion control flag, alarm value, and previous alarm value fields are updated by the congestion detection unit 140 when the process of congestion control is in progress.

Figure 13:
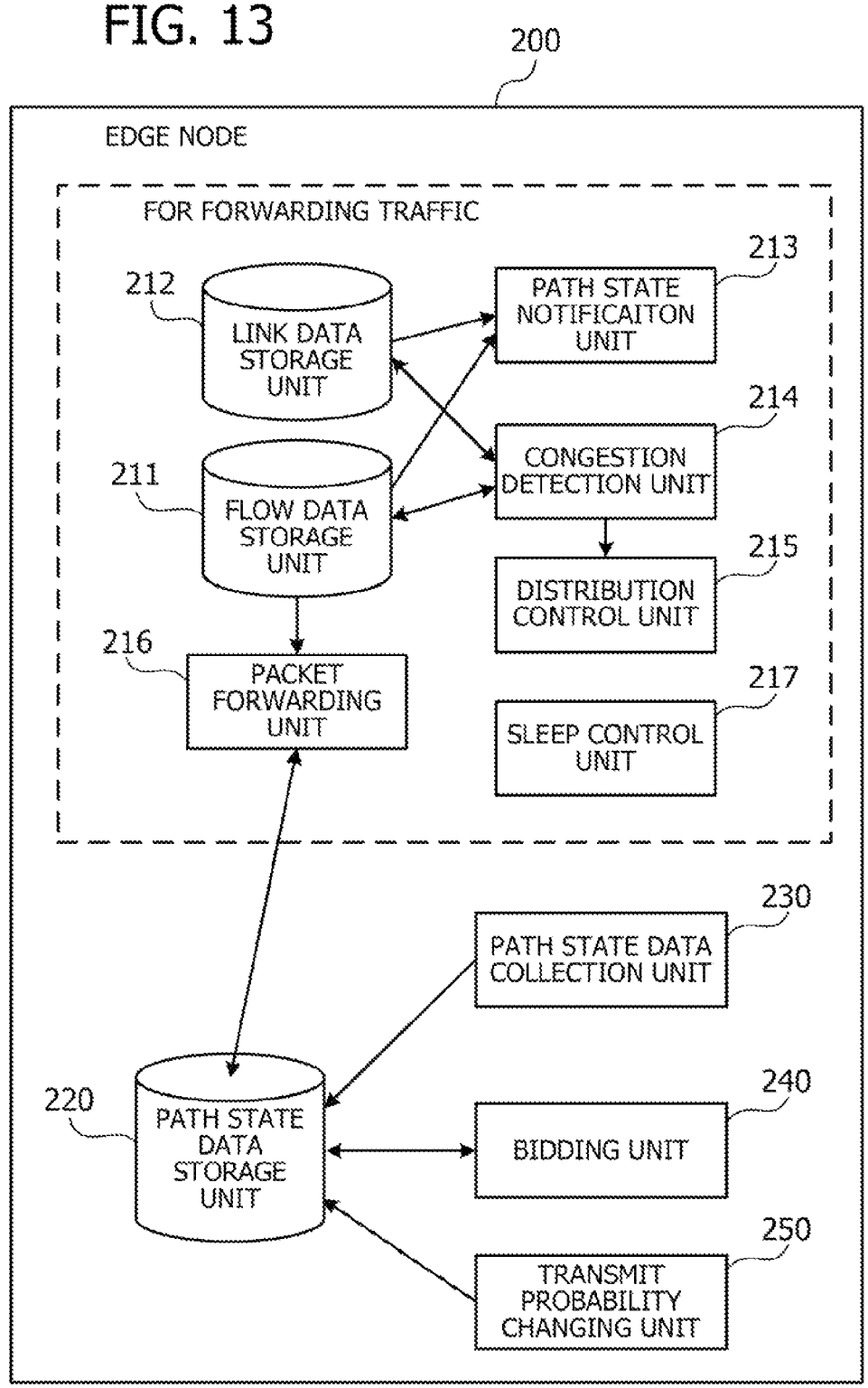
FIG. 13 is a functional block diagram of an edge node.

FIG. 13 is a functional block diagram of an edge node. The illustrated edge node 200 includes a flow data storage unit 211, a link data storage unit 212, a path state notification unit 213, a congestion detection unit 214, a distribution control unit 215, a packet forwarding unit 216, a sleep control unit 217, a path state data storage unit 220, a path state data collection unit 230, a bidding unit 240, and a transmit probability changing unit 250. The flow data storage unit 211, link data storage unit 212, path state notification unit 213, congestion detection unit 214, and distribution control unit 215 permit the edge node 200 to forward traffic just as other relaying nodes do. Accordingly, the flow data storage unit 211, link data storage unit 212, path state notification unit 213, congestion detection unit 214, distribution control unit 215, packet forwarding unit 216, and sleep control unit 217 provide basically the same functions as their respective counterparts in the relaying node 100 discussed in FIG. 10. The edge node 200 may serve as an ingress node of a specific flow.

In this case, the packet forwarding unit 216 distributes traffic to relevant paths of the flow according to transmit probabilities defined in the path state data storage unit 220. Also in this case, the packet forwarding unit 216 measures the traffic volume of each path at regular intervals and records the measurements in the path state data storage unit 220.

The path state data storage unit 220 stores path state data records, i.e., the information about the state of a flow path that begins with the edge node 200 as ingress node. For example, the path state data storage unit 220 may be implemented as part of storage space of RAM or HDD in the edge node 200.

The path state data collection unit 230 collects path state data at regular intervals from other nodes. For example, the path state data collection unit 230 transmits a state collection packet, a kind of control packet, to the egress node via a predetermined path. The state collection packet is reflected back to the source edge node 200 when the packet reaches the intended egress node. The payload of the state collection packet is updated each time the packet is forwarded by the nodes and thus brings back a collection of data indicating the latest state of the path. The path state data collection unit 230 then saves the collected path state data in the path state data storage unit 220.

The bidding unit 240 is responsive to alarm information from a relaying node or edge node that forwards traffic. In response, the bidding unit 240 produces candidate path data indicating candidates for distribution paths and sends it back to the source node of the alarm information. The candidates for distribution paths are selected from among possible paths of the flow for which the alarm information has been transmitted, while excluding those running through the alarm-raising node.

The transmit probability changing unit 250 receives a distribution request regarding a specific flow. In response, the transmit probability changing unit 250 distributes a part of the traffic of the specified flow to a distribution path specified in the distribution request. The amount of this distributed traffic is determined from the alarm value indicated in the same distribution request.

FIG. 14 illustrates an example data structure of the path state data storage unit 220 in the edge node 200 with a node ID of A. Specifically, the path state data storage unit 220 contains a path management table 221 formed from the following data fields: Flow ID, Path, Sleep Node Count, Transmit Probability, Path Vacancy, Path Power Consumption Parameter, Received Alarm Value, and Flow Traffic Value. The data values horizontally arranged in the path management table 221 are associated with each other to constitute a single record of path state data.

The flow ID field contains a flow ID of a specific flow that begins at the edge node 200 as ingress node. The path field indicates a specific path for that flow. The sleep node count field indicates the number of relaying nodes which are located on that specific path but currently operating in sleep mode. The transmit probability field indicates the probability at which the edge node 200 transmits traffic of the flow to the specific path. In the example of FIG. 14, the transmit probabilities for path ACD and path AGD are set to zero, while that for path AED is set to 1.0. This means that the traffic of flow AD is concentrated into path AED.

The path vacancy field contains a value indicating the vacancy of the path. The path power consumption parameter field contains a power consumption parameter of the path. The received alarm value field contains an alarm value received when an alarm is raised in the path. The flow traffic value field indicates the amount of traffic directed from the edge node 200 to the path.

Of all the above-described data items of path state data, the values in the flow ID field and path field may previously be determined by the system administrator. On the other hand, the values of the sleep node count, path vacancy, and path power consumption parameter fields are updated by the path state data collection unit 230 each time it executes a process of path state data collection. Further the transmit probabilities are updated by the transmit probability changing unit 250 each time it calculates a new set of transmit probabilities. Also, the flow traffic value is updated by the packet forwarding unit 216 each time it measures the amount of traffic per unit time, with respect to a specific flow and its specific path. The packet forwarding unit 216 also measures the current amount of traffic on each path of a flow at regular intervals.

Figure 15:
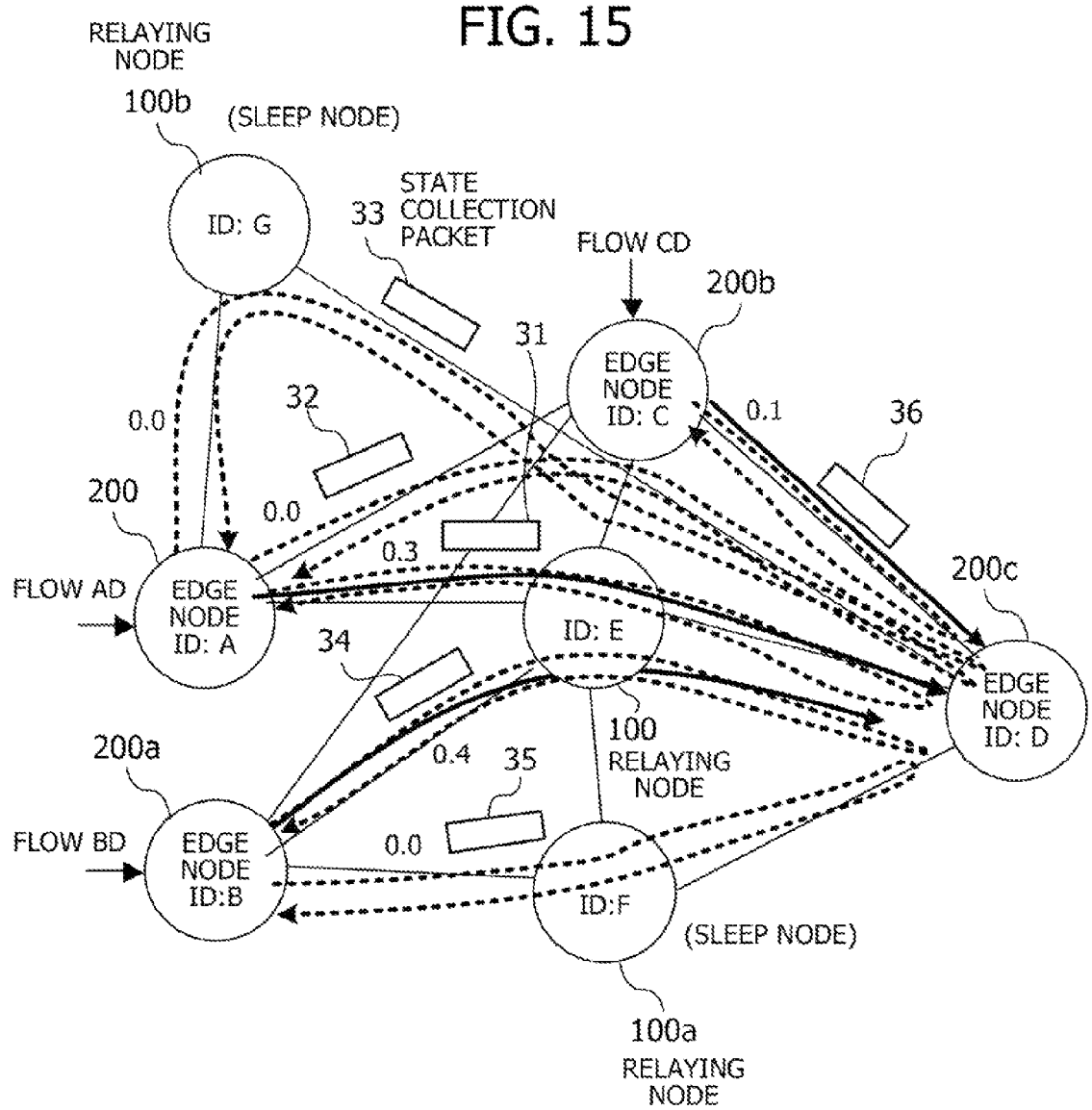
FIG. 15 depicts an example of path state data collection.

Referring now to FIG. 15, the following description will provide details of path state data collection. FIG. 15 depicts an example of path state data collection. In this example, there are three flows heading for an edge node 200c as their egress node. The edge node 200 serves as the ingress node of one flow. The edge node 200a serves as the ingress node of another flow. The edge node 200b serves as the ingress node of yet another flow.

The three solid arrows in FIG. 15 respectively indicate the traffic of the above-noted three flows, all of which point to the egress edge node 200c. The edge node 200, on the other hand, stores information about three possible paths for the flow that is directed to the egress edge node 200c. One path runs through an edge node 200b. Another path runs through a relaying node 100. Yet another path runs through a relaying node 100b. Similarly, the edge node 200a stores information about two paths for the flow directed to the egress edge node 200c. One path runs through a relaying node 100. Another path runs through a relaying node 100a. The edge node 200b, on the other hand, stores information about a direct path for the flow that is directed to the egress edge node 200c.

The ingress edge nodes 200, 200a, and 200b transmit state collection packets 31 to 36 to different paths associated with each flow to the egress edge node 200c. Each state collection packet 31 to 36 bears an identifier indicating their identity as state collection packets, as well as information indicating a specific path whose state data is being sought. The original state collection packets 31 to 36 transmitted from edge nodes 200, 200a, and 200b contain some initial values of the state data being sought. In FIG. 15, the transmit paths of those state collection packets 31 to 36 are indicated by dotted arrows. For example, the state collection packet 31 is delivered from the source edge node 200 to the destination edge node 200c via a relaying node 100. The relaying node 100 updates data in the state collection packet 31 before forwarding it to the edge node 200c. When this state collection packet is received, the destination edge node 200c identifies the path where the received state collection packet has been seeking path state data. The destination edge node 200c then recognizes itself as the egress node of that path and thus returns collected data back to the source edge node 200.

The edge nodes 200, 200a, and 200b send state collection packets 31 to 36 to their recognized paths on a regular basis. As a result, the edge nodes 200, 200a, and 200b obtain the latest path state data on a regular basis, which includes, for example, the path vacancy, path power consumption parameter, and sleep node count of each recognized path. Based on the returned state collection packets 31 to 36, the edge nodes 200, 200a, and 200b update their locally stored records of path state data. The next section will describe an example of path vacancy calculation, focusing on two paths AED and BED.

Figure 16:
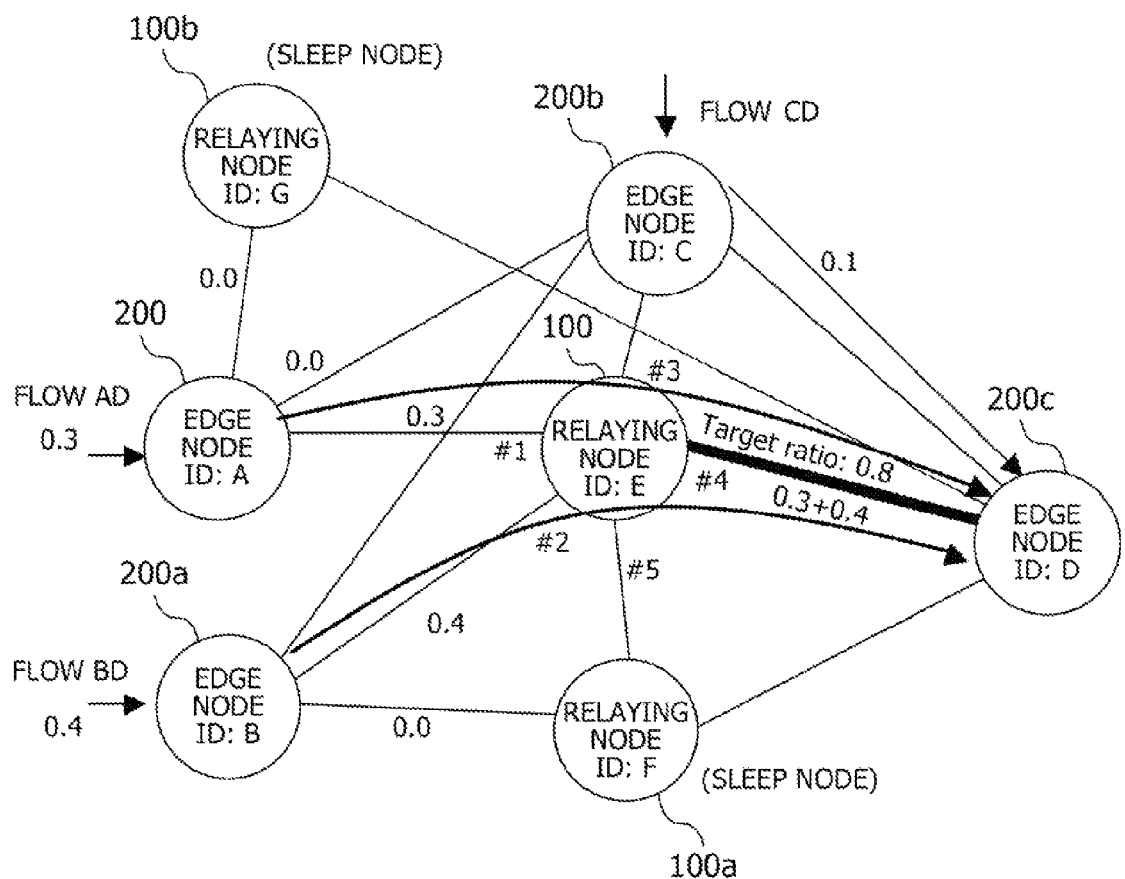
FIG. 16 illustrates an example of path vacancy calculation for paths AED and BED.

FIG. 16 illustrates an example of path vacancy calculation for path AED and path BED. The relaying node 100 lies on both paths AED and BED and measures the link traffic volume at each output port. In the example of FIG. 16, the communication port with a port number of #1 (communication port #1) is coupled to an edge node 200. Communication port #2 is coupled to another edge node 200a. Communication port #3 is coupled to yet another edge node 200b. Communication port #4 is coupled to still another edge node 200c. Communication port #5 is coupled to a relaying node 100a.

As discussed earlier, the link traffic volume is defined to be a sum of traffic volumes of individual flows passing through a specific link. This link traffic volume is calculated by the congestion detection unit 140 at given traffic measurement intervals by summarizing the number of packets and data lengths of each flow observed during a unit time. In the example of FIG. 16, flow AD has a traffic volume of 0.3, the entirety of which is concentrated into path AED. Flow BD, on the other hand, has a traffic volume of 0.4, the entirety of which is concentrated into path BED. Accordingly, the link traffic volume of the link running from output communication port #4 of the relaying node 100 amounts to 0.7 (=0.3+0.4).

The relaying node 100 in the example of FIG. 16 has a target ratio of 0.8 for the link running from output communication port #4, meaning that this link has a vacancy of 0.1 (=0.8−0.7) in its link capacity. Assuming that the network 10 has no other flows than those seen in FIG. 16, the state collection packets on path AED and path BED are both updated with this new path vacancy of 0.1 when they go through the relaying node 100. The state collection packets updated in this way are then summarized, and the results are sent back to each of the edge nodes 200 and 200a for use to update their respective path state data records. For example, one edge node 200 obtains path state data as illustrated in FIG. 14, and another edge node 200a obtains path state data as illustrated in FIG. 17.

Figure 17:
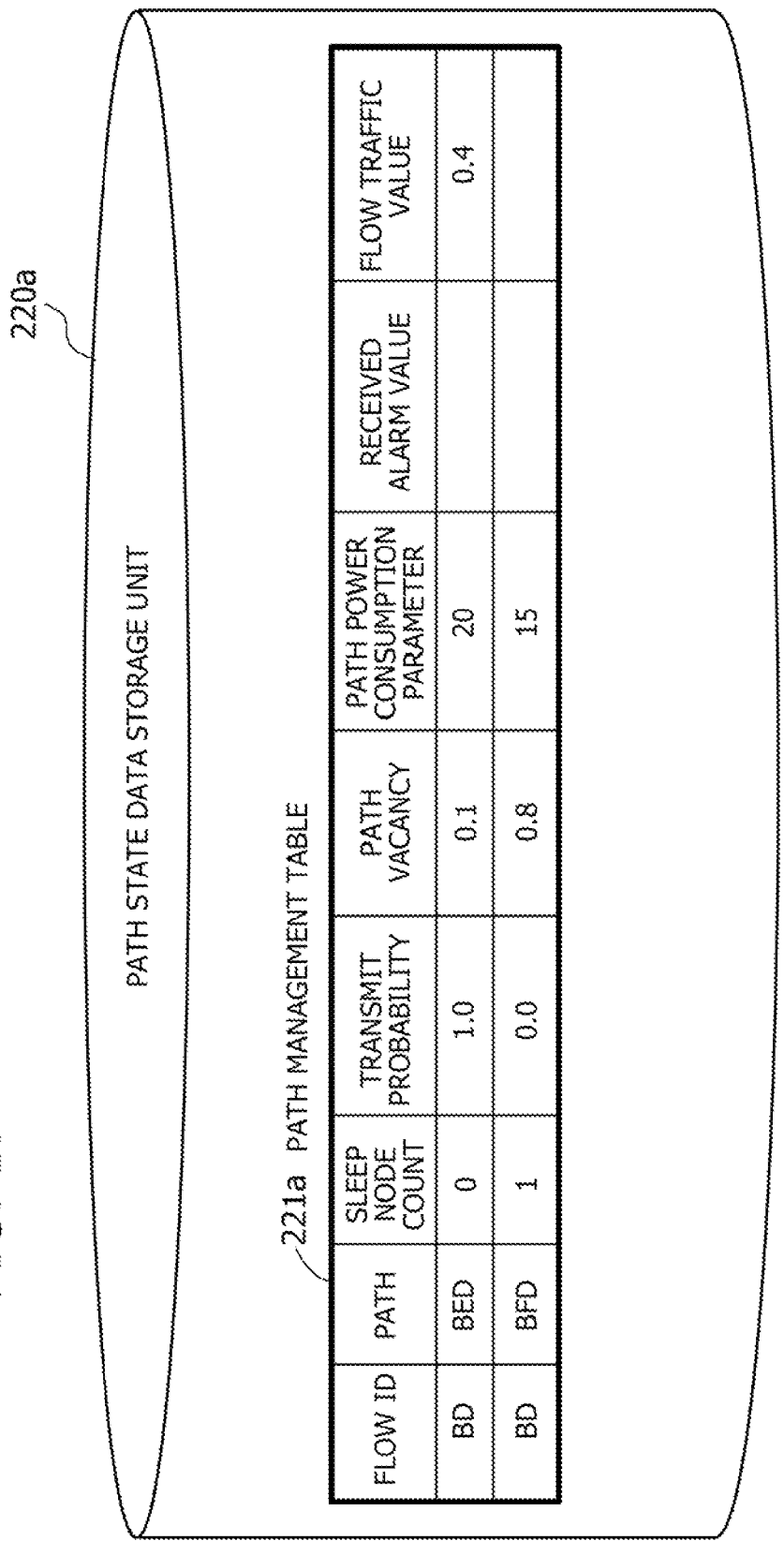
FIG. 17 illustrates an example data structure of a path state data storage unit in the edge node with a node ID of B.

FIG. 17 illustrates an example data structure of the path state data storage unit 220a in the edge node 200a with a node ID of B. Specifically, the path state data storage unit 220a contains a path management table 221a whose data structure is similar to what has been discussed in FIG. 14. This path management table 221a stores path state data records relevant to flow BD, i.e., a flow that enters the edge node 200a as its ingress node.

Figure 18:
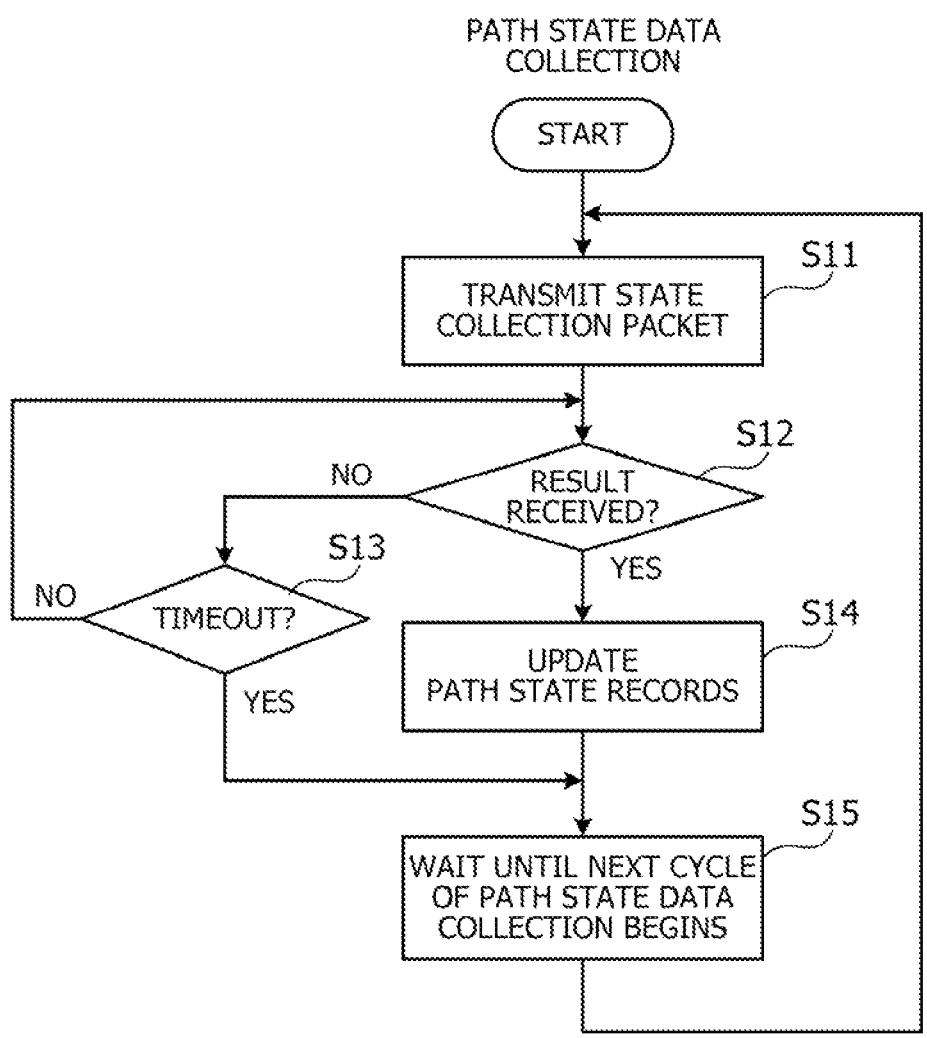
FIG. 18 is a flowchart of a process of path state data collection executed by an ingress node.

The above-described process of path state data collection is actually implemented as coordinated operations by a path state data collection unit in an ingress edge node and path state notification units in other nodes on each path. FIG. 18 is a flowchart of a process of path state data collection executed by an ingress node. It is noted that the flowchart of FIG. 18 applies to a single path. In other words, the illustrated processing steps of FIG. 18 are executed for each individual path so as to populate the path management table with collected state data of different paths. The steps of FIG. 18 will now be described below in the order of step numbers.

(Step S11) The path state data collection unit 230 transmits a state collection packet. The state collection packet is a kind of control packet, and its transmission path is specified in the packet itself. The path field of the path management table is consulted to specify the transmission path of a state collection packet. The produced state collection packet contains initial values of sleep node count, path vacancy, and power consumption parameter. More specifically, the sleep node count is given an initial value of, for example, zero. The path vacancy is given an initial value of, for example, one. The power consumption parameter is given an initial value of, for example, zero.

(Step S12) The path state data collection unit 230 determines whether the result of path state data collection is received. If the result has been received, the process advances to step S14. If not, the process proceeds to step S13.

(Step S13) The path state data collection unit 230 determines whether a predetermined period for path state data collection has expired. This period (path state data collection period) has previously been specified as a time during which the path state data collection unit 230 is allowed to collect path state data messages after a state collection packet is transmitted. The path state data collection unit 230 starts counting the time upon transmission of a state collection packet and detects a timeout when the path state data collection period expires. The timeout causes the process to advance to step S15. Otherwise, step S12 is repeated until the result is received.

(Step S14) The path state data storage unit 220 stores path state data records relevant to the path of interest. The path state data collection unit 230 updates those path state data records with the received collection result.

(Step S15) The interval of path state data collection is determined previously. Upon completion of step S13, the path state data collection unit 230 waits until the next cycle of path state data collection begins. The process then returns to step S11.

The above-described steps permit an ingress node to collect path state data at regular intervals. The next section will describe a process of path state data notification that other nodes execute in response to a state collection packet.

Figure 19:
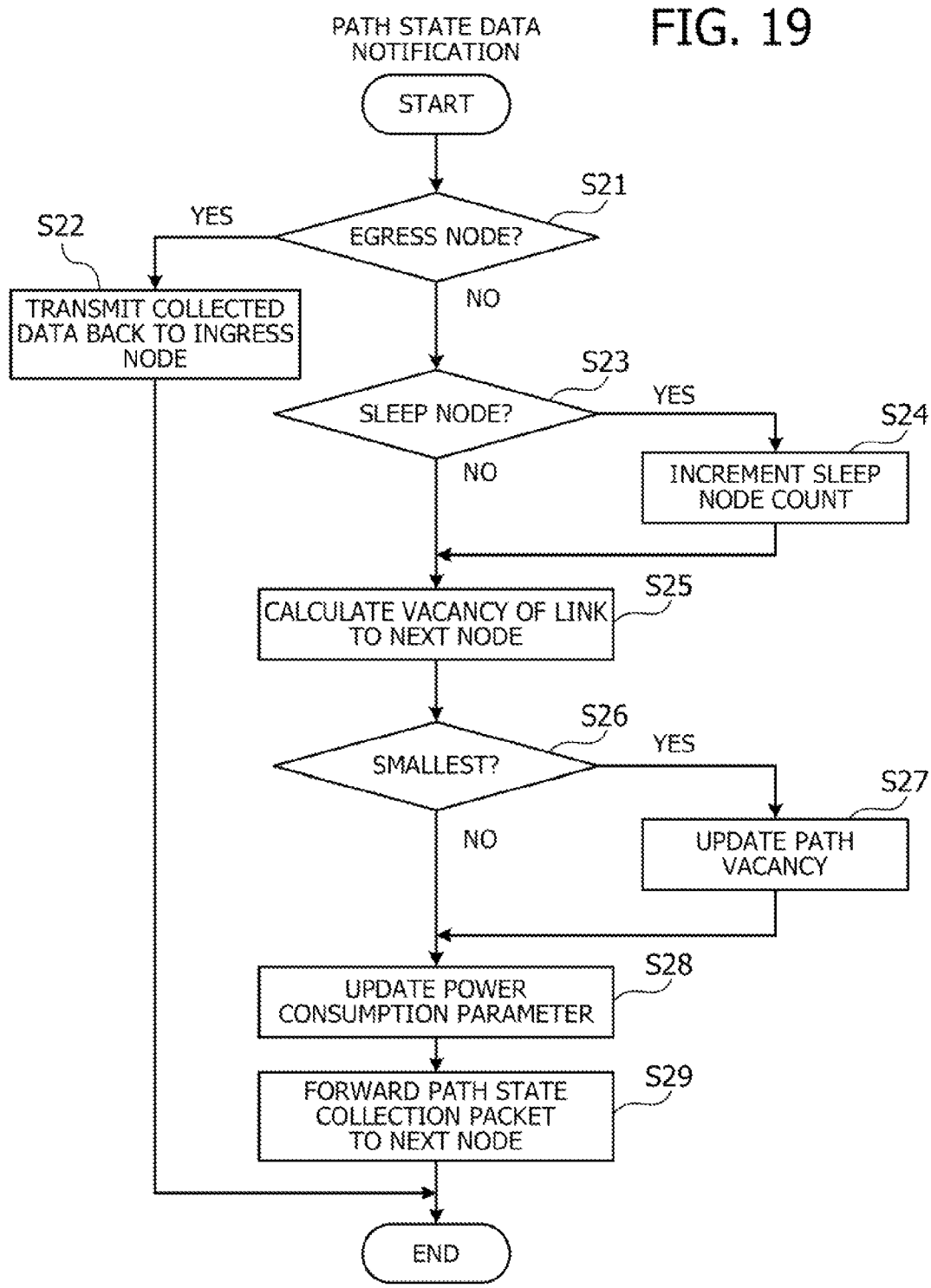
FIG. 19 is a flowchart of a process of path state data notification.

FIG. 19 is a flowchart of a process of path state data notification. The steps of FIG. 19 will now be described below in the order of step numbers.

(Step S21) Upon receipt of a state collection packet, the path state notification unit 130 identifies the path specified in the received state collection packet and determines whether the identified path includes the relaying node 100 itself as its egress node. If so, the process advances to step S22. If not, the process proceeds to step S23.

(Step S22) The path state notification unit 130 sends the collected data back to the ingress node of the path specified in the state collection packet. The collected data is transmitted as part of a control packet. The present process of path state data notification is then terminated.

It is noted that the flowchart of FIG. 19 assumes execution by the path state notification unit not only of a relaying node, but also of an edge node. For this reason, the process seen in FIG. 19 includes a couple of steps executed by an egress node (e.g., steps S21 and S22). In the second embodiment, however, relaying nodes will never be an egress node. Accordingly, the path state notification unit 130 in relaying nodes does not have to execute step S21 or S22.

(Step S23) Since it is found that the relaying node 100 is not an egress node, the path state notification unit 130 then determines whether the relaying node 100 is a sleep node. For example, the path state notification unit 130 consults the sleep control unit 170 to test the mode flag indicating the current operation mode of the relaying node 100. If the flag indicates sleep mode, the path state notification unit 130 advances the process to step S24 since the relaying node 100 is a sleep node. If not, the process proceeds to step S25.

(Step S24) Now that the relaying node 100 is found to be a sleep node, the path state notification unit 130 increments the sleep node count in the state collection packet by one.

(Step S25) The path state notification unit 130 calculates the vacancy of a link to the next node on the path of interest. For example, the path state notification unit 130 determines which node comes next to the relaying node 100, based on the target path indicated in the state collection packet. Then the path state notification unit 130 identifies the egress port for the target path by consulting its relevant flow data record in the flow data storage unit 110. The path state notification unit 130 further consults the link data storage unit 120 to find a link data record relevant to the identified egress port. From this link data record, the path state notification unit 130 extracts the values of link capacity, target ratio, and link traffic volume. The path state notification unit 130 now obtains the link vacancy by calculating the following: Link Capacity× Target Ratio−Link Traffic Volume.

(Step S26) The path state notification unit 130 determines whether the link vacancy calculated at step S25 is the smallest of all link vacancies calculated by the preceding nodes that have delivered the present state collection packet. For example, the path state notification unit 130 compares the calculated link vacancy with the path vacancy indicated in the received state collection packet. If the calculated link vacancy is smaller than the path vacancy, then it means that the calculated link vacancy is the smallest, and thus the process proceeds to step S27. Otherwise, the process advances to step S28.

(Step S27) The path state notification unit 130 updates the path vacancy field of the state collection packet with the link vacancy calculated at step S25. The process then proceeds to step S28.

(Step S28) The path state notification unit 130 updates the power consumption parameter contained in the state collection packet. For example, the path state notification unit 130 adds the power consumption parameter of the relaying node 100 itself to that in the state collection packet.

(Step S29) The path state notification unit 130 forwards the updated state collection packet to the next node on the path. The process of path state data notification is then terminated.

As can be seen from the above, the ingress node cooperates with other nodes to collect path state data. The collection of path state data is performed at regular intervals, thus maintaining path state data stored in the path state data storage unit of the ingress node in an up-to-date state.

Figure 20:
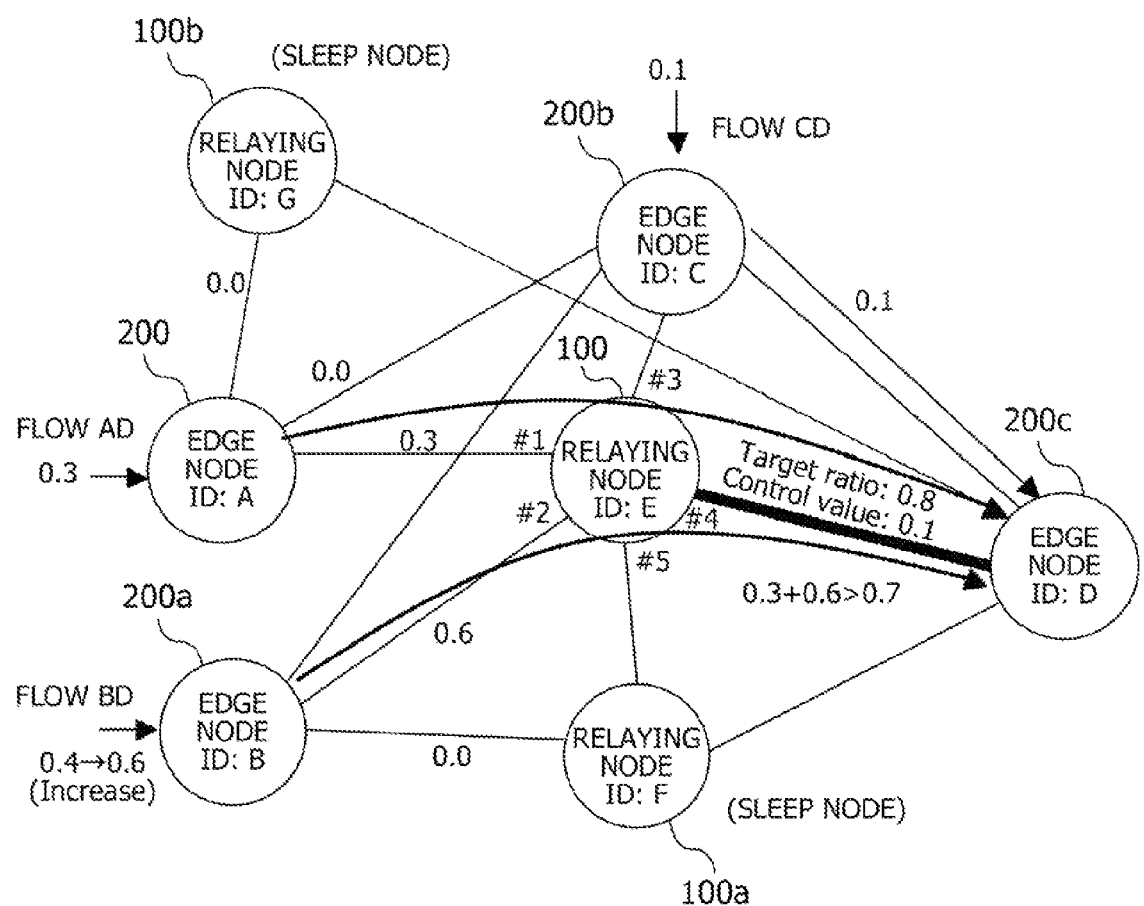
FIG. 20 illustrates an example of a sign of congestion.

Referring to FIG. 20, the details of a congestion detection process will now be described below. FIG. 20 illustrates an example of signs of congestion. In the example of FIG. 20, the traffic volume of flow BD has increased from 0.4 to 0.6, which results in a traffic volume of 0.9 in the link running from output communication port #4 of the relaying node 100. It is assumed here that this link of output communication port #4 has a target ratio of 0.8 and a control value of 0.1.

The control start threshold is calculated to be 0.7 (=0.8−0.1) in this case, and the link traffic volume exceeds this threshold. The congestion detection unit 140 in the relaying node 100 detects this fact and thus starts congestion control.

Figure 21:
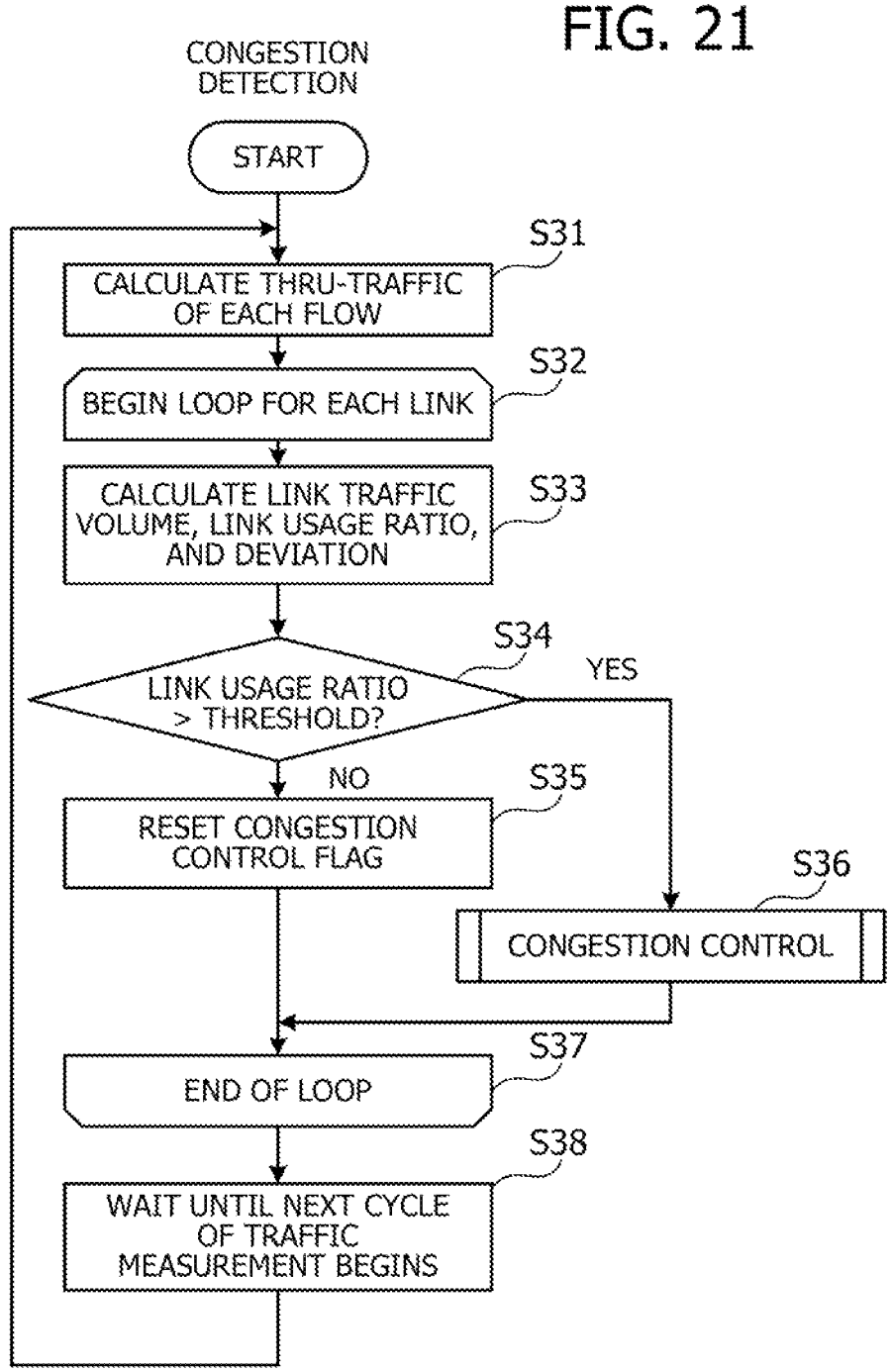
FIG. 21 is a flowchart illustrating an example of a congestion detection process.

FIG. 21 is a flowchart illustrating an example of a congestion detection process. The steps of FIG. 21 will now be described below in the order of step numbers.

(Step S31) The congestion detection unit 140 measures the amount of data of each flow that goes through the relaying node 100 in a unit time, thereby obtaining the traffic volume of each flow. The congestion detection unit 140 stores those new records of traffic measurements in the flow data storage unit 110. Here the congestion detection unit 140 also preserves previous records of traffic measurements of each flow before replacing them with the new records. The flow data storage unit 110 thus stores those previous records as previous flow traffic measurements.

(Step S32) The congestion detection unit 140 selects one of the links coupling the relaying node 100 to other nodes and subjects the selected link to the following steps S33 to S36. The congestion detection unit 140 repeats the loop of steps S33 to S36 for each such link.

(Step S33) The congestion detection unit 140 calculates a link traffic volume, link usage ratio, and deviation of the selected link. For example, the congestion detection unit 140 first determines which flows are passing through the selected link, by consulting records in the flow data storage unit 110 which indicate each flow's output port. The congestion detection unit 140 then adds up the individual traffic volumes of the determined flows on the selected link, the resulting sum being the link traffic volume of the selected link. The congestion detection unit 140 further divides this link traffic volume by the link capacity, thereby obtaining a link usage ratio. The congestion detection unit 140 also calculates a deviation by subtracting the link usage ratio from a given target ratio.

The congestion detection unit 140 stores the calculated link traffic volume, link usage ratio, and deviation in the link data storage unit 120. Here the congestion detection unit 140 also preserves previous records of those data items before replacing them with the new records of link usage ratio, and deviation. The link data storage unit 120 thus stores those previous records as a previous link usage ratio and a previous deviation.

(Step S34) The congestion detection unit 140 determines whether the link usage rate of the selected link exceeds the control start threshold for congestion control. If the link usage rate exceeds the control start threshold, then the process advances to step S36. If not, the process proceeds to step S35.

(Step S35) Since the link usage rate does not exceed the control start threshold, the congestion detection unit 140 resets the congestion control flag. For example, the congestion detection unit 140 gives a value of zero to the congestion control flag, where the flag value of one indicates on-going congestion control while the flag value of zero indicates absence of congestion control. It may be noted that step S35 does not bother to reset the congestion control flag if it is not set. The process then goes to step S37.

Figure 26:
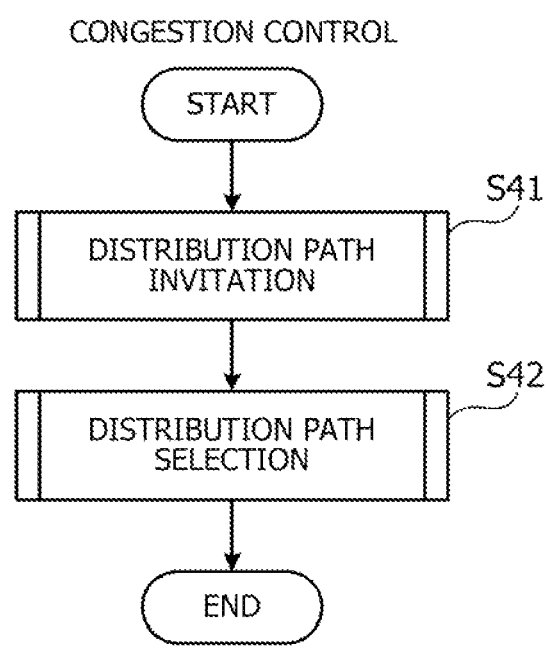
FIG. 26 is a flowchart illustrating an example of a congestion control process.

(Step S36) Since the link usage ratio exceeds the control start threshold, the congestion detection unit 140 executes a congestion control process, the details of which will be described later with reference to FIG. 26. The process then proceeds to step S37.

(Step S37) When all the links have been subjected to the above steps S33 to S36, the congestion detection unit 140 advances the process to step S38.

(Step S38) The congestion detection unit 140 waits until the next cycle of traffic measurement begins and then goes back to step S31.

Through the above processing steps, the flow traffic is measured at regular intervals, and the flow data storage unit 110 is updated with a new set of flow data values.

Figure 22:
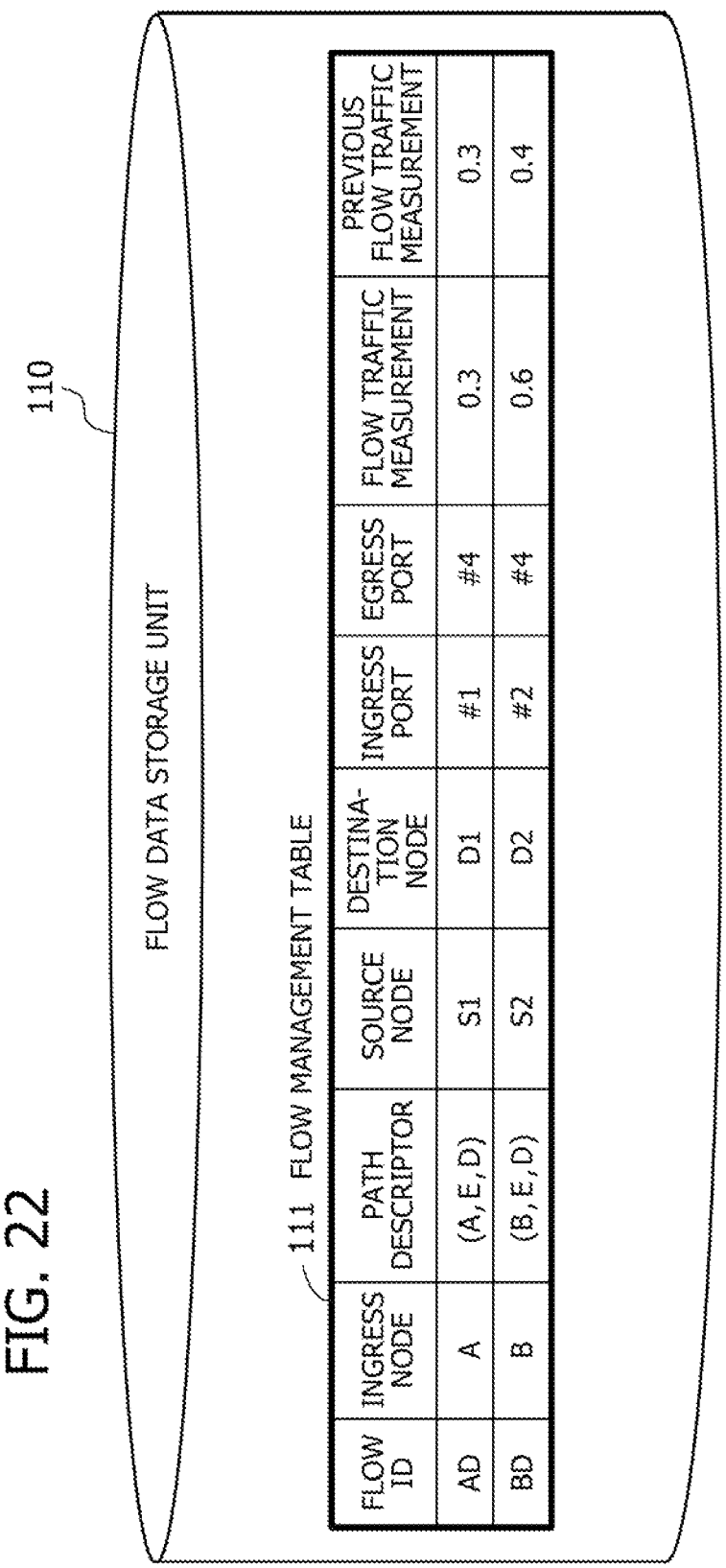
FIG. 22 illustrates example contents of a flow data storage unit after update of flow data.

FIG. 22 illustrates example contents of the flow data storage unit 110 after update of flow data records. The traffic measurement results of each flow discussed in FIG. 20 are reflected in the flow data records of FIG. 22. As can be seen from comparison with FIG. 11, the flow data record with a flow ID of BD now contains an updated version of a flow traffic measurement and a previous flow traffic measurement. More specifically, the flow traffic measurement field has been changed from 0.4 to 0.6. The previous flow traffic measurement field has also been changed from 0.3 to 0.4.

The measurement of link traffic volumes also affects link data records in the link data storage unit 120. When there is a link experiencing an increased link usage ratio that exceed the control start threshold, the link data record for that flow is modified to set its congestion control flag and include a specific alarm value.

FIG. 23 illustrates example contents of the link data storage unit 120 after such update of a link data record. The link data records seen in FIG. 23 are what the link data storage unit 120 contains after an alarm is raised as a result of the discovery of a sign of congestion discussed in FIG. 20. As can be seen from comparison with FIG. 12, the link data record for the link running from output communication port #4 now contains updated values in the data fields of link traffic volume, link usage ratio, deviation, previous link usage ratio, previous deviation, congestion control flag, alarm value, and previous alarm value. More specifically, the link traffic volume corresponding to communication port #4 has been changed from 0.7 to 0.9. The link usage ratio has been changed from 0.7 to 0.9. The deviation has been changed from 0.1 to −0.1. The previous link usage ratio has been changed from 0.6 to 0.7. The previous deviation has been changed from 0.2 to 0.1. The congestion control flag field contains a newly set flag. The alarm value field contains a new value of 0.89, while the previous alarm value field contains an initial value of one.

As can be seen from the above examples, the changes made to flow data and link data in one relaying node 100 propagate to path state data in edge nodes 200 and 200a as a result of the process of path state data collection. FIG. 24 illustrates an example of updated contents of the path state data storage unit in the edge node with a node ID of A. The traffic measurement results of each flow discussed in FIG. 20 are reflected in the path data records of FIG. 24. As can be seen from comparison with FIG. 14, the path state data of path AED carrying flow AD now contains a new value of path vacancy. More specifically, the path vacancy has been changed from 0.1 to 0.

The path vacancy means the minimum link vacancy on a path. The link vacancy of each link is calculated as Link Capacity×Target Ratio−Link Traffic Volume. In the example of FIG. 20, the link vacancy of a link running from communication port #4 of the relaying node 100 is calculated to be −0.1 (i.e., 1×0.8−0.9). This negative value of link vacancy is interpreted as zero. Since this zero link vacancy is smaller than any other possible values of link vacancy, every path passing through that link has a path vacancy of zero, as will be seen in the following example.

Figure 25:
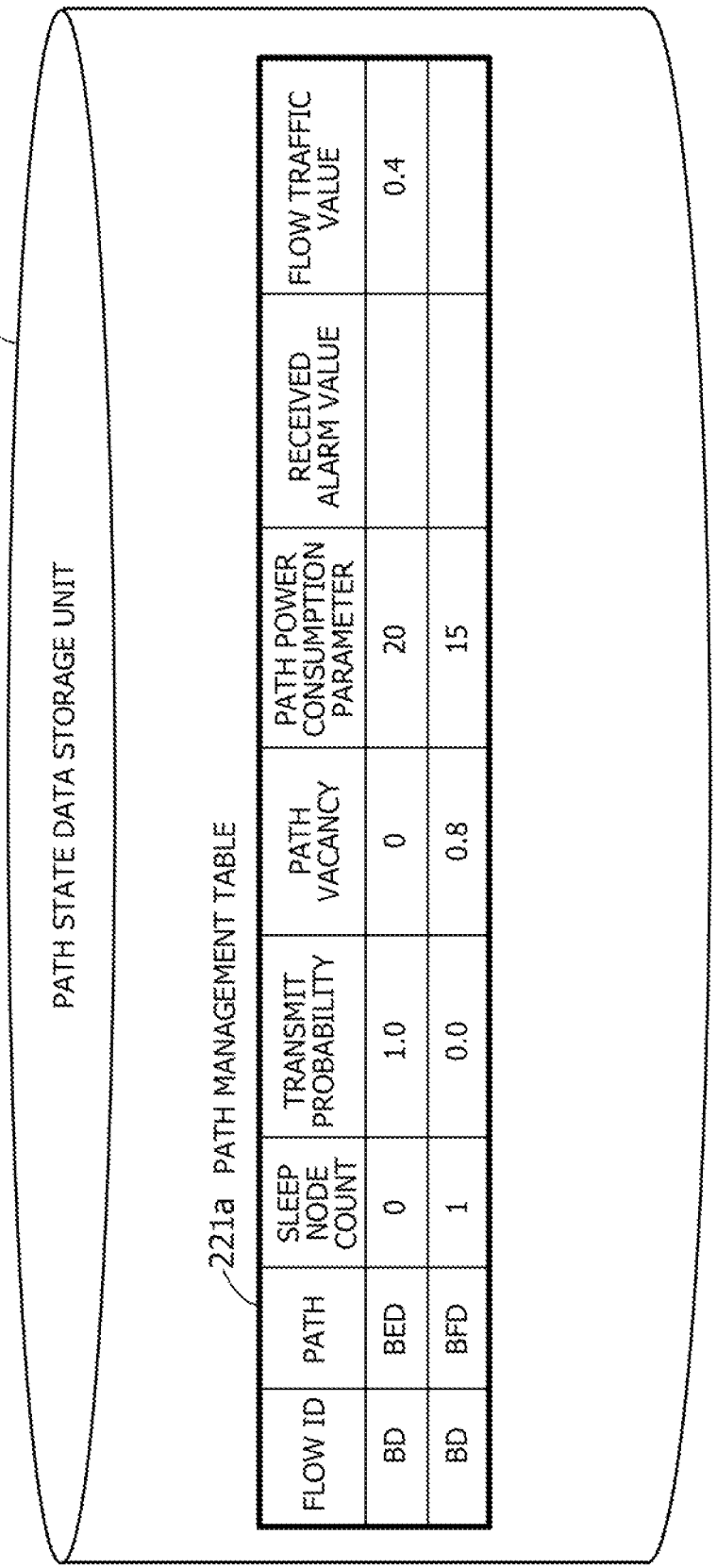
FIG. 25 illustrates an example of updated contents of a path state data storage unit in the edge node with a node ID of B.

FIG. 25 illustrates an example of updated contents of a path state data storage unit in the edge node with a node ID of B. The traffic measurement results of each flow discussed in FIG. 20 are reflected in the path state data of FIG. 25. As can be seen from comparison with FIG. 17, the path state data record of path BED carrying flow BD now contains a new value of path vacancy. More specifically, the path vacancy of path BED has been changed from 0.1 to 0.

The traffic measurement process may reveal an excessive link usage ratio above the control start threshold in some links. When such a link is found, it is recognized as a sign of congestion in the link, thus invoking a process of congestion control. FIG. 26 is a flowchart illustrating an example of a congestion control process. The steps of FIG. 26 will now be described below in the order of step numbers.

(Step S41) The congestion detection unit 140 executes a process of distribution path invitation, in which the ingress nodes of traffic flows are invited to propose candidates for their new distribution paths. Specifically, alarm information is transmitted to the ingress nodes in this distribution path invitation process. The details of this step will be described later with reference to FIG. 29.

(Step S42) The distribution control unit 150 chooses appropriate distribution paths of traffic from among the proposed candidate paths and commands the ingress nodes of those paths to distribute the traffic load. The details of this step will be described later with reference to FIG. 35.

Figure 27:
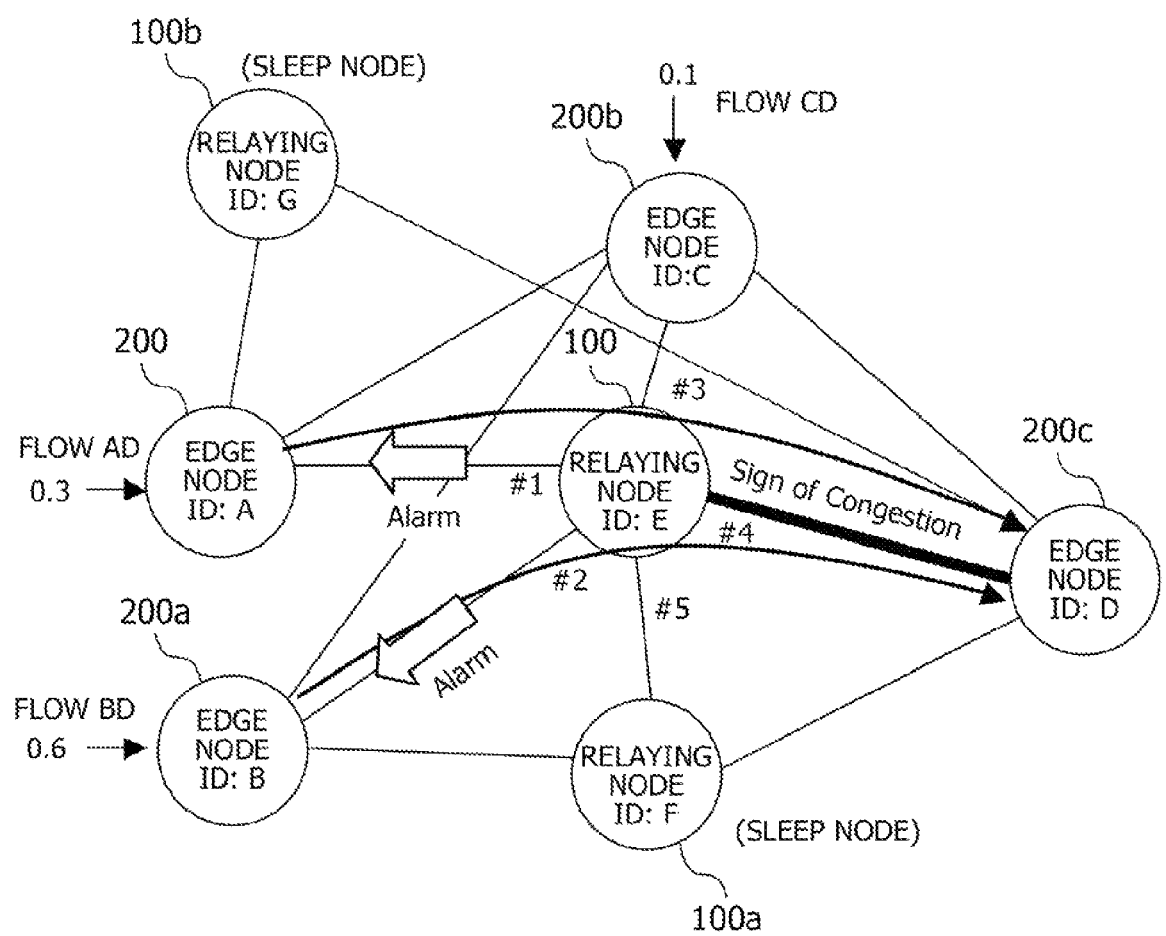
FIG. 27 illustrates how alarm information is transmitted in a distribution path invitation process.

FIG. 27 illustrates how alarm information is transmitted in a distribution path invitation process. The example of FIG. 27 assumes that a sign of congestion is detected in a link running from output communication port #4 of the relaying node 100. The relaying node 100 designates this link as a target link for congestion control and transmits alarm information to the edge nodes 200 and 200a serving as ingress nodes of paths involving the target link.

The alarm information carries, among others, the following data items: alarm value (restriction ratio), flow ID, ingress node name (destination of alarm information), path descriptor, and target link name. The target link name is the name of a link in which a sign of congestion is detected. The name of a link is given as a combination of two node IDs representing both ends of the link. More specifically, the name of a link begins with a node ID indicating the node that transmits traffic to the link, which is followed by another node ID indicating the node that receives traffic from the link. For example, the link running from output communication port #4 of the relaying node 100 is designated by its name "ED."

The alarm value for link i is calculated from the following formula.

$$a_i(t)=a_i(t-1)+P\times(e_i(t)-e_i(t-1))+I\times e_i(t) \qquad (4)$$

where t indicates the present cycle of alarm information transmission. That is, t has an initial value of one and is incremented each time a packet containing alarm information of the target link is transmitted, thus indicating that the present alarm information is of the t-th cycle. Note that $a_i(0)$ is defined to be 1 in formula (4). P and I are predetermined control parameters used in a proportional-integral (PI) controller. For example, the present embodiment assumes P=0.5 and I=0.1. The term $e_i(t)$ represents deviation of link i in the t-th cycle, which is expressed as follows.

$$e_i(t)=T_i-Tr_i(t) \qquad (5)$$

where $T_i$ represents the target ratio of link i, and $Tr_i(t)$ represents the link usage ratio of link i.

For example, the alarm value of link ED running from output communication port #4 is calculated from the following values of its link data record seen in FIG. 23.

Previous Alarm Value: $a_{ED}(0)$=1 (initial value)
Deviation: $e_{ED}(1)$=−0.1
Previous Deviation: $e_{ED}(0)$=0.1
where P=0.5 and I=0.1. A new alarm value is then calculated as follows:
Alarm Value: $a_{ED}(1)$=1+0.5(−0.1−0.1)+0.1(−0.1)=0.89

Alarm information is transmitted as part of a control packet. The control packet may be given a piece of information designating a specific transmission route of the packet. In the example illustrated in FIG. 27, a sign of congestion is observed in the link running from communication port #4 of the relaying node 100 since its link usage ratio exceeds the control start threshold. The relaying node 100 thus produces alarm information and loads it in a control packet.

The relaying node 100 designates the above link as a target link for congestion control and transmits the control packet containing alarm information to the ingress node of every flow that is destined for the edge node 200c via the target link. The communication ports used to transmit this control packet are each coupled to a neighbor node located on the ingress side of such a path involving the target link. That is, for each such path of a flow involving the target link, the relaying node 100 sends a control packet to its neighbor node located on the ingress side of the path. The control packet specifies its transmission route, and this transmission route traces the path of a flow back to its ingress node. For example, path AED of flow AD is among such paths that involves the target link, and thus the relaying node 100 sends a control packet containing alarm information to an edge node 200, which serves as the ingress node of flow AD. Similarly, for path BED of flow BD, the relaying node 100 sends a control packet to another edge node 200*a*, which serves as the ingress node of flow BD.

For example, the alarm information may be represented in the form of [Flow ID, Ingress node, Alarm-raising path descriptor, Target link, Alarm value]. The content of alarm information for edge nodes 200 and 200*a* are then expressed as follows.

Alarm information in control packet to edge node 200
[AD, A, (A, E, D), ED, 0.89]
Alarm information in control packet to edge node 200*a*
[BD, B, (B, E, D), ED, 0.89]

In the example of FIG. 27, the ingress nodes of two paths involving the target link are both located immediately next to the relaying node 100 that has detected a sign of congestion. Accordingly, the control packets containing alarm information are delivered from the relaying node 100 to those ingress nodes without the help of intervening nodes. This is, however, not always the case. When there are some other nodes on the specified path between the detecting node and the ingress node, the control packet containing alarm information is forwarded by those intervening nodes.

Figure 28:
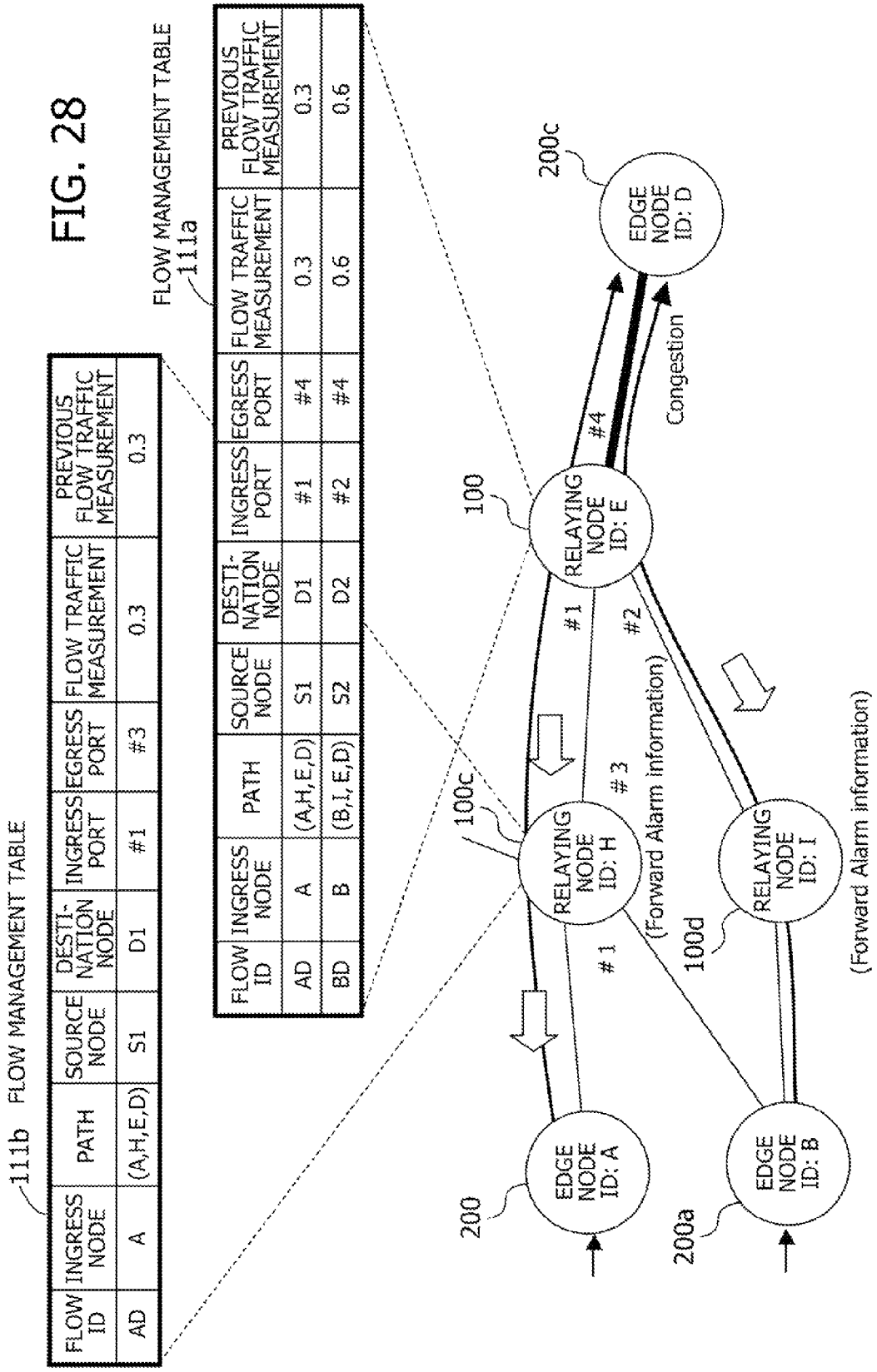
FIG. 28 illustrates a situation where alarm information is forwarded.

FIG. 28 illustrates a situation where alarm information is to be forwarded by an intervening node. The illustrated network of FIG. 28 has two additional relaying nodes 100*c* and 100*d*, compared to that of FIG. 6. Specifically, one additional relaying node 100*c* is placed between the relaying node 100 and the edge node 200, and another additional relaying node 100*d* is placed between the relaying node 100 and the edge node 200*a*. The former additional relaying node 100*c* is identified by its node ID "H." The latter additional relaying node 100*d* is identified by its node ID "I."

Flow AD in this network follows the path of "A, H, E, D" (path AHED). Flow BD, on the other hand, follows path BIED. The relaying node 100 has a flow management table 111*a* including information on those paths. That is, the flow data record of flow AD contains a path descriptor of path AHED, and that of flow BD contains a path descriptor of path BIED. Similarly the next relaying node 100*c* has its flow management table 111*b*, in which a flow descriptor of path AHED is included in the flow data record of flow AD.

Suppose now that a sign of congestion is detected in the link between the relaying node 100 and edge node 200*c* in the above-described network. In this situation, the relaying node 100 recognizes this congested link as a target link and then identifies two paths running though the target link. The relaying node 100 sends alarm information to edge nodes 200 and 200*a* since they are the ingress nodes of the identified paths. One packet of alarm information addressed to the edge node 200 traces back the path AHED and first reaches the relaying node 100*c*. The other packet of alarm information addressed to the edge node 200*a* traces back the path BIED and first reaches the relaying node 100*d*. The former relaying node 100*c* then forwards the received packet of alarm information to the destination edge node 200 by reversing the path AHED of flow AD. Similarly the latter relaying node 100*d* forwards the received packet of alarm information to the destination edge node 200*a* by reversing the path BIED of flow BD.

According to the second embodiment described above, the alarm information contains a path descriptor to indicate its transmission route. When a packet of alarm information is received, the receiving node can readily determine where to forward the received information, by referring to the path descriptor contained therein. Each node, on the other hand, also has information about paths of flows. Accordingly, the nodes can forward alarm information even if the alarm information contains no such path descriptors. For example, the receiving node extracts a flow ID from the received alarm information and retrieves a path descriptor associated with that flow ID from its local flow data storage unit. The receiving node then forwards the received alarm information to the next node, reversing the path described in the retrieved path descriptor. In either way, the transmitted alarm information can go backward on the path of its relevant flow, thus reaching the intended ingress node.

Figure 29:
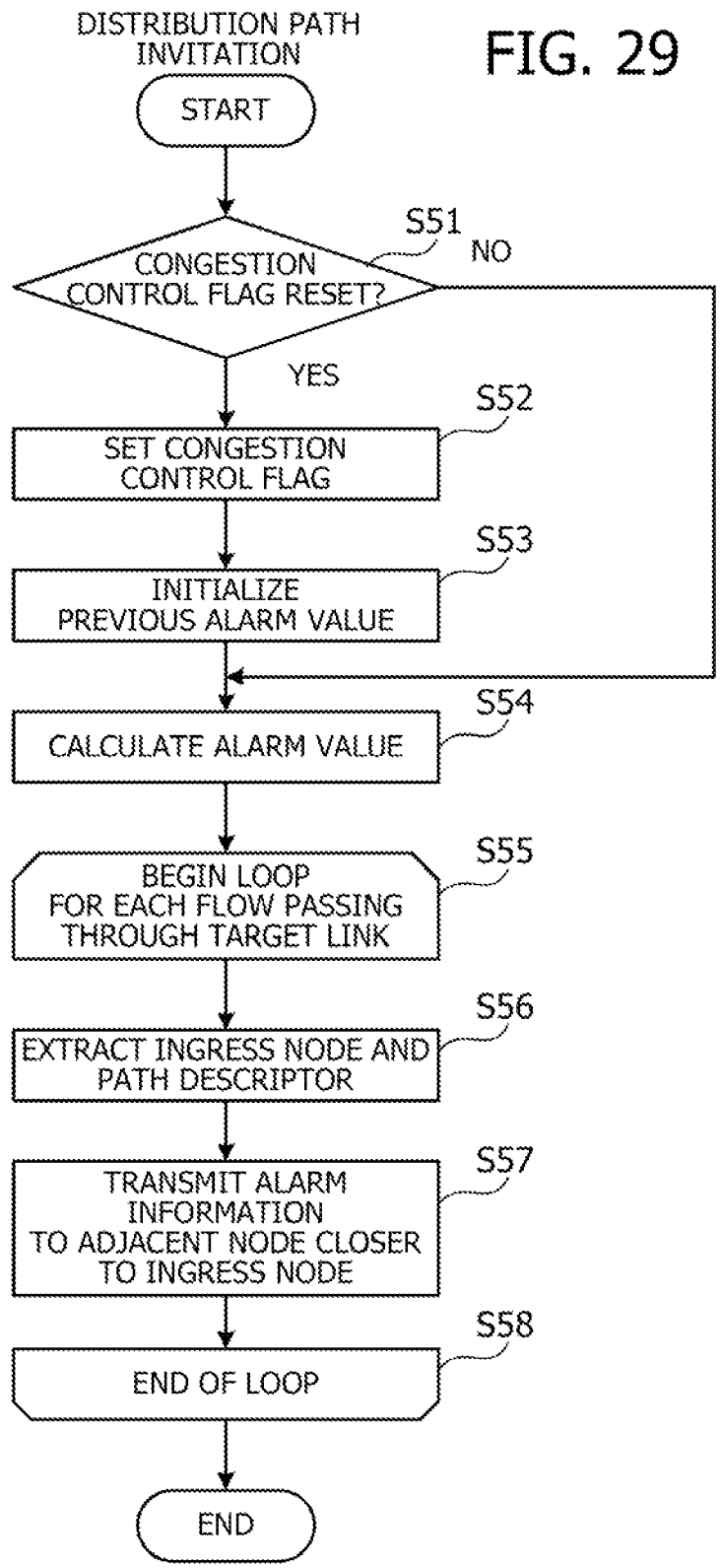
FIG. 29 is a flowchart illustrating an example of a distribution path invitation process.

FIG. 29 is a flowchart illustrating an example of a distribution path invitation process. The steps of FIG. 29 will now be described below in the order of step numbers.

(Step S51) The congestion detection unit 140 determines whether the congestion control flag is in a reset state. For example, the congestion detection unit 140 consults the link data storage unit 120 to retrieve a link data record relevant to the target link and determines whether the retrieved record has a congestion control flag that is set. If the congestion control flag is in a reset state, then the process advances to step S52. If the congestion control flag is already set, then the process advances to step S54.

(Step S52) The congestion detection unit 140 set a congestion control flag. For example, the congestion detection unit 140 retrieves a link data record associated with the target link from the link data storage unit 120 and sets a congestion control flag in the retrieved record.

(Step S53) The congestion detection unit 140 initializes a previous alarm value of the relevant link data record. For example, the congestion detection unit 140 enters one to the previous alarm value field of the link data record retrieved from the link data storage unit 120.

(Step S54) The congestion detection unit 140 calculates a current alarm value $a_i(t)$ according to, for example, the foregoing formulas (4) and (5). For this calculation, the congestion detection unit 140 extracts necessary data from the link data record retrieved from the link data storage unit 120.

(Step S55) The congestion detection unit 140 executes the following steps S56 to S57 for each individual flow that passes through the target link.

(Step S56) The congestion detection unit 140 consults the flow data storage unit 110 to retrieve a flow data record relevant to a flow that is currently selected as passing through the target link. The congestion detection unit 140 then extracts the values of ingress node and path state data fields from the retrieved flow data record.

(Step S57) The congestion detection unit 140 produces a control packet that contains alarm information and is addressed to the ingress node of the selected flow. The congestion detection unit 140 transmits this control packet to an adjacent node that lies on the path of the selected flow and is located closer to the ingress node.

(Step S58) The congestion detection unit 140 terminates the alarm information transmission process when every flow passing through the target link has been subjected to the above steps S56 to S57.

The above-described processing steps permit alarm information to be transmitted upon detection of a sign of congestion. The next section will describe a bidding process performed by an ingress node that receives alarm information.

When alarm information is received, the receiving ingress node first updates its path state data records according to the received alarm information. FIG. 30 illustrates example contents of the path state data storage unit 220 in the edge node 200 with a node ID of A after reception of alarm information. The example of FIG. 30 assumes that a sign of congestion has been detected in path AED. The edge node 200 extracts a path descriptor and an alarm value from the received alarm information and puts the extracted alarm value (e.g., 0.89 in FIG. 30) in the received alarm value field of a path state data record associated with the extracted path descriptor.

Figure 31:
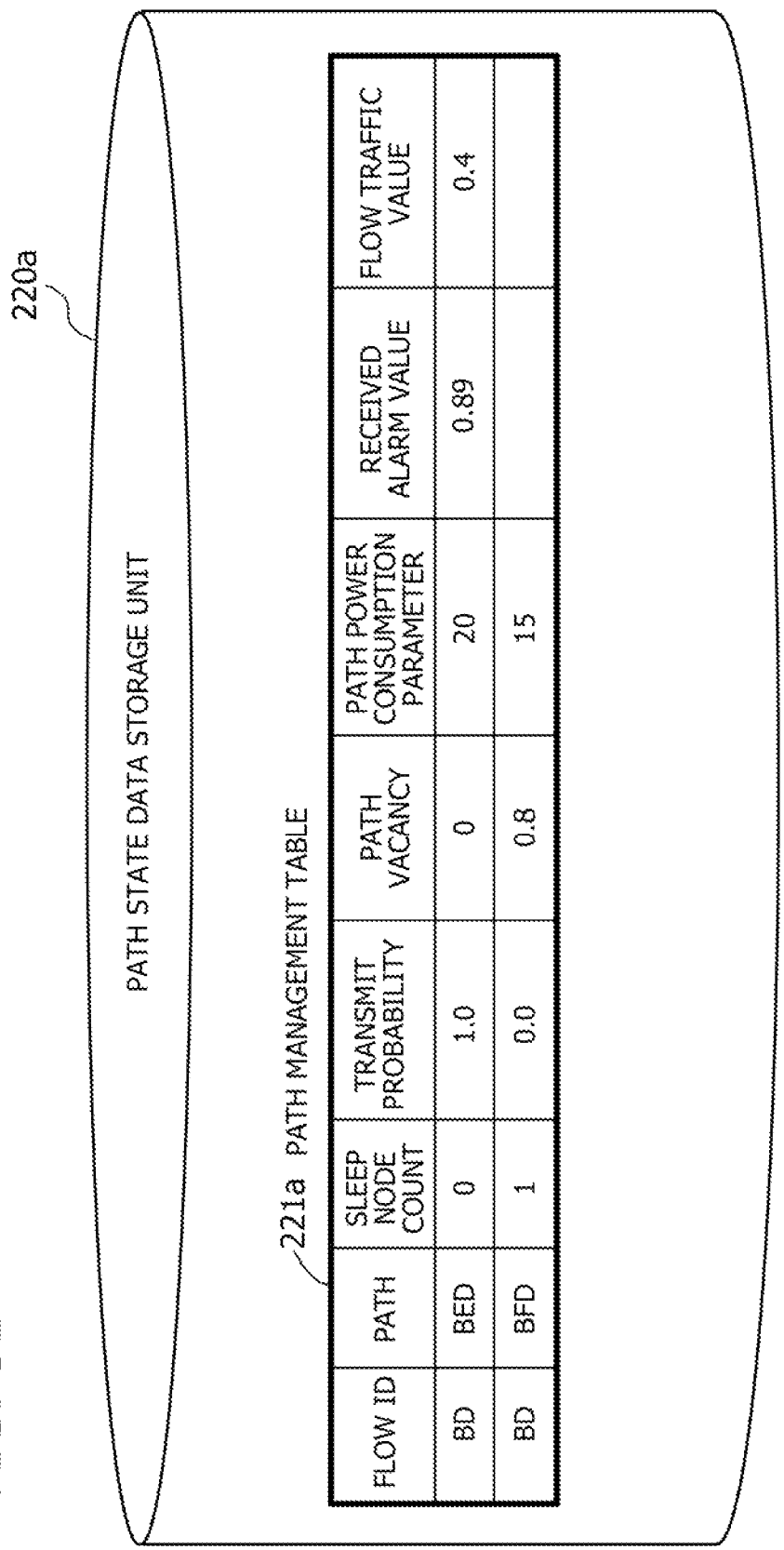
FIG. 31 illustrates example contents of a path state data storage unit in the edge node with a node ID of B after reception of alarm information.

FIG. 31 illustrates example contents of the path state data storage unit 220*a* in the edge node 200*a* with a node ID of B after reception of alarm information. The edge node 200*a* similarly extracts a path descriptor and an alarm value from the received alarm information and puts the extracted alarm value (e.g., 0.89 in FIG. 31) in the received alarm value field of a path state data record associated with the extracted path descriptor.

Figure 32:
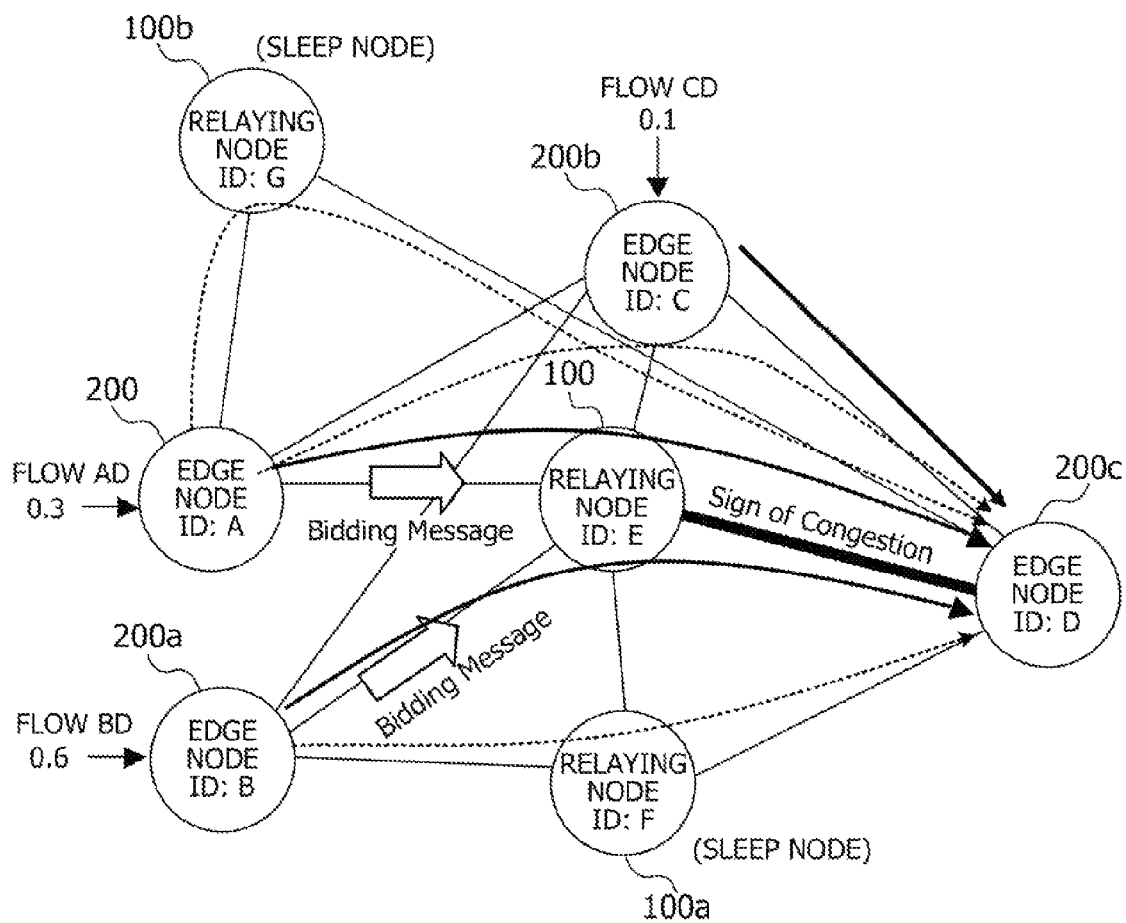
FIG. 32 illustrates an example of transmitted bidding messages.

After updating path state data records, the receiving edge nodes transmit a bidding message. FIG. 32 illustrates an example of transmitted bidding messages. When alarm information is received, each of the receiving edge nodes 200 and 200*a* transmits a bidding message back to the relaying node 100, i.e., the source of the alarm information. The bidding message is supposed to deliver the information about a proposed alternative path for transporting the flow indicated in the alarm information. This proposed alternative path is also referred to as a candidate path. More specifically, the payload of a bidding message carries data of a candidate path, which may include the following items: Flow ID, Path, Sleep node count, Path Vacancy, and Power consumption parameter. This candidate path data is created for each proposed candidate path and carried by a bidding message.

In the example of FIG. 32, the edge node 200 has three registered paths of flow AD, i.e., path AED, path ACD, and path AGD. Path AED includes the link where an alarm has been raised. Accordingly, the remaining two paths ACD and AGD are eligible for candidate paths. Suppose here that the candidate path data in a bidding message is represented in the following form: (Flow ID, Path, Sleep node count, Vacancy, Power consumption parameter). Based on this notation, the candidate path data in a bidding message sent from the edge node 200 to the relaying node 100 is expressed as follows:

[(AD, ACD, 0, 0.7, 20), (AD, AGD, 1, 0.8, 20)]

On the other hand, the edge node 200*a* has two registered paths for flow BD, i.e., path BED and path BFD. Path BED includes the link where an alarm has been raised. Accordingly, the remaining path BFD is eligible for candidate paths. In this case, the candidate path data in a bidding message sent from the edge node 200*a* to the relaying node 100 is expressed as follows:

[(BD, BFD, 1, 0.8, 15)]

Figure 33:
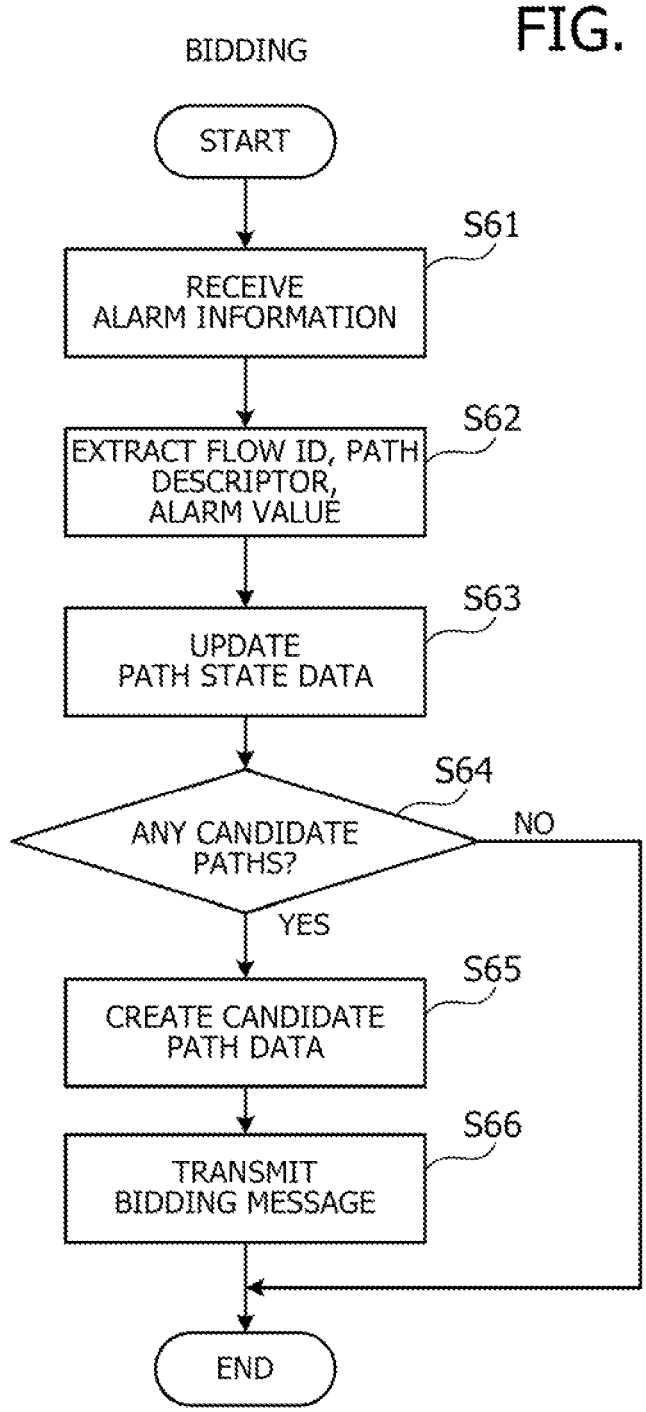
FIG. 33 illustrates a bidding procedure.

The ingress nodes perform a bidding process as follows. FIG. 33 illustrates a bidding procedure. The steps of FIG. 33 will now be described below in the order of step numbers.

(Step S61) The bidding unit 240 receives alarm information.

(Step S62) The bidding unit 240 extracts the values of flow ID, ingress node, alarm path data, target link, and alarm value fields from the received alarm information. This operation also permits the bidding unit 240 to recognize that the edge node 200 is involved as the ingress node since the extracted value of ingress node field matches with its node ID.

(Step S63) The bidding unit 240 updates a relevant path state data record in the path state data storage unit 220. More specifically, the bidding unit 240 first searches the path state data storage unit 220 to find a path state data record associated with a combination of the extracted values of flow ID and path fields of the received alarm information. The bidding unit 240 then enters the extracted alarm value to the received alarm value field of the path state data record that is found.

(Step S64) The bidding unit 240 determines whether there are any candidates for distribution paths. Specifically, there may be two or more registered paths for the flow designated by the extracted flow ID. Some of those paths are eligible for candidate paths if they are not involved in the present alarm. If such candidate paths are found, the bidding unit 240 advances to step S65. If no such candidate path is found, the bidding unit 240 terminates the bidding process.

(Step S65) Now that candidate paths are found, the bidding unit 240 creates candidate path data for each individual candidate path. For example, the candidate path data is made up of the values of flow ID, path, sleep node count, vacancy, and power consumption parameter. The bidding unit 240 retrieves those data values from the path state data storage unit 220.

(Step S66) The bidding unit 240 enters the created candidate path data into a single bidding message and transmits the resulting bidding message to the source node of the alarm information. The bidding unit 240 then terminates the present process.

The above bidding message is received by the relaying node 100. Upon receipt, the relaying node 100 analyzes the provided candidate path data to determine which path to use for distribution of traffic. For example, the relaying node 100 may select a candidate path including the smallest number of sleep nodes and designate it as a distribution path. The relaying node 100 then sends a distribution request to an edge node that serves as the ingress node of the designated distribution path.

Figure 34:
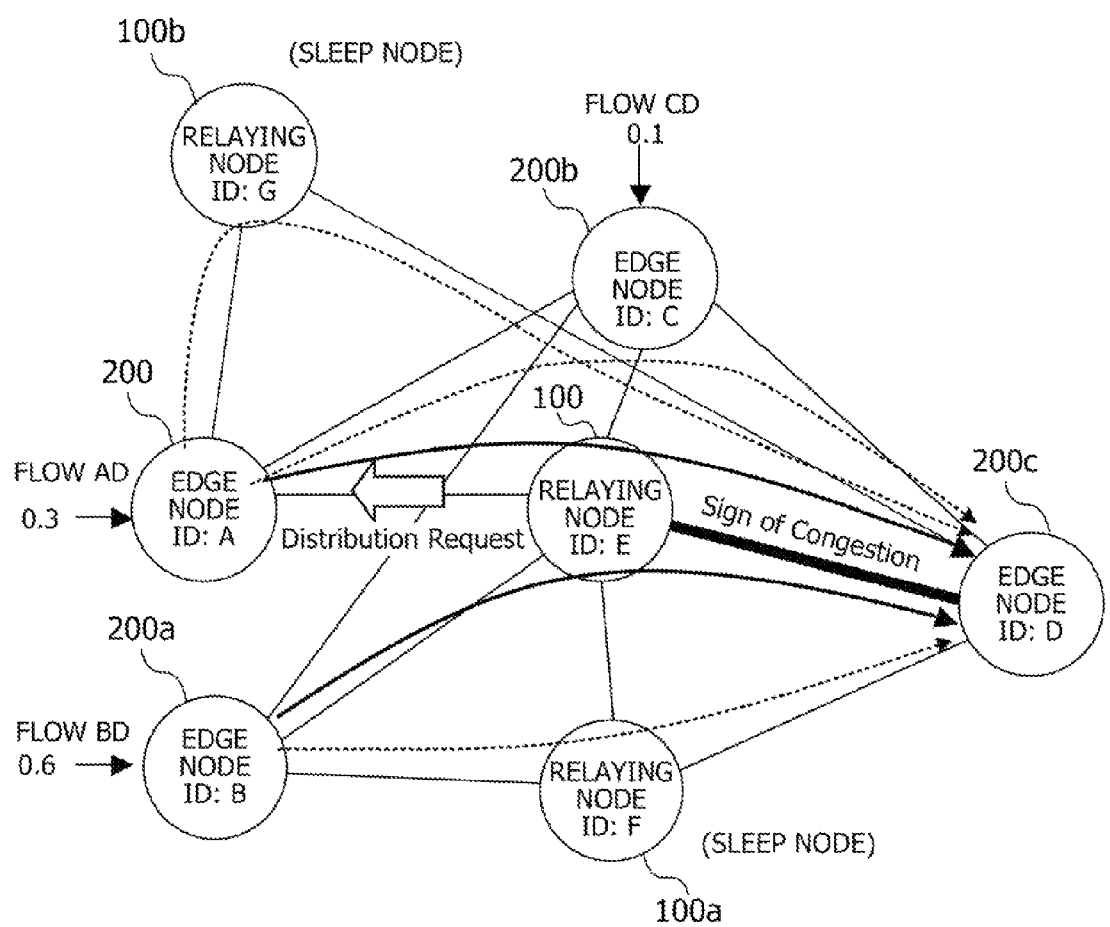
FIG. 34 illustrates an example of transmitting a distribution request.

FIG. 34 illustrates an example of transmitting a distribution request. In this example of FIG. 34, relaying nodes 100*a* and 100*b* are sleep nodes, and one edge node 200*a* has proposed a candidate path running through a relaying node 100*a*. Another edge node 200 has also proposed two candidate paths, one running through a relaying node 100*b* and the other running through an edge node 200*b*. The relaying node 100 chooses one of those three proposed candidate paths for use as a distribution path. The relaying node 100 selects a candidate path whose sleep node count is smaller than the others'. In the present example, path ACD is the choice. The relaying node 100 thus sends a distribution request to the edge node 200 so as to distribute its traffic to path ACD.

For example, the distribution request contains the following values: Flow ID, Distribution Path, Alarm Path, and Alarm Value. Suppose now that distribution requests are represented in the following data format: [Flow ID, Distribution Path, Alarm Path, Alarm Value]. Based on this notation, the content of a distribution request transmitted to the edge node 200 in the example of FIG. 34 is expressed as follows:

[AD, ACD, AED, 0.89]

Figure 35:
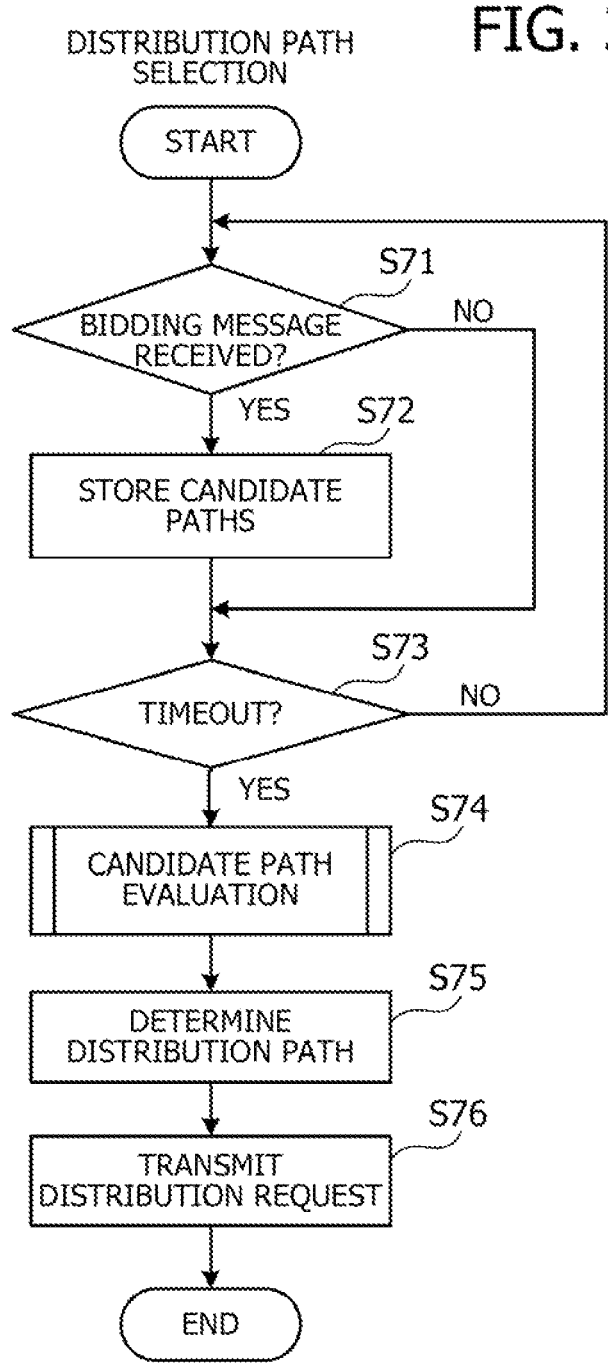
FIG. 35 is a flowchart illustrating an example procedure of distribution path selection.

The distribution control unit 150 selects a distribution path in the way described below. FIG. 35 is a flowchart illustrating an example procedure of distribution path selection. The steps of FIG. 35 will now be described below in the order of step numbers.

(Step S71) The distribution control unit 150 determines whether a bidding message is received. When a bidding message is received, the process advances to step S72. When there is no bidding message, the process advances to step S73.

(Step S72) The distribution control unit 150 extracts candidate paths from the received bidding message and stores them in a storage space of the RAM 102 or HDD 103.

(Step S73) The distribution control unit 150 determines whether a predetermined period for bidding message collection has expired. This period (bidding message collection period) has previously been specified as a time allowed to collect bidding messages after alarm information is transmitted. The distribution control unit 150 starts counting the time upon transmission of alarm information and detects a timeout when the bidding message collection period expires. The timeout causes the process to advance to step S74. Otherwise, the process returns to step S71.

(Step S74) The distribution control unit 150 evaluates the candidate paths. The details of this step will be described later with reference to FIG. 36.

(Step S75) Based on the evaluation result of candidate paths, the distribution control unit 150 determines a distribution path.

(Step S76) The distribution control unit 150 transmits a distribution request to the ingress node of the selected distribution path, so that the traffic will be distributed to the specified path. The distribution path selection process is then terminated.

Figure 36:
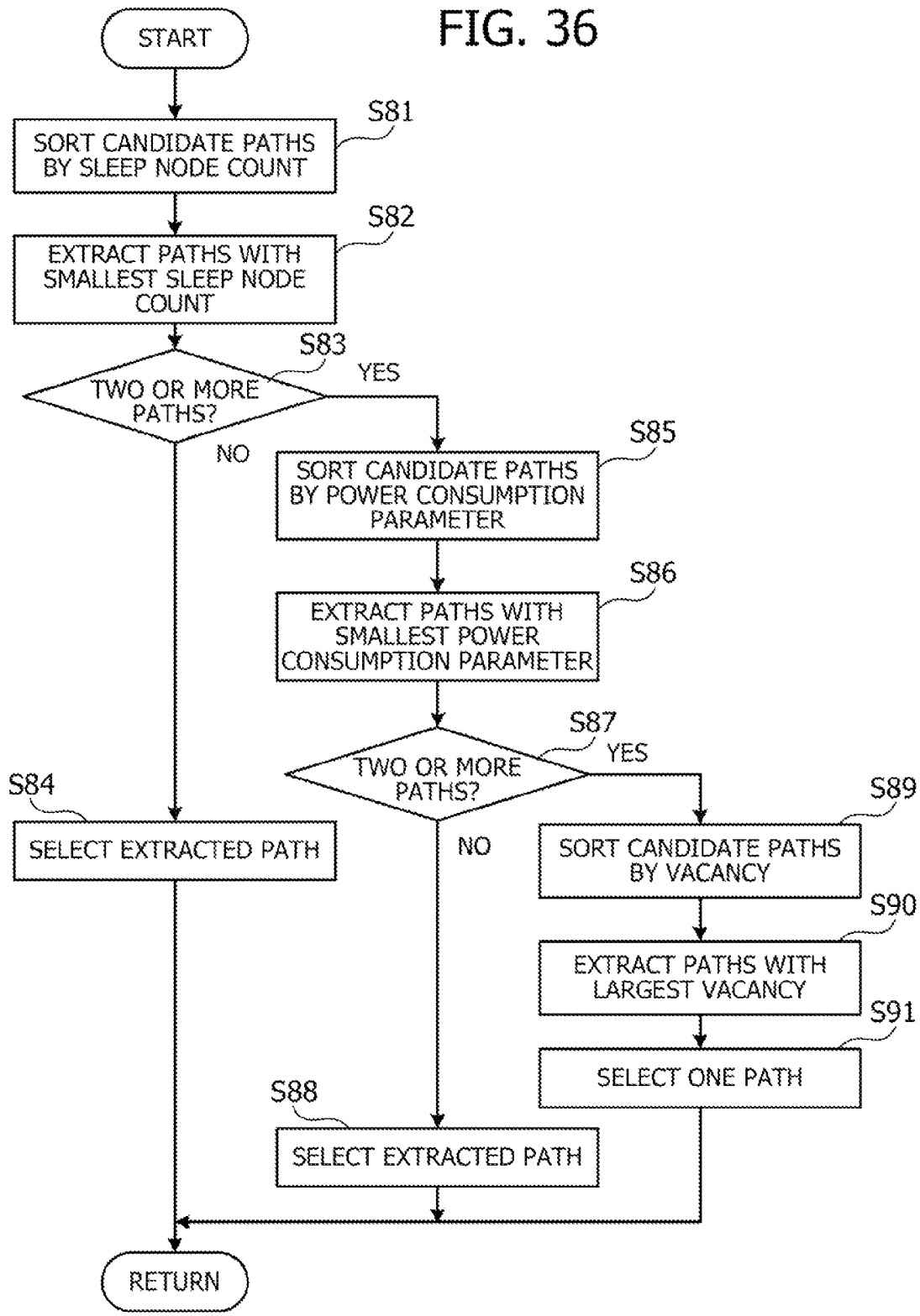
FIG. 36 is a flowchart illustrating an example procedure of candidate path evaluation.

The aforementioned process of candidate path evaluation will be described in detail below. FIG. 36 is a flowchart illustrating an example procedure of candidate path evaluation. The steps of FIG. 36 will now be described below in the order of step numbers.

(Step S81) The distribution control unit 150 sorts the candidate paths extracted from received bidding messages in ascending order of their sleep node counts.

(Step S82) The distribution control unit 150 extracts candidate paths with the smallest sleep node count from among those sorted at step S81.

(Step S83) The distribution control unit 150 determines how many candidate paths have been extracted at step S82. If there are two or more candidate paths, the process advances to step S85. If there is only one candidate path, the process advances to step S84.

(Step S84) Since only one candidate path has been extracted at step S82, the distribution control unit 150 selects that candidate path and terminates the process of candidate path evaluation.

(Step S85) The distribution control unit 150 sorts the two or more candidate paths extracted at step S82 in ascending order of their power consumption parameters.

(Step S86) The distribution control unit 150 extracts candidate paths with the smallest power consumption parameter from among those sorted at step S85.

(Step S87) The distribution control unit 150 determines how many candidate paths have been extracted at step S86. If there are two or more candidate paths, the process advances to step S89. If there is only one candidate path, the process advances to step S88.

(Step S88) Since only one candidate path has been extracted at step S86, the distribution control unit 150 selects that candidate path and terminates the process of candidate path evaluation.

(Step S89) The distribution control unit 150 sorts the two or more candidate paths extracted at step S86 in descending order of their vacancies.

(Step S90) The distribution control unit 150 extracts candidate paths with the largest vacancy from among those sorted at step S89.

(Step S91) The distribution control unit 150 selects one of the candidate paths extracted at step S90 and terminates the process of candidate path evaluation.

The above processing steps determine the path to distribute traffic and transmit a distribution request to the ingress node of the determined path. At the receiving ingress node, traffic load is distributed according to the received distribution request. Specifically, the ingress node achieves traffic load distribution by changing transmit probabilities of traffic to the alarm-raising path and distribution paths. For example, the ingress node determines transmit probabilities of alarm-raising path and distribution paths according to the following formulas.

$$\text{New transmit probability of Alarm-raising} \\ \text{path=Alarm value} \times \text{Current transmit probability} \\ \text{of Alarm-raising path} \quad (6)$$

$$\text{New transmit probability of Distribution path=Current} \\ \text{transmit probability of Distribution path+(1-} \\ \text{Alarm value)} \times \text{Current transmit probability of} \\ \text{Alarm-raising path} \quad (7)$$

These formulas (6) and (7) decrease the transmit probability of alarm-raising path by a certain amount and increases the transmit probability of distribution path by the same amount. It is noted that no changes are made to transmit probabilities of the other paths.

Suppose, for example, that the edge node 200 has received a distribution request specifying the values of [AD, ACD, AED, 0.89]. The alarm-raising path, AED, has a transmit probability of one at present. The distribution request replaces this transmit probability with a new transmit probability of 0.89 for the same path AED. As a result, the specified distribution path ACD is assigned a new transmit probability of 0.11. Inside the edge node 200, the transmit probability changing unit 250 calculates such new transmit probabilities and updates relevant path state data records in the path state data storage unit 220 to reflect the calculated new transmit probabilities. Subsequently the path state data collection unit 230 executes a path state data collection process, and the path state data records are also updated with the path capacities and other values that are collected.

FIG. 37 illustrates example contents of the path state data storage unit 220 after update of transmit probabilities. As can be seen from comparison with FIG. 30, the transmit probability of path ACD for flow AD has been changed from 0 to 0.11. As a result of this change in the transmit probability of path ACD, the flow traffic value of path ACD has also been changed from 0 to 0.033. This means that a fraction of the original traffic is now diverted into path ACD, and accordingly, its path vacancy has been changed from 0.7 to 0.59.

In addition to the above, the transmit probability of path AED for flow AD has been changed from to 0.89. As a result of this change in the transmit probability of path AED, the flow traffic value of path AED has also been changed from 0.3 to 0.267. It is noted that the path vacancy of path AED remains zero for the following reason. That is, even if the traffic volume of path AED is reduced to 0.267, the total volume of traffic on link ED, including 0.6 of flow BD, amounts to 0.867. The vacancy of link ED is calculated to be negative since Link capacity×Target ratio makes 0.8. This negative value is interpreted as no vacancy of link ED, and thus the path vacancy remains zero.

According to the new set of transmit probabilities, the packet forwarding unit 216 distributes the traffic of flow AD to two paths AED and ACD. The traffic, originally concentrated into path AED, is now distributed in two paths.

Figure 38:
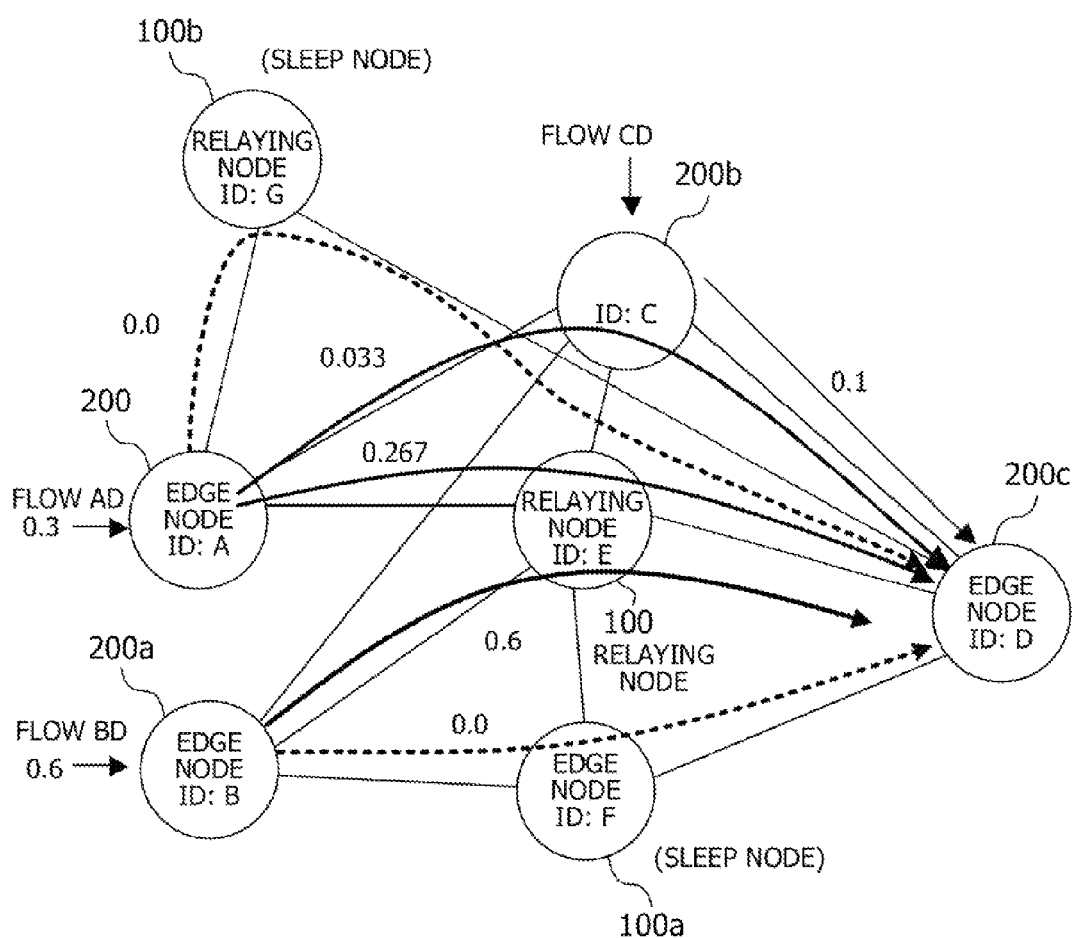
FIG. 38 illustrates an example of load distribution.

FIG. 38 depicts an example of load distribution. In the example of FIG. 38, the total traffic volume of flow AD is 0.3 as before. This traffic of flow AD is distributed at an edge node 200 to path AED and path ACD at the ratio of 0.89 to 0.11, which results in traffic volumes of 0.267 in path AED and 0.033 in path ACD.

The examples seen in FIGS. 37 and 38 are the result of load distribution performed in response to the first alarm information. More alarm information is produced until the link usage ratio of link ED falls below the control start threshold of 0.7. According to such a series of alarm information, the transmit probabilities are changed again and again to distribute the traffic load in different ways. Such repetitive changes of transmit probabilities gradually increase the amount of traffic diverted from path AED to path ACD, thus reducing the traffic volume of path AED.

Figure 39:
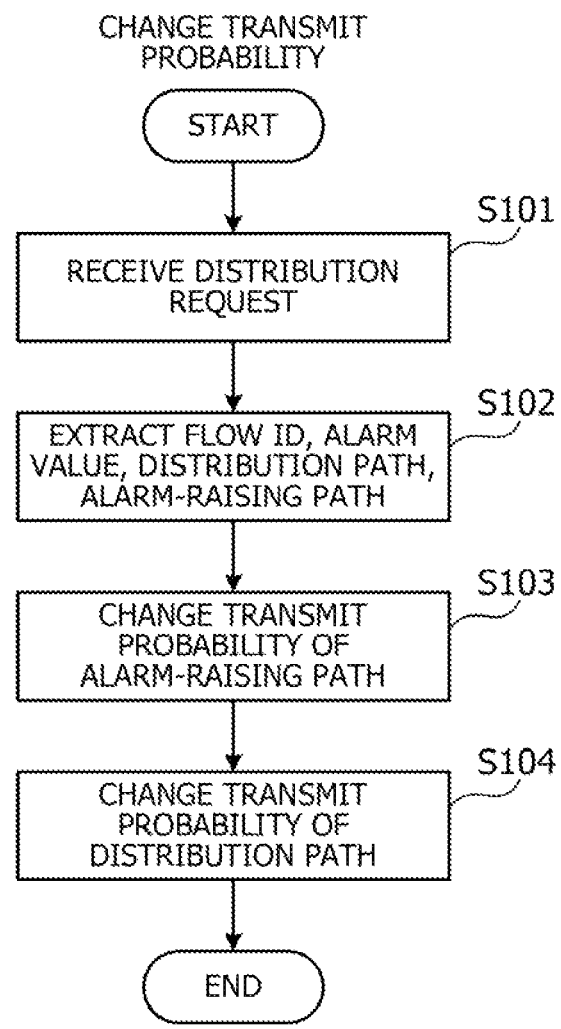
FIG. 39 is a flowchart illustrating an example procedure of changing transmit probabilities.

FIG. 39 is a flowchart illustrating an example procedure of changing transmit probabilities. The steps of FIG. 39 will now be described below in the order of step numbers.

(Step S101) The transmit probability changing unit 250 receives a distribution request.

(Step S102) The transmit probability changing unit 250 extracts the values of flow ID, distribution path, alarm-raising path, and alarm value from the received distribution request.

(Step S103) The transmit probability changing unit 250 changes the transmit probability of the alarm-raising path by using formula (6), for example. The transmit probability changing unit 250 assigns the calculated transmit probability to the alarm-raising path in a relevant record stored in the path state data storage unit 220.

(Step S104) The transmit probability changing unit 250 changes the transmit probability of the distribution path by using formula (7), for example. The transmit probability changing unit 250 assigns the calculated transmit probability to the distribution path in a relevant record stored in the path state data storage unit 220.

The above steps adjust the degree of load distribution by changing transmit probabilities.

As can be seen from the above explanation, the second embodiment is designed to cope with a sign of congestion detected in a link by distributing its traffic to another path with a smaller number of sleep nodes, rather than distributing all traffic passing through the congested link. This feature prevents the network from awaking more sleep nodes than necessary. The second embodiment uses a PI controller to adjust the amount of traffic to be directed to the distribution path, so that the concentration of traffic is relieved in a stepwise manner. It is thus possible to avoid awaking more sleep nodes than necessary, as well as preventing too much increase of power consumption. The second embodiment further avoids abrupt increase and subsequent congestion of traffic in the distribution path.

Variations and Implementations

The foregoing first and second embodiments start distribution of traffic upon detection of a sign of congestion. The conditions triggering traffic distribution are, however, not limited to signs of congestion. It is also possible, for example, to distribute the traffic of a link when a failure is detected in that link. This feature may be implemented by modifying, for example, the congestion detection unit 140 so as to detect not only signs of congestion, but also link failures.

The above-described processing functions may be implemented on a computer system. To achieve this implementation, the instructions describing the functions of routers (including edge nodes and relaying nodes) are encoded and provided in the form of computer programs. A computer system executes those programs to provide the processing functions discussed in the preceding sections. The programs may be encoded in a computer-readable medium for the purpose of storage and distribution. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, are used for distribution of program products. Network-based distribution of software programs may also be possible, in which case several master program files are made available on a server computer for downloading to other computers via a network.

A computer stores programs in its local storage unit, which have previously been installed from a portable storage medium or downloaded from a server computer. The computer executes programs read out of the local storage unit, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuit.

The above-discussed routers, management apparatus, and routing control program enable a part or whole of the traffic transported on a path to be diverted to another path with a minimum increase in the power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A routing apparatus for use in a network to receive traffic entering the network and forward the received traffic via links to other routing apparatuses along a path that gives a forwarding order of the traffic, the routing apparatus comprising:

a path storage unit to store information describing the paths of traffic forwarded via the links in the network;

a state data reception unit to refer to the path storage unit to identify one or more target paths that involve a specified link to transport traffic when a need arises to divert at least a part of the traffic to another path that does not involve the specified link, search for candidate paths which share beginning and ending routing apparatuses with any one of the target paths and do not involve the specified link, and obtains state data of each of the candidate paths from a management apparatus that manages the state data indicating states of the routing apparatuses that forward traffic on the candidate paths;

a distribution path selection unit to compare the candidate paths with each other in terms of what changes are expected in the states of the respective candidate paths when a part of the traffic passing through the specified link is routed thereto, based on the state data of the candidate paths which the state data reception unit has obtained, and select a distribution path from among the candidate paths which minimizes an increase in power consumption of the routing apparatuses due to the expected changes in the states of the routing apparatuses; and a distribution requesting unit to transmit a distribution request to the beginning routing apparatus of one of the target paths so as to distribute at least a part of the traffic on the one of the target path to the distribution path selected by the distribution path selection unit, wherein the one of the target paths shares both beginning and ending routing apparatuses with the selected distribution path.

2. The routing apparatus according to claim 1, wherein:
the state data reception unit obtains information on each of the candidate paths from the management apparatus, as to how many routing apparatuses thereon are operating in a power saving mode; and
the distribution path selection unit selects one of the candidate paths which has the smallest number of routing apparatuses operating in the power saving mode and designates the selected candidate path as the distribution path.

3. The routing apparatus according to claim 1, wherein:
the state data reception unit consults the management apparatus to obtain an amount of increase in power consumption of each routing apparatus on the candidate paths which is expected when the traffic is increased by a unit amount of data; and
the distribution path selection unit selects one of the candidate paths which is expected to produce a smallest total increase in the power consumption of the routing apparatuses thereon when the traffic is increased by a unit amount of data, and the distribution path selection unit designates the selected candidate path as the distribution path.

4. The routing apparatus according to claim 1, wherein the distribution requesting unit includes an alarm value in the distribution request for use as a parameter in calculating an amount of traffic to be diverted from the target path to the distribution paths.

5. The routing apparatus according to claim 4, wherein the alarm value specifies a ratio of a transmit probability of distributed traffic toward the target path to a transmit probability of current traffic toward the target path.

6. The routing apparatus according to claim 1, further comprising:
a congestion sign detection unit to measure an amount of traffic in each link extending to other routing apparatuses so as to detect a sign of congestion in one of the links,
wherein the state data reception unit designates, as the specified link, the one of the links in which a sign of congestion is detected by the congestion sign detection unit.

7. The routing apparatus according to claim 6, wherein the distribution requesting unit transmits the distribution request at predetermined intervals, as long as the congestion sign detection unit continues to detect a sign of congestion in the same one of the links.

8. The routing apparatus according to claim 6, wherein the congestion sign detection unit finds a link whose amount of traffic exceeds a predetermined threshold and designates the found link as indicating a sign of congestion.

9. The routing apparatus according to claim 1, wherein the state data reception unit recognizes a beginning routing apparatus of each target path as the management apparatus and obtains the state data of the candidate paths from the beginning routing apparatus.

10. The routing apparatus according to claim 9, wherein the state data reception unit selects one of the target paths, identifies beginning and ending routing apparatuses of the selected target path, sends alarm information indicating the beginning and ending routing apparatuses to the beginning routing apparatus, and receives, from the beginning routing apparatus, information indicating the candidate paths that share the beginning and ending routing apparatuses with the selected target path, together with the state data of the indicated candidate paths.

11. A management apparatus comprising:
a state data collection unit to collect state data from routing apparatuses that forward traffic along a path that gives a forwarding order of the traffic in a network, the state data indicating states of the individual routing apparatuses;
a path state storage unit to store the collected state data of the routing apparatuses, together with information describing the paths of the traffic forwarded by the routing apparatuses; and
a state data serving unit, responsive to reception of alarm information indicating beginning and ending routing apparatuses of target paths which involve a specified link, to consult the path state storage unit to find one or more paths which share both the beginning and ending routing apparatuses with any one of the target paths and do not involve the specified link, designate the found paths as candidate paths, and send the state data of the candidate paths.

12. The management apparatus according to claim 11, wherein:
the path state storage unit further stores information about transmit probabilities associated with a plurality of paths that share both the beginning and ending routing apparatuses with each other; and
the management apparatus further comprises:
a forwarding unit to receive traffic from another network and forward the received traffic distributedly to the paths in the network at the transmit probabilities indicated in the path state storage unit, and
a transmit probability changing unit, responsive to a distribution request specifying one of the target paths and a distribution path to which at least a part of the traffic on the specified target path is to be diverted, to change the transmit probabilities in the path state storage unit according to the distribution request, such that the transmit probability of the specified distribution path is raised while the transmit probability for the specified target path is reduced.

13. The management apparatus according to claim 11, wherein the state data collection unit collects the state data from the routing apparatuses on a path to which the traffic received from another network is forwarded.

14. The management apparatus according to claim 11, wherein the state data collection unit collects the state data including information on a number of routing apparatuses operating in a power saving mode, of all the routing apparatuses on a specific path.

15. The management apparatus according to claim 11, wherein the state data collection unit collects the state data including information on an expected increase in power consumption of the routing apparatuses on a specific path when the traffic on the specific path is increased by a unit amount of data.

16. A computer-readable, non-transitory medium storing a routing control program to be executed by a computer on a network to receive traffic entering the network and forward the received traffic via links to routing apparatuses along a path that gives a forwarding order of the traffic, the routing control program causing the computer to perform a procedure comprising:

storing information describing the paths of traffic forwarded via the links in the network;
identifying, by referring to the the information describing the paths, one or more target paths that involve a specified link to transport traffic when a need arises to divert at least a part of the traffic to another path that does not involve the specified link;
searching for candidate paths which share beginning and ending routing apparatuses with any one of the target paths and do not involve the specified link;
obtaining state data of each of the candidate paths from a management apparatus that manages the state data indicating states of the routing apparatuses that forward traffic on the candidate paths;
comparing the candidate paths with each other in terms of what changes are expected in the states of the respective candidate paths when a part of the traffic passing through the specified link is routed thereto, based on the state data of the candidate paths which the state data reception unit has obtained;
selecting a distribution path from among the candidate paths which minimizes an increase in power consumption of the routing apparatuses due to the expected changes in the states of the routing apparatuses; and
finding one of the target paths which shares both beginning and ending routing apparatuses with the selected distribution route; and
transmitting a distribution request to the beginning routing apparatus of the found target path so as to distribute at least a part of the traffic on the found target path to the selected distribution path.

* * * * *